(12) United States Patent
Pan

(10) Patent No.: US 6,587,590 B1
(45) Date of Patent: Jul. 1, 2003

(54) METHOD AND SYSTEM FOR COMPUTING 8×8 DCT/IDCT AND A VLSI IMPLEMENTATION

(75) Inventor: Feng Pan, Cupertino, CA (US)

(73) Assignee: The Trustees of the University of Pennsylvania, Philadelphia, PA (US)

( * ) Notice: Subject to any disclaimer, the term of this patent is extended or adjusted under 35 U.S.C. 154(b) by 0 days.

(21) Appl. No.: 09/402,367

(22) PCT Filed: Feb. 2, 1999

(86) PCT No.: PCT/US99/02186

§ 371 (c)(1),
(2), (4) Date: Feb. 22, 2000

(87) PCT Pub. No.: WO99/39303

PCT Pub. Date: Aug. 5, 1999

Related U.S. Application Data

(60) Provisional application No. 60/073,367, filed on Feb. 2, 1998.

(51) Int. Cl.⁷ .............................. G06K 9/36; G06K 9/46
(52) U.S. Cl. ....................................... 382/250; 708/402
(58) Field of Search ................................ 382/250, 233, 382/276, 277, 280; 708/402, 405, 404

(56) References Cited

U.S. PATENT DOCUMENTS

| | | | | | |
|---|---|---|---|---|---|
| 5,309,527 A | * | 5/1994 | Ohki | ........................ | 348/384.1 |
| 5,539,836 A | * | 7/1996 | Babkin | ........................ | 382/250 |
| 5,668,748 A | * | 9/1997 | Huang | ........................ | 382/248 |

\* cited by examiner

Primary Examiner—Phuoc Tran
(74) Attorney, Agent, or Firm—Sterne, Kessler, Goldstein & Fox P.L.L.C.

(57) ABSTRACT

A method and system for computing 2-D DCT/IDCT which is easy to implement with VLSI technology to achieve high throughput to meet the requirements of high definition video processing in real time is described. A direct 2-D matrix factorization approach is utilized to compute the 2-D DCT/IDCT. The 8×8 DCT/IDCT is computed through four 4×4 matrix multiplication sub-blocks. Each sub-block is half the size of the original 8×8 size and therefore requires a much lower number of multiplications. Additionally, each sub-block can be implemented independently with localized interconnection so that parallelism can be exploited and a much higher DCT/IDCT throughput can be achieved.

27 Claims, 29 Drawing Sheets

(a) DCT Data Flow (a) DCT Data Flow (b) IDCT Data Flow

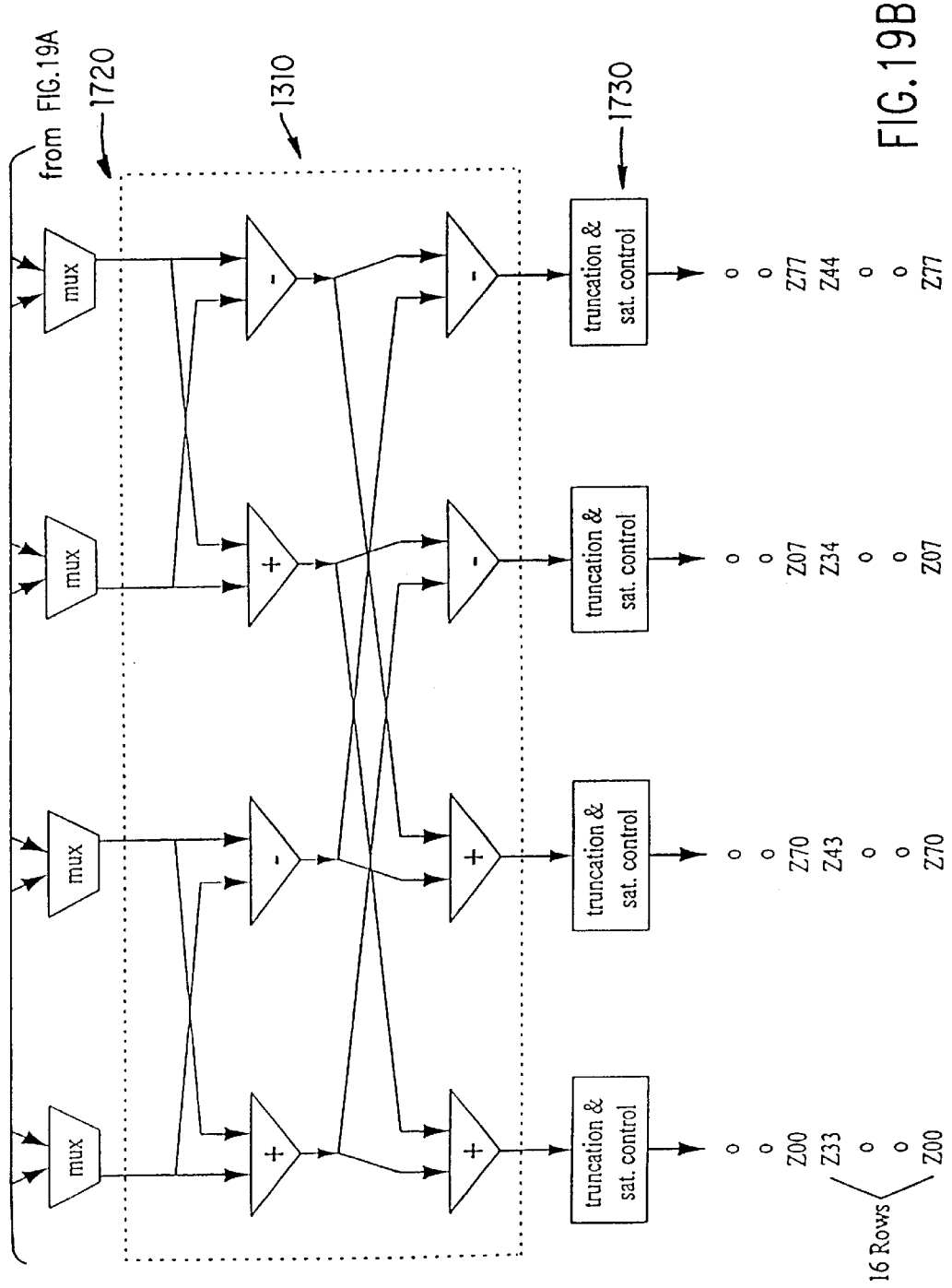

METHOD AND SYSTEM FOR COMPUTING 8×8 DCT/IDCT AND A VLSI IMPLEMENTATION

This application claims the benefit of provisional application Ser. No. 60/073,367 filed Feb. 2, 1998.

BACKGROUND OF THE INVENTION

1. Field of the Invention

This invention relates generally to calculating the 2-Dimensional 8×8 Discrete Cosine Transform (2-D DCT) and the Inverse Discrete Cosine Transform (2-D IDCT), and its very large scale integrated (VLSI) implementation. Specifically, the present invention is well suited to meet the real time digital processing requirements of digital High-Definition Television (HDTV)

2. Related Art

OUTLINE OF RELATED ART SECTION 1.0 Overview of Video Coding and MPEG Implementations
  1.1 Video Compression
  1.2 MPEG Video Compression: A Quick Look
    1.2.1 MPEG Video Sequences, Groups and Pictures
    1.2.2 MPEG Video Slice, Macroblock and Block
    1.2.3 The Motion Estimation/Compensation in MPEG
    1.2.4 The Discrete Cosine Transform in MPEG
    1.2.5 The Quantization in MPEG
    1.2.6 The Zigzag Scan and Variable Length Coding in MPEG
    1.2.7 MPEG Video Encoding Process
    1.2.8 MPEG Video Decoding Process
  1.3 MPEG-1 Video Standard
  1.4 MPEG-2 Video Standard
    1.4.1 Fields, Frames and Pictures
    1.4.2 Chrominance Sampling
    1.4.3 Scalability
    1.4.4 Profiles and Levels
  1.5 Hybrid Implementation Scheme for MTEG-2 Video System
2.0 DCT/IDCT Algorithms and Hardware Implementations
  2.1 Introduction
  2.2 1-D DCT/IDCT Algorithms and Implementations
    2.2.1 Indirect 1-D DCT via Other Discrete Transforms
    2.2.2 1-D DCT via Direct Factorizations
    2.2.3 1-D DCT Based on Recursive Algorithms
    2.2.4 1-D DCT/IDCT Hardware Implementations
  2.3 2-D DCT/IDCT Algorithms and Implementations
    2.3.1 2-D DCT via Other Discrete Transforms
    2.3.2 2-D DCT by Row-Column Method (RCM)
    2.3.3 2-D DCT Based on Direct Matrix Factorization/Decomposition
    2.3.4 2-D DCT/IDCT Hardware Implementations
  2.4 Summary

1.0 OVERVIEW OF VIDEO CODING AND MPEG IMPLEMENTATIONS

In this section, a brief overview of video compression, Moving Pictures Experts Group (MPEG) video protocols and different implementation approaches are presented. A list of references cited in this application is included in an Appendix. Each of these reference listed is incorporated herein by reference in its entirety.

1.1 Video Compression

The reduction of transmission and storage requirements for digitized video signals has been a research and development topic all over the world for more than 30 years. Many efforts have been made trying to deliver or store digital television signals, which have a bit-rate of more than 200 Mbit/s in an uncompressed format and must be brought down to a level that can be handled economically by current video processing technology. For example, suppose the pictures in a sequence are digitized as discrete grids or arrays with 360 pels (picture elements) per raster line, 288 lines/picture (a typical resolution for MPEG-1 video compression), three-color separation and sampled with 8-bit precision for each color, the uncompressed video sequence at 24 pictures/second is roughly 60 Mbit/s, and a one-minute video clip requires 448 Mbytes of storage space.

The International Standardization Organization (ISO) started its moving picture standardization process in 1988 with a strong emphasis on real-time decoding of compressed data stored on digital storage devices. A Moving Pictures Experts Group (MPEG) was formed in May 1988 and a consensus was reached to target the digital storage and real-time decoding of video with bit-rates around 1.5 Mbit/s (MPEG-1 protocol) [MPEG1]. At the MPEG meeting held in Berlin, Germany on December 1990, a MPEG-2 proposal was presented that primarily targeted for higher bit-rates, larger picture sizes, and interlaced frames. The MPEG-2 proposal attempted to address a much more broader set of applications than MPEG-I (such as television broadcasting, digital storage media, digital high-definition TV (HDTV) and video communication) while maintaining all of the MPEG-1 video syntax. Moreover, extensions were adopted to add flexibility and functionality to the standard. Most importantly, a spatial scalable extension was added to allow video data streams with multiple resolutions to provide support for both normal TV and HDTV. Other scalable extensions allow the data stream to be partitioned into different layers in order to optimize transmission and reception over existing and future networks [MPEG2].

An overview of MPEG video compression techniques, MPEG-1's video layers and MPEG-2's video layers is presented in section 1.2, 1.3 and 1.4, respectively. A proposed hybrid implementation scheme for MPEG-2 video codec is shown in section 1.5. An outline of rest of the thesis is presented in section 1.6.

1.2 MPEG Video Compression: A Quick Look

An MPEG video codec specifically designed for compression of video sequences. Because a video sequence is simply a series of pictures taken at closely spaced time intervals, these pictures tend to be quite similar from each other except for when a scene change takes place. The MPEG1 and MPEG2 codecs are designed to take advantage of this similarity using both past and future temporal information (inter-frame coding). They also utilize commonality within each frame, such as a uniform background, to lower the bit-rate (intra-frame coding) [MPEG1, MPEG2].

1.2.1 MPEG Video Sequences, Groups and Pictures

An MPEG video sequence is made up of individual pictures occurring at fixed time increments. Except for certain critical timing information in the MPEG systems layers, an MPEG video sequence bitstream is completely self-constrained and is independent of other video bitstreams.

Each video sequence is divided into one or more groups of pictures, and each group of pictures is composed of one or more pictures of three different types: I-, P- and B-type. I-pictures (intra-coded pictures) are coded independently, entirely without reference to other pictures. P- and B-pictures are compressed by coding the differences between the reference picture and the current one, thereby exploiting the similarities from the current to reference picture to achieve high compression ratio. One example of a typical MPEG I-, P- and B-pictures arrangement in display order is illustrated in FIG. 1.

The first coded picture in each video sequence must be an I-picture. I-pictures may be occasionally inserted in different positions of a video sequence to prevent the coding error propagation. For I-pictures, the coding method used by MPEG is similar to that defined by JPEG [JPEG].

P-pictures (predictive-coded pictures) obtain predictions from temporally preceding I- or P-pictures in the sequence and B-pictures (bidirectionally predictive-coded pictures) obtain predictions from the nearest preceding and/or upcoming I- or P-pictures in the sequence. B-pictures may predict from preceding pictures, upcoming pictures, both, or neither. Similarly, P-pictures may predict from a preceding picture or use intra-coding.

A given sequence of pictures is encoded in a different order which they are displayed when viewing the sequence. An example of the encoding sequence of MPEG I-, P- and B-pictures is illustrated in FIG. 2.

Each component of a picture is made up of a two-dimensional (2-D) array of samples. Each horizontal line of samples in this 2-D grid is called a raster line, and each sample in a raster line is a digital representation of the intensity of the component at that point on the raster line. For color sequences, each picture has three components: a luminance component and two chrominance components. The luminance provides the intensity of the sample point, whereas the two chrominance components express the equivalent of color hue and saturation at the sample point. They are mathematically equivalent to RGB primaries representation but are better suited for efficient compression. RGB can be used if less efficient compression is acceptable.

The equivalent counterpart of a picture in broadcast video (for example analog NTSQ) is a frame, which is further divided into two fields. Each field has half the raster lines of the full frame and the fields are interleaved such that alternate raster lines in the frame belong to alternate fields.

1.2.2 MPEG Video Slice, Macroblock and Block

The basic building block of an MPEG picture is the macroblock. The macroblock consists of one 16×16 array of luminance samples plus one, two or four 8×8 blocks of samples for each of two the chrominance components. The 16×16 luminance array is actually composed of four 8×8 blocks of samples. The 8×8 block is the unit structure of the MPEG video codec and is the quantity that is processed as an entity in the codec.

Each MPEG picture is composed of slices, where each slice is a contiguous sequence of macroblocks in raster scan order. The slice starts at a specific address or position in the picture specified in the slice header. Slices can continue from one macroblock row to the next in—MPEG—I, but not in MPEG-2.

1.2.3 The Motion Estimation/Compensation in MPEG

If there is motion in the sequence, a better prediction is often obtained by coding differences relative to reference areas that are shifted with respect to the area being coded; a process known as motion compensation. The process of determining the motion vectors in the encoder is called motion estimation, and the unit area being predicted is a macroblock.

The motion vectors describing the direction and amount of motion of the macroblocks are transmitted to the decoder as part of the bitstream. The decoder then knows which area of the reference picture was used for each prediction, and sums the decoded difference with this motion compensated prediction to get the final result. The encoder must follow the same procedure when the reconstructed picture will be used for predicting other pictures. The vectors are the same for each pel in a same macroblock, and the vector precision is either a full pel or a half-pel accuracy.

1.2.4 The Discrete Cosine Transform in MPEG

The discrete cosine transform (DCT) is the critical part of both intra and inter coding for MPEG video compression. The DCT has certain properties that simplify coding models and make the coding more efficient in terms of perceptual quality measures.

Basically, the DCT is a method of decomposing the correlation of a block of data into the spatial frequency domain. The amplitude of each data in the spatial (coefficient) domain represents the contribution of that spatial frequency pattern in the block of data being analyzed. If only the low-frequency DCT coefficients are nonzero, the data in the block vary slowly with position. If high frequencies are present, the block intensity changes rapidly from pel to pel.

1.2.5 The Quantization in MPEG

When the DCT is computed for a block of pels, it is desirable to represent the high spatial frequency coefficients with less precision and the low spatial frequency ones with more precision. This is done by a process called quantization. A DCT coefficient is quantized by dividing it by a nonzero positive integer called a quantization value and rounding it to the nearest integer. The bigger the quantization value is, the lower the precision is of the quantized DCT coefficient. Lower-precision coefficients can be transmitted or stored with fewer bits. Generally speaking, the human eye is more sensitive to lower spatial frequency effects than higher ones, which is why the lower frequencies are quantized with higher precision.

As noted above, a macroblock may be composed of four W blocks of luminance samples and two 8×8 blocks of chrominance samples. A lower resolution is used here for the chrominance blocks because the human eye can resolve higher spatial frequencies in luminance than in chrominance.

In intra coding, the DCT coefficients are almost completely decorrelated—that is, they are independent of one another, and therefore can be coded independently. Decorrelation is of great theoretical and practical interest in terms of construction of the coding model. The coding performance is also actually influenced profoundly by the visually-weighted quantization.

In non-intra coding, the DCT does not greatly improve the decorrelation, since the difference signal obtained by subtracting the prediction from the reference pictures is already fairly well decorrelated. However, quantization is still a powerful compression technique for controlling the bit-rate, even if decorrelation is not improved very much by the DCT.

Since the DCT coefficient properties are actually quite different for intra and inter pictures, different quantization tables are used for intra and inter coding.

1.2.6 The Zigzag Scan and Variable Length Coding in MPEG

The quantized 2-D DCT coefficients are arranged according to a 1-D sequence known as the zigzag scanning order. In most case, the scan orders the coefficients in ascending spatial frequencies, which is illustrated in FIG. 1.3. By using a quantization table which strongly deemphasizes higher spatial frequencies, only a few low-frequency coefficients are nonzero in a typical block which results in a very high compression.

After the quantization, the 1-D sequence is coded losslessly so that the decoder can reconstruct exactly the same results. For MPEG, an approximately optimal coding technique, based on Huffman coding, is used to generate the tables of variable length codes needed for this task. Variable length codes are needed to achieve good coding efficiency, as very short codes must be used for highly probable events. The run-length-coding and some special defined symbols (such as end-of-block, EOB) permit efficient coding of DCTs with mostly zero coefficients.

1.2.7 MPEG Video Encoding Process

The MPEG video encoding is a process that reads a stream of input picture samples and produces a valid coded bitstream as defined in the specification. The high-level coding system diagram shown in FIG. 4 illustrates the structure of a typical encoder system 400. The-MPEG video divides the pictures in a sequence into three basic categories: I-, P- and B-pictures as described previously.

Since I-pictures are coded without reference to neighboring pictures in the sequence, the encoder only exploits the correlation within the picture. The incoming picture 405 will go directly through switch 410 into 2-D DCT module 420 to get the data in each block decomposed into underlying spatial frequencies. Since the response of the human visual system is much more sensitive to low spatial frequencies than high ones, the frequencies are quantized with a quantization table with 64 entries in quantization module 430, in which each entry is a function of spatial frequency for each DCT coefficient. In zigzag scan module 470, the quantized coefficients are then arranged qualitatively from low to high spatial frequency following a exact same or similar zigzag scan order shown in FIG. 3. The rearranged 1-D sequence data is further processed with an entropy coding (Huffman coding) scheme to achieve further compression. Simultaneously, the quantized coefficients are also used to reconstruct the decoded blocks using inverse quantization (module 440) and an inverse 2-D DCT (reconstruction module 450). The reconstructed blocks stored in frame store memory 455 is used as references for future differential coding for P- and B-pictures.

In contrast, P- and B-pictures are coded as the differences between the current macroblocks and the ones in preceding and/or upcoming reference pictures. If the image does not change much from one picture to the next, the difference will be insignificant and can be coded very effectively. If there is motion in the sequence, a better prediction can be obtained from pels in the reference picture that are shifted relative to the current picture pels (see, motion estimation module 460). The differential results will be further compressed by a 2-D DCT, quantization, zigzag and variable length coding modules (420, 430, 470, 480) similar to the I-picture case. Although the decorrelation is not improved much by the DCT for the motion compensated case, the quantization is still an effective way to improve the compression rate. So MPEG's compression gain arises from three fundamental principles: prediction, decorrelation, and quantization.

1.2.8 MPEG Video Decoding Process

The MPEG video decoding process, which is the exact inverse of the encoding process, is shown in FIG. 5. The decoder 500 accepts the compressed video bitstream 485 generated from MPEG video encoder 400 and produces output pictures 565 according to MPEG video syntax.

The variable length decoding and inverse zigzag scan modules (51-, 520) reverse the results of the zigzag and variable length coding to reconstruct the quantized DCT coefficients. The inverse quantization and inverse 2-D DCT modules (530, 540) are exact the same modules as those in the encoder. The motion compensation in motion compensation module 550 will only be carried out for nonintra macroblocks in P- and B-pictures.

1.3 MPEG-1 Video Standard

The MPEG-1 video standard is primarily intended for digital storage applications, such as compact disk (CD), DAT, and magnetic hard disks. It supports a continuous transfer rate up to 1.5 Mbit/s, and is targeted for non-interlaced video formats having approximately 288 lines of 352 pels and picture rates around 24 Hz to 30 Hz. The coded representation of MPEG-1 video supports normal speed forward playback, as well as special functions such as random access, fast play, fast reverse play, normal speed reverse playback, pause, and still pictures. The standard is compatible with standard 525 and 625-line television formats, and it provides flexibility for use with personal computer and workstation displays [MPEG1].

Each picture of MPEG-1 consists of three rectangular matrices of eight-bit numbers: a luminance matrix (Y) and two chrominance matrices (Cb and Cr). The Y-matrix must have an even number of rows and columns and the Cb and Cr matrices are one half the size of the Y-matrix in both horizontal and vertical dimensions.

The MPEG-1 video standard uses all the MPEG video compression concepts and techniques listed in section 1.2. The MPEG-1 video standard only defines the video bitstream, syntax and decoding specifications for the coded video bitstream, and leaves a number of issues undefined in the encoding process.

1.4 MPEG-2 Video Standard

The MPEG-2 video standard evolved from the MPEG-1 video standard and is aimed at more diverse applications such as television broadcasting, digital storage media, digital high-definition television (HDTV), and communication [MPEG2].

Additional requirements are added into the MPEG-2 video standard. It has to work across asynchronous transfer mode (ATM) networks and therefore needs improved error resilience and delay tolerance. It has to handle more programs simultaneously without requiring a common time base. It also has to be backwards compatible with the MPEG-1. Furthermore it is also targeted to code interlaced video signals, such as those used by the television industry. Much higher data transfer rates can be achieved by the MPEG-2 system.

As a continuation of the original MPEG-1 standard, MPEG-2 borrows a significant portion of its technology and terminology from MPEG-1. Both MPEG-2 and MPEG-1 use the same layer structure concepts (i.e. sequence, group, picture, slice, macroblock, block, etc.). Both of them only specify the coded bitstream syntax and decoding operation. Both of them invoke motion compensation to remove the temporal redundancies and use the DCT coding to compress the spatial information. Also, the basic definitions of I-, P- and B-pictures remain the same in both standards. However, the fixed eight bits of precision for the quantized DC coefficients defined in the MPEG-1 is extended to three choices in the MPEG-2: eight, nine and ten bits.

1.4.1 Fields, Frames and Pictures

At the higher bit-rates and picture rates that the MPEG-2 video targets, fields and interlaced video become important. The MPEG-2 video types are expanded from MPEG-1's I-, P- and B-pictures to I-field picture, I-frame picture, Meld picture, P-frame picture, B-field picture, and B-frame picture.

In an interlaced analog frame composed of two fields, the top field occurs earlier in time than the bottom field. In MPEG-2, coded frames may be composed of any adjacent pairs of fields. A coded I-frame may consist of a I-frame picture, a pair of I-field pictures, or an I-field picture followed by a Meld picture. A coded P-frame may consist of a P-frame picture or a pair of Meld pictures. A coded B-frame may consist of a B-frame picture or a pair of B-field pictures. In contrast to MPEG-I that allows only progressive pictures, MPEG-2 allows both interlaced and progressive pictures.

1.4.2 Chrominance Sampling

Comparing with MPEG-1's single chrominance sampling format, MPEG-2 defines three chrominance sampling formats. These are labeled 4:2:0, 4:2:2 and 4:4:4.

For 4:2:0 format, the chrominance is sampled 2:1 horizontally and vertically as in MPEG-1. For 4:2:2 format, the chrominance is subsampled 2:1 horizontally but not vertically. For 4:4:4 format, the chrominance has the same sampling for all three components and the decomposition into interlaced fields is the same for all three components.

1.4.3 Scalability

In order to cope with services like asynchronous transfer mode (ATM) networks and HDTV with conventional TV backward compatibility, more than one level of resolution and display quality are needed in the MPEG-2 video standard. MPEG-2 has several types of scalability enhancements that allow low-resolution or smaller images to be decoded from only part of the bitstream. MPEG-2 coded images can be assembled into several layers. The standalone base layer may use the nonscalable MPEG-1 syntax. One or two enhancement layers are then used to get to the higher resolution or quality. This generally requires fewer bits than independent compressed images at each resolution and quality, and at the same time achieve higher error resilience for network transmission.

There are four different scalability schemes in the MPEG-2 standard:

SNR scalability uses the same luminance resolution in the lower layer and a single enhancement layer. The enhancement layer contains mainly coded DCT coefficients and a small overhead. In high-error transmission environments, the base layer can be protected with good error correcting techniques, while the enhancement layer is allowed to be less resilient to errors.

Spatial scalability defines a base layer with a lower resolution and adds an enhancement layer to provide the additional resolution. In the enhancement layer, the difference between an interpolated version of the base layer and the source image is coded in order to accommodate two applications with different resolution requirements like conventional TV and HDTV.

Temporal scalability provides an extension to higher temporal picture rates while maintaining backward compatibility with lower-rate services. The lower temporal rate is coded by itself as the basic temporal rate. Then, additional pictures are coded using temporal prediction relative to the base layer. Some systems may decode both layers and multiplex the output to achieve the higher temporal rate.

Data partitioning split the video bitstream into two channels: the first one contains all of the key headers, motion vectors, and low-frequency DCT coefficients. The second one carries less critical information such as high frequency DCT coefficients, possibly with less error protection.

1.4.4 Profiles and Levels

Profiles and levels provide a means of defining subsets of the syntax and semantics of MPEG-2 video specification and thereby give the decoder the information required to decode a particular bitstream. A profile is a defined sub-set of the entire MPEG-2 bitstream. A level is a defined set of constraints imposed on parameters in the bitstream.

MPEG-2 defines five distinct profiles: simple profile (SP), main profile (MP), SNR scalable profile (SNR), spatial scalable profile (SPT) and high profile (HP). Four levels are also defined in MPEG-2: low (LL), main (ML), high-1440 (H-14) and high (HL) to put constraints on some of the parameters in each profile because the parameter ranges are too large to insist on compliance over the full ranges even with the four profile subsets defined in the MPEG-2 video syntax. Only some of combinations among the profiles and levels are valid. The permissible level combinations with the main profile and their parameter values are listed in Table 1.1.

TABLE 1.1

Level definitions for main profile

| Level | Parameters | Bound |
|---|---|---|
| High (MP@HL) | samples/line | 1920 |
| | lines/frame | 1152 |
| | frames/sec | 60 |
| | luminance rate | 62,668,800 |
| | bit-rate | 80 Mbit/s |
| High-1440 (MP@H-14) | samples/line | 1440 |
| | lines/frame | 1152 |
| | frames/sec | 60 |
| | luminance rate | 47,001,600 |
| | bit-rate | 60 Mbits/s |
| Main (MP@ML) | samples/line | 720 |
| | lines/frame | 576 |
| | frames/sec | 30 |
| | luminance rate | 10,368,000 |
| | bit-rate | 15 Mbits/s |
| Low (MP@LL) | samples/line | 352 |
| | lines/frame | 288 |
| | frames/sec | 30 |
| | luminance rate | 3,041,280 |
| | bit-rate | 4 Mbits/s |

The permissible level/layer combinations with high profile and their parameter values are listed in Table 1.2.

TABLE 1.2

Level definitions for high profile

| Level | Parameters | Enh. Layer bound | Base layer bound |
|---|---|---|---|
| High (HP@HL) | samples/line | 1920 | 960 |
| | lines/frame | 1152 | 576 |
| | frames/sec | 60 | 30 |
| | luminance rate | 83,558,400 | 19,660,800 |
| | bit-rate | 80 Mbits/s | 25 Mbits/s |
| High-1440 (HP@H-14) | samples/line | 1440 | 720 |
| | lines/frame | 1152 | 576 |
| | frames/sec | 60 | 30 |
| | luminance rate | 62,668,800 | 14,745,600 |
| | bit-rate | 60 Mbits/s | 20 Mbits/s |
| Main (HP@ML) | samples/line | 720 | 352 |
| | lines/frame | 576 | 288 |
| | frames/sec | 30 | 30 |
| | luminance rate | 14,745,600 | 3,041,280 |
| | bit-rate | 15 Mbits/s | 4 Mbits/s |

1.5 Hybrid Implementation Scheme for MTEG-2 Video System

From FIGS. 4 and 5 in section 1.2 one can see that the encoding and decoding systems for MPEG video consist of several function modules. The modules can be classified by their computational requirements:

(1) A vast amount of the operations are paralleled ones in nature and are best suitable for implementation on a parallel structured hardware component. These modules include the 2-D DCT, 2-D IDCT in both encoding/decoding processes, motion estimation, and motion compensation modules.

(2) The computations carried out are serial in nature and can only be carried out with a serial structure. These modules include zigzag scan, inverse scan, variable length coding and variable length decoding modules.

(3) The computations carried out are parallel in nature, but they can be easily carried out with serial structure without suffering much performance penalty. These modules include quantization and inverse quantization modules.

So far there has been a lot of different approaches for the implementing a of MPEG video encoding/decoding system. Table 1.3 gives a brief summary of some MPEG-1 and MPEG-2 video codec system implementations from some major video vendors [Joa96].

TABLE 1.3

MPEG vendors and products

| Vendor | Profile | Encoder included | Product |
|---|---|---|---|
| Array | MPEG-1 | y | H, S ,B |
| C-Cube | MPEG-1, 2 | y | H, C, B, S |
| CompCore | MPEG-1, ML + | n | D, S |
| Digital | MPEG-1 | y | S |
| Future Tel | MPEG-1 | y | B |
| GI | SP,MP,LL,ML | y | C, B, E |
| HMS | MPEG-1 | n | S |
| Hughes | MPEG-1 | n | B |
| IBM | MPEG-1, MP | y | C, B |
| Imedia | MP@ML | y | H, S |
| LSI | MPEG-1, MP@ML | n | C, B |
| Siemens | MP,SNR | y | E |
| Sun | MPEG-1 | y | S, B |
| TI | MPEG-1 | n | S, B |

Product codes area: H = hardware, S = software, B = boards, C = chips, E = products One can see from Table 1.3 that all the MPEG-2 video codec implementations so far have been limited to main level MP@ML. For the MPEG-2 encoding process, the biggest obstacles for real-time encoding are motion estimation and 2-D DCT/IDCT. For the decoding process the 2-D IDCT is the most computation intensive task that every real-time decoding scheme needs to overcome. The huge amount of computations required by motion estimation and 2-D DCT/IDCT prevent the current hardware and software implementations of MPEG-2 video to move from MP@ML to higher levels. Table 1.4 shows just how computational intensive the 2-D IDCT is for MPEG-2 video decoding process.

TABLE 1.4

Upper bounds for total sample rate and 8 × 8 IDCT rate

| Profile/level | High | High-1440 | Main | Low |
|---|---|---|---|---|
| Simple sample rate |  |  | SP@ML 31,104,000 |  |
| 8 × 8 IDCT/s |  |  | 486,000 |  |
| Main sample rate | MP@HL 188,006,400 | MP@H-14 141,004,800 | MP@ML 31,104,000 | MP@LL 12,165,120 |
| 8 × 8 IDCT/s | 2,937,600 | 2,223,200 | 486,000 | 190,080 |
| SNR sample rate |  |  | SNR@ML 31,104,000 | SNR@LL 12,165,120 |
| 8 × 8 IDCT/s |  |  | 486,000 | 190,080 |
| Spatial sample rate |  | Spt@H-14 86,054,400 |  |  |
| 8 × 8 IDCT/s |  | 1,344,600 |  |  |
| High sample rate | HP@HL 154,828,800 | HP@H-14 116,121,600 | HP@ML 26,680,320 |  |
| 8 × 8 IDCT/s | 2,419,200 | 1,814,400 | 416,880 |  |

From Table 1.4, it is clear that the number of 2-D IDCTs in the decoding process will increase from only 486,000 8×8 blocks per second for MP@ML to 2,937,600 blocks per second for MP@HL. Considering that most 8×8 2-D IDCT chips developed so far can carry out about 1,500,000 block transforms per second, and that the most powerful video digital signal processor (DSP) chip (TMS320C80 by TI) can only carry out 800,000 8×8 2-D IDCT per second [May95], a challenge for providing real-time MPEG-2 High-level hardware exists.

In Section 2, existing 1-D DCT/1DCT and 2-D DCT IDCT algorithms, as well the hardware implementation of these algorithms are reviewed. It is shown that all the existing 2-D DCT/1DCT chip implementations have made use of the separability property of the 2-D DCT/IDCT since very simple communication interconnection can be achieved by this approach. The algorithms that require fewer multiplications through direct matrix factorization/decomposition are not necessarily suitable for hardware implementation. Instead, the regularity of design and feasibility of layout implied by the row-column method seem to be the main concern for chip implementation.

2.0 DCT/IDCT ALGORITHMS AND HARDWARE IMPLEMENTATIONS

In this section, some of the most commonly used one-dimensional and two-dimensional Discrete Cosine Transform (DCT) and Inverse Discrete Cosine Transform (EDCT) algorithms are evaluated. Detailed implementation schemes of some algorithms are also presented.

2.1 Introduction

The development of fast algorithms for the Discrete Fourier Transform (DFT) by Cooley and Tukey [CT65] in 1965 has led to phenomenal growth in its applications in digital signal processing. Similarly, the discovery of the Discrete Cosine Transform (DCT) in 1974 [ANR74] and its potential applications have caused a significant impact in audio and video signal processing. Since 1974, the DCT/IDCT have been widely used in the image and speech data analysis, recognition and compression. They have become an integral part of several standards such as JPEG, MPEG, CCITT Recommendation H.261 and other video conference protocols.

A lot of fast algorithms and hardware architectures have been introduced for one-dimensional (1-D) and two-dimensional (2-D) DCT/IDCT computation. In section 2.2, an overview of major one-dimensional DCT/IDCT algorithms is presented. In section 2.3, the focus is on two-dimensional DCT/IDCT methods and their implementations. A summary is presented in section 2.4. Some typical methods to demonstrate how the 1-D DCT or 2-D DCT computation can be simplified are discussed. These methods can also apply to the 1-D IDCT or 2-D IDCT computation in general.

2.2 1-D DCT/IDCT Algorithms and Implementations

Given N data point x(0),x(1), . . . , x(N−1), the 1-D N-point DCT and IDCT(or DCT-II and IDCT-II defined by Wang) are defined as [Wan84]:

$$X(k) = \sqrt{\frac{2}{N}} C(k) \sum_{n=0}^{N-1} x(n)\cos\frac{(2n+1)k\pi}{2N} \quad (2.1)$$

$$x(n) = \sqrt{\frac{2}{N}} \sum_{k=0}^{N-1} C(k)X(k)\cos\frac{(2n+1)k\pi}{2N} \quad (2.2)$$

where $$C(k) = \begin{cases} 1/\sqrt{2}, & k=0 \\ 1, & \text{otherwise} \end{cases}$$

for k=0, 1, . . . , N−1.

Intrinsically, for N-point data sequences, both 1-D DCT and 1-D IDCT require $N^2$ real multiplications and N(N−1) real additions/subtractions. In order to reduce the number of multiplications and additions/subtractions required, various fast algorithms have been developed for computing the 1-D DCT and 1-D IDCT. The development of efficient algorithms for the computation of DCT/IDCT began immediately after Ahmed et al. reported their work on the DCT [ANR74].

One initial approach for the computation of DCT/IDCT is via Fourier Cosine Transform and its relations to the Discrete Fourier Transform (DFT) were exploited in the initial developments of its computational algorithms. The approach of computing the DCT/IDCT indirectly using the FFT is also borrowed by other researchers to obtain fast DCT/IDCT algorithms via other kinds of discrete transforms (such as Walsh-Hadamard Transform, Discrete Hartley Transform, etc.).

In addition, fast DCT/IDCT algorithms can also be obtained by direct factorization of the DCT/IDCT coefficient matrices. When the components of this factorization are sparse, the decomposition represents a fast algorithm. Since the factorization is not unique, there exist a lot of different forms of fast algorithms. The factorization schemes often fall into the decimation-in-time (DIT) or the decimation-in-frequency (DEF) category [RY90].

Furthermore, there also exist other approaches to develop fast DCT/IDCT algorithms. The fast computation can be obtained through recursive computation [WC95, AZK95], planar rotations [LLM89], prime factor decomposition [YN85], filter-bank approach [Chi94] and Z-transform [SL96], etc.

2.2.1 Indirect 1-D DCT via Other Discrete Transforms

The Fourier Cosine Transform can be calculated using the Fourier Transform of an even function. Since there exist a lot of Fast Fourier Transform (FFT) algorithms, it is natural to first look at the existing FFT algorithms to compute DCT.

Let x(0),x(1), . . . , x(N−1) be a given sequence. Then an extended sequence {y(n)}, which is symmetric about the (2N−1)/2 point, can be constructed as [RY90]:

$$\begin{aligned} y(n) &= x(n) & n=0,1,\ldots,N-1 \\ &= x(2N-n-1) & n=N, N+1, \ldots, 2N-1 \end{aligned} \quad (2.3)$$

Since the N-point Discrete Fourier Transform is defined as:

$$Z(k) = \sum_{n=0}^{N-1} z(n)W_N^{nk}, k=0,1,\ldots,N-1 \quad (2.4)$$

The 2N-point sequence {y(n)} defined above can be used to calculate the 2N-point DFT as:

$$Y(k) = \sum_{n=0}^{2N-1} y(n)W_{2N}^{nk}, k=0,1,\ldots,2N-1 \quad (2.5)$$

where W2N denotes exp(−j2π/2N). The above formula can be easily decomposed to $$\begin{aligned} Y(k) &= \sum_{n=0}^{N-1} x(n)W_{2N}^{nk} + \sum_{n=N}^{2N-1} y(n)W_{2N}^{nk} \\ &= \sum_{n=0}^{N-1} x(n)W_{2N}^{nk} + \sum_{n=N}^{2N-1} x(2N-n-1)W_{2N}^{nk} \\ &= \sum_{n=0}^{N-1} x(n)W_{2N}^{nk} + \sum_{n=0}^{N-1} x(n)W_{2N}^{(2N-n-1)k} \\ &= \sum_{n=0}^{N-1} x(n)\left[W_{2N}^{nk} + W_{2N}^{-(n+1)k}\right], k=0,1,\ldots,2N-1 \end{aligned} \quad (2.3)$$

Multiplying both sides of Eq. (2.6) by a factor of $$\sqrt{\frac{2}{N}} C(k) \frac{1}{2} W_{2N}^{k/2},$$

where C(k) is defined in Eq. (2.1) and (2.2), we directly obtain the N-point DCT results as $$X(k) = \sqrt{\frac{2}{N}} C(k) \sum_{n=0}^{N-1} x(n)\cos\frac{(2n+1)k\pi}{2N} = \sqrt{\frac{2}{N}} C(k)\frac{1}{2} W_{2N}^{k/2} Y(k) \quad (2.7)$$

for k=0, 1, . . . , N−1. Thus, the N-point DCT X(k) can easily be calculated from 2N-point DFT Y(k) by multiplying by the scale factor $$\sqrt{\frac{2}{N}} C(k)\frac{1}{2} W_{2N}^{k/2}.$$

When the sequence {x(n)} is real, {y(n)} is real and symmetric. In this case, {Y(k)} I can be obtained via two N-point FFTs rather than by a single 2N-point FFT [Sor87, RY90]. Since an N-point FFT requires N $\log_2$ N complex operations in general, the N-point DCT X(k) can be computed with 2N $\log_2$ N complex operations plus the scaling with $$\sqrt{\frac{2}{N}} C(k)\frac{1}{2} W_{2N}^{k/2}$$

In the same spirit, the N-point DCT computation may also be calculated via other transforms such as Walsh-Hadamard Transform (WHT) [Ven88] for N≦16 and Discrete Hartley Transform (DHT) [Mal87]. The WHT is known to be fast since the computation involves no multiplications. Thus an algorithm for DCT via WHT may well utilize this advantage.

The DHT, on the other hand, is very similar to DFT. The detailed implementation of these two transforms can be found in [RY90].

2.2.2 1-D DCT via Direct Factorizations

Consider the computation of the DCT of an input sequence {x(n)} I and let this sequence be represented by a (N×1) column vector x, then the transformed sequence (in vector form) of DCT computation can be expressed in vector notation as follows [RY90]:

$$X = \begin{bmatrix} X(0) \\ \vdots \\ \vdots \\ X(N-1) \end{bmatrix} = \sqrt{\frac{2}{N}} A_N x = \sqrt{\frac{2}{N}} A_N \begin{bmatrix} x(0) \\ \vdots \\ \vdots \\ x(N-1) \end{bmatrix} \quad (2.8)$$

where $A_N$ is an N×N coefficient matrix and each element of $A_N$ is defined as:

$$a_{ij} = C(i) \cos \frac{(2j+1)i\pi}{2N} \quad (2.9)$$

When the matrix $A_N$ is factored into sparse matrices, the number of computations is reduced.

One way to achieve a fast 1-D DCT computation by sparse matrix factorizations is as follows: Assume N is a power of 2, $A_N$ can then be decomposed in the form $$A_N = P_N \begin{bmatrix} A_{N/2} & 0 \\ 0 & R_{N/2} \end{bmatrix}_{N \times N} B_N \quad (2.10)$$

where $A_{N/2}$ is the coefficient matrix for a N/2-point DCT; $P_N$ is a permutation matrix which permutes the even rows in increasing order in the top half and the odd rows in decreasing order in the bottom half; $B_N$ is a butterfly matrix which can be expressed in terms of the identity matrix $I_{N/2}$ and the opposite identity matrix $\tilde{I}_{N/2}$ (i.e. the elements position on the opposite diagonal are equal to 1, others are 0) as follows:

$$B_N = \begin{bmatrix} I_{N/2} & \tilde{I}_{N/2} \\ \tilde{I}_{N/2} & -I_{N/2} \end{bmatrix}_{N \times N} \quad (2.11)$$

$R_{N/2}$ is the remaining (N/2×N/2) block in the factor matrix which can be obtained by reversing the orders of both the rows and columns of an intermediate matrix $R_{N/2}$, where the definition of each element of $R_{N/2}$ is:

$$r_{ij} = \cos \frac{(2i+1)(2j+1)\pi}{2N} \quad i, j = 0, 1, \ldots, N/2 - 1 \quad (2.12)$$

The factorization of Eq. (2.10) is only partly recursive because the matrix $R_{N/2}$ can not be recursively factored. However, there is regularity in its factorization, where it can be decomposed into five types of inatrixfactors and all of them have no more that two non-zero elements in each row [Wan83]. And only $$\left( N \log_2 N - \frac{3N}{2} + 4 \right)$$

real multiplications and $$\frac{3N}{2}(\log_2 N - 1) + 2$$

real additions are required by this approach.

The key of this approach is that the $A_N$ is reduced in terms of $A_{N/2}$. Take a 4-point sequence for example, the matrix $A_4$ can be decomposed as:

$$A_4 = \begin{bmatrix} 1 & 0 & 0 & 0 \\ 0 & 0 & 0 & 1 \\ 0 & 1 & 0 & 0 \\ 0 & 0 & 1 & 0 \end{bmatrix} \begin{bmatrix} 1/\sqrt{2} & 1/\sqrt{2} & 0 & 0 \\ \cos(\pi/4) & \cos(\pi/4) & 0 & 0 \\ 0 & 0 & -\cos(\pi/8) & \cos(3\pi/8) \\ 0 & 0 & \cos(3\pi/8) & \cos(\pi/8) \end{bmatrix} \begin{bmatrix} 1 & 0 & 0 & 1 \\ 0 & 1 & 1 & 0 \\ 0 & 1 & -1 & 0 \\ 1 & 0 & 0 & -1 \end{bmatrix} \quad (2.13)$$

where $$P_4 = \begin{bmatrix} 1 & 0 & 0 & 0 \\ 0 & 0 & 0 & 1 \\ 0 & 1 & 0 & 0 \\ 0 & 0 & 1 & 0 \end{bmatrix}, B_4 = \begin{bmatrix} 1 & 0 & 0 & 1 \\ 0 & 1 & 1 & 0 \\ 0 & 1 & -1 & 0 \\ 1 & 0 & 0 & -1 \end{bmatrix} \quad (2.14)$$

$$A_2 = \begin{bmatrix} 1/\sqrt{2} & 1/\sqrt{2} \\ \cos(\pi/4) & \cos(3\pi/4) \end{bmatrix}, \bar{R}_2 = \begin{bmatrix} -\cos(\pi/8) & \cos(3\pi/8) \\ \cos(\pi/4) & \cos(3\pi/4) \end{bmatrix}$$

Alternatively, some factorization schemes have adopted decimation-in-time (DIT) or decimation-in-frequency (DIF) approach, which achieve fast computation through rearranging the input sequence {x(n)} or output sequence {X(k)}, respectively.

Looking at the DIT approach for example. If the scale factors in Eq. (2.1) are left out for convenience, the transformed sequence X(k) can be expressed as:

$$X(k) = \sum_{n=0}^{N-1} x(n) \cos \frac{(2n+1)k\pi}{2N}, \quad k = 0, 1, \ldots, N-1 \quad (2.15)$$

There are two steps in the DIT approach, and their objective is to reduce an N-point DCT to an N/2-point DCT by permutation of the input sample points in the time domain. The first step in the DIT algorithm consists of a rearrangement of the input sample points. The second step reduces the N-pomit transform to two N/2-point transforms to establish the recursive aspect of the algorithm [RY90].

Deefining $$G(k) = \sum_{n=0}^{N/2} [x(2n) + x(2n-1)] \cos \frac{kn\pi}{N/2} \text{ and} \quad (2.16)$$

$$H(k) = \sum_{n=0}^{N/2-1} [x(2n) + x(2n+1)] \cos \frac{(2n+1)k\pi}{N},$$

$$k = 0, 1, \ldots, N/2 - 1$$

with x(−1)=x(N)=0 as the initial conditions for x(n).

Using the properties of the cosine functions, it is easy to see that Eq. (2.16) can be substituted into Eq. (2.15), resulting in:

$$X(k) = \frac{1}{2} \frac{[G(k) + H(k)]}{\cos(k\pi/N)} \text{ and} \tag{2.17}$$

$$X(N-k-1) = \frac{1}{2}\left[\frac{G(k+1) + H(k+1)}{\cos((N-k-1)\pi/2N)}\right],$$

$$k = 0, 1, \ldots, N/2 - 1$$

In Eq. (2.16), the sequence $\{H(k)\}$ is obtained as a DCT with N/2 sample points and $\{G(k)\}$ is obtained as a DCT with (N/2+1) sample points. Each of these smaller transform can be further reduced, which leads to the desired recursive structure. Excluding scaling and normalization, it is found that for an N-point (N being power of 2) sequence $\{x(n)\}$, the DIT algorithm for DCT requires $((N/2)\log_2 N + N/4)$ real multiplications and $((3N/2-1)\log_2 N + N/4 + 1)$ real additions [RY90].

When the rearrangement of the sample points results in the transformed sequence being grouped into even- and odd-frequency indexed portions, the decomposition is said to constitute a DIF algorithm. For an N-point (radix-2) sequence $\{x(n)\}$, the DIF algorithm for DCT requires (N/2) $\log_2 N$ real multiplications and $((3N/2)\log_2 N - N + 1)$ real additions [RY90].

2.2.3 1-D DCT Based on Recursive Algorithms

In addition to the algorithms described in the previous sections, there exist many more other different kind approaches. Using some well-known recursive algorithms to compute DCT/IDCT is one of them which can achieve the goal of fast computation. Two typical ones are shown here: Chebyshev Polynomial recurrence and Clenshaw's recurrence formula.

One fast recursive algorithm for computing the DCT based on the Chebyshev Polynomial factorization is proposed by Wang and Chen [WC95]. Recall the following trigonometric identity:

$$\cos(\gamma\alpha) = 2 \cos \alpha \cos[(\gamma-1)\alpha] - \cos[(\gamma-2)\alpha] \tag{2.18}$$

which, by the way, can be proved using the Chebyshev polynomial. If one leaves out the scale factors in Eq. (2.1) for convenience (i.e. use Eq. (2.15) as the definition of the 1-D DCT) and define the recursive variables as $$P(k, n) = \cos\frac{(2n+1)k\pi}{2N} = \cos\frac{(2n+1)\alpha}{2}, \, \alpha = k\pi/N \text{ and} \tag{2.19}$$

$$A(k, n) = \sum_{n=0}^{m} x(n)\cos\frac{(2n+1)k\pi}{2N} = \sum_{n=0}^{m} x(n)P(k, n)$$

the 1-D DCT can be computed using the following Chebyshev polynomial recurrence:

$$P(k,-1) = P(k,0) = \cos(\alpha/2) \text{ and}$$

$$P(k,n+1) = 2 \cos(\alpha)P(k,n) - P(k,n-1) \tag{2.20}$$

$$A(k,-1) = 0 \text{ and}$$

$$A(k,n) = A(k,n-1) + x(n)P(k,n) \tag{2.21}$$

where $X(k) = A(k, N-1)$, $k = 0, 1, \ldots, N-1$. Thus the $X(k)$ can be calculated in N recursive steps from the input sequence $x(n)$ using Eq. (2.20) and (2.21). For an N-point sequence $\{x(n)\}$, this recursive algorithm requires $2N(N-1)$ real multiplications and real additions.

In addition, Aburdene et al. proposed another fast recursive algorithm for computing the DCT based on the Clenshaw's (or Goertzel's as called in other papers) recurrence formula [AZK95]. The Clenshaw's recurrence formula states that considering a linear combination of the form $$f(x) = \sum_{n=0}^{N} c(n)F(x, n) \tag{2.22}$$

in which F(x,n) obeys a recurrence relation $$F(x,n+1) = \alpha(x,n)F(x,n) + \beta(x,n)F(x,n-1) \tag{2.23}$$

for some functions $\alpha(x,n)$ and $\beta(x,n)$, then the sum f(x) can be computed as $$f(x) = c(N)F(x,N) - \beta(x,n)F(x,N-1) - F(x,N)\psi(N-2) \tag{2.24}$$

where $\{\psi(n)\}$ can be obtained from the following recurrence relations:

$$\psi(-2) = \psi(-1) = 0 \text{ and}$$

$$\psi(n) = [\psi(n-2) - \alpha(x,n)\psi(n-1) - c(n)]/\beta(x,n+1),$$
$$n = 0, 1, \ldots, N-1 \tag{2.25}$$

Defining $$\lambda_k = k\pi/N \text{ and}$$

$$F(\lambda_k, n) = \cos[(n+\tfrac{1}{2})(k\pi/N)] = \cos[(n+1/2)\lambda_k] \tag{2.26}$$

the 1-D DCT can be expressed as $$f(\lambda_k) = X(k) = \sum_{n=0}^{N-1} x(n)F(\lambda_k, n), \, k = 0, 1 \ldots, N-1 \tag{2.27}$$

The calculation of $F(\lambda_k, n)$ can be made recursively using the identity $$\cos[(n+3/2)\lambda_k] = 2 \cos(\lambda_k)\cos[(n+1/2)\lambda_k] - \cos[(n-1/2)\lambda_k] \tag{2.28}$$

to generate the recurrence expression for $F(\lambda_k, n+1)$ as $$F(\lambda_k, n+1) = 2 \cos(\lambda_k)F(\lambda_k, n) - F(\lambda_k, n-1) \tag{2.29}$$

Comparing Eq. (2.23) and (2.29), one can see that the terms $\alpha(x,n)$ and $\beta(x,n)$ in Eq. (2.23) should be chosen as 2 cos $(\lambda_k)$ and $-1$.

Substitute Eq. (2.24) in Eq. (2.27), we can find $$X(k) = x(N-1)F(\lambda_k, N-1) - F(\lambda_k, N-2)\psi(N-2) - F(\lambda_k, N-1)\psi(N-3) \tag{2.30}$$

$$= (-1)^k[x(N-1)\cos(\lambda_k/2) + \cos(3\lambda_k/2)\psi(N-2) - \cos(\lambda_k/2)\psi(N-3)]$$

$$= (-1)^k\cos(\lambda_k/2)[\psi(N-1) - \psi(N-2)]$$

where $\psi(n)$ is obtained from Eq. (2.25) as $\psi(-2)=\psi(-1)=0$ and $$\psi(n)=2\cos(\lambda_k)\psi(n-1)-\psi(n-2)+x(n), n=0, 1, \ldots, N-1 \quad (2.31)$$

Thus, $\psi(n)$ can be recursively generated from the input sequence $x(n)$ according Eq. (2.31). And at the Nth step, $X(k)$ can be evaluated by Eq. (2.30) for $k=0, 1, \ldots, N-1$. For an N-point sequence $\{x(n)\}$, this recursive algorithm requires about $N^2$ real multiplications and real additions.

2.2.4 1-D DCT/IDCT Hardware Implementations

The algorithms that compute the DCT/IDCT indirectly via other discrete transforms are normally not the good candidate for hardware implementation. The conversion between the input and output data of two different transforms is generally complicated. Many transforms, like FFT and WHT, use complex architectures, which make the hardware implementations of the 1-D DCT even less efficient. The advantage of computing the 1-D DCT via DFT is that the standard FFT routines and implementations are available that can be directly used in the DCT/IDCT.

TABLE 2.1

Summary of some 1-D DCT algorithms

| Algorithm | 1-D DCT via | Number of Multiplications | Arithmetic Types | Interconnection Complexity |
|---|---|---|---|---|
| [Har76] | DFT/FFT | $2N\log_2 N$ | Complex | High |
| [Wan83] | Direct Factor. | $N\log_2 N - 3N/2 + 4$ | Real | Very High |
| [RY90] | Factor./DIT | $(N/2)\log_2 N + N/4$ | Real | High |
| [WC95] | Recursive | $2N(N-1)$ | Real | Low |
| [AZK95] | Recursive | $N^2$ | Real | Low |

The algorithms that compute the DCT/IDCT via direct factorizations have the advantages that they are reasonably fast and recursive in some degree. These algorithms make full use of the sparseness of the DCT/IDCT coefficient matrix and require much fewer multiplications and additions/subtractions. But the complicated index mapping of global interconnection from the input and to the output data makes the hardware implementations rather difficult.

Alternatively, although the DCT/IDCT algorithms based on recursive approaches do not necessarily use fewer operations than other discrete transforms, the recursive nature makes them easy to be implemented with relatively simple processing elements (PE) and simple interconnections among the PEs. Identical or similar structured PEs in a hardware implementation can greatly reduce the cost of the design and layout process. It has been shown that time recursive algorithms and the resulting DCT/IDCT architectures are well suited for VLSI implementation.

One of the recursive schemes that can be easily adopted for the 1-D DCT hardware implementation is the Chebyshev polynomial method (described in section 2.2.3). The basic function cell to compute the 1-D DCT based on this method is shown in FIG. 6 [WC95]. For N-point input sequence, total N cells are required for $k=0, 1, \ldots, N-1$. Since these N cells have identical structure, functional design and layout cost can be reduced correspondingly.

Another example of the 1-D DCT hardware implementation using recursive scheme is based on Clenshaw's recurrence formula (described in section 2.2.4). The hardware structure of the implementation is shown in FIG. 7 [AZK95].

2.3 2-D DCT/IDCT Algorithms and Implementations

Similar to the definitions of the 1-D DCT/IDCT, the forward and inverse 2-D Discrete Cosine Transform (2-D DCT/IDCT) of an input sequence $x(m,n)$, $0 \leq m,n < N$, are defined as:

$$X(k, l) = \frac{2}{N}C(k)C(l)\sum_{m=0}^{N-1}\sum_{n=0}^{N-1} x(m, n)\cos\frac{(2m+1)k\pi}{2N}\cos\frac{(2n+1)l\pi}{2N} \quad (2.32)$$

where $$x(m, n) = \frac{2}{N}\sum_{k=0}^{N-1}\sum_{l=0}^{N-1} C(k)C(l)X(k, l)\cos\frac{(2m+1)k\pi}{2N}\cos\frac{(2n+1)l\pi}{2N} \quad (2.33)$$

where $C(k), C(l) = \begin{cases} 1/\sqrt{2}, & k, l = 0 \\ 1, & \text{otherwise} \end{cases}$ For an N×N point input sequence, both the 2-D DCT and 2-D IDCT require $O(N^4)$ real multiplications and corresponding additions/subtractions, assuming the computations are carried out by brute force. In order to improve the efficiency of 2-D DCT and 2-D IDCT computations, various fast computational algorithms and corresponding architectures have been proposed. In general, all of these algorithms can be broadly classified into 3 basic categories: 1) compute the 2-D DCT/IDCT indirectly via other discrete fast transforms, 2) decompose the 2-D DCT/IDCT into two 1-D DCT/IDCTs, and 3) compute the 2-D DCT/IDCT based on direct matrix factorization or decomposition.

Computation of the 2-D DCT/IDCT via other discrete fast transforms manages to take advantage of the existence of other kinds 2-D discrete transform algorithms and architectures. The best candidates that can be employed to perform the 2-D DCT/IDCT, for example, are the 2-D FFT and 2-D WHT [NK83, Vet85].

However, the decomposition of a 2-D DCT/IDCT into two 1-D DCT/IDCTs, which conventionally is also called the Row-Column Method (RCM), evaluates the 1-D DCT/IDCT in row-column-wise or column-row-wise form. That is, it starts by processing the row (or column) elements of input data block as a 1-D DCT/IDCT and store the results in an intermediate memory; it then processes the transposed column (or row) elements of the intermediate results to further yield the 2-D DCT/IDCT results [CW95, SL96, MW95, Jan94]. Since the RCM reduces the 2-D DCT into two separate 1-D DCTs, existing 1-D algorithms listed in section 2.2 can be directly used so that the computational complexity can be simplified.

The direct 2-D factorization methods work directly on the 2-D data set and coefficient matrices. This kind of approach mainly concentrates on reducing the redundancy within the 2-D DCT/IDCT computations so that much fewer multiplications would be required [DG90, CL91, Lee97].

2.3.1 2-D DCT via Other Discrete Transforms

The close relationship between the DCT and the DFT can also be exploited in the two-dimensional case.

As shown by Nasrabadi and King [NK83], a rearrangement of the input matrix elements easily leads to expressions involving evaluation of two-dimensional DFTs. Leaving the scale factors out of Eq. (2.32) and Eq. (2.33), and treating $x(m,n)$ and $X(k,l)$ as scaled and normalized two-dimensional input and output data as $$X(k, l) = \sum_{m=0}^{N-1}\sum_{n=0}^{N-1} x(m, n)\cos\frac{(2m+1)k\pi}{2N}\cos\frac{(2n+1)l\pi}{2N} \quad (2.34)$$

-continued $$x(m, n) = \sum_{k=0}^{N-1}\sum_{l=0}^{N-1} X(k, l)\cos\frac{(2m+1)k\pi}{2N}\cos\frac{(2n+1)l\pi}{2N} \quad (2.35)$$

Define an intermediate N×N transform sequence $y(m,n)=x(2m,2n), m,n=0, 1, \ldots, N/2-1$ $y(m,n)=x(2N-2m-1,2n), m=N/2, \ldots, N-1, n=0, 1, \ldots, N/2-1$ $y(m,n)=x(2m,2N-2n-1), m=0, 1, \ldots, N/2-1, n=N/2, \ldots, N-1$ and $y(m,n)=x(2N-2m-1,2N-2n-1), m,n=N/2, \ldots, N-1 \quad (2.36)$ where the 2-D DFT of y(m,n) can be calculated as:

$$Y(k, l) = \sum_{m=0}^{N-1}\sum_{n=0}^{N-1} y(m, n)W_N^{mk} W_N^{nl} \quad (2.37)$$

and the $W_N^k$ denotes $\exp(-j2k\pi/N)$.

Furthermore, using a simple compound angle formula for the cosine functions, it is possible to derive the following similarly to Eq. (2.7) as $X(k,l)=(1/2)Re\{W_{4N}^k[W_{4N}^l Y(k,l)+W_{4N}^{-l}Y(k,N-1)]\} \quad (2.38)$ Above Eq. (2.38) is sometimes referred to as representing "phasor-modified" DFT components. And it can be further simplified as $X(k,l)=(\frac{1}{2})Re\{A(k,l)+jA(k,N-1)\} \quad (2.39)$ where $A(k,l)=W_{4N}^k W_{4N}^l Y(k,l)$ and $A(k,N-1)=W_{4N}^k W_{4N}^l Y(k,N-1) \quad (2.40)$ Since Y(k,l) is the 2-D DFT, its implementation can be realized by using any of the available 2-D algorithms. One of the most efficient methods proposed by Nussbaumer is to compute the 2-D real DFT by means of the polynomial transforms [Nus81]. The reduction in computational complexity is obtained by mapping the DFT on the index m to polynomial transform. Overall, an N×N point DCT is mapped onto N DFTs of lengths N. For real N×N input sequence $\{x(m,n)\}$, the 2-D DCT requires $((N^2/2-1)\log_2 N+N^2/3-2N-8/3)$ complex multiplications and $((5N^2/2)\log_2^2 N+N^2/3-6N-62/3)$ complex additions.

Besides, the 2-D DCT can also be carried out via the 2-D Walsh-Hadamard Transform (WHT) [Vet85].

2.3.2 2-D DCT by Row-Column Method (RCM)

Like some other discrete transforms, such as DFT, WHT, ST, HT, etc., the 2-D DCT is a separable transform. And Eq. (2.32) can also be expressed as $$X(k, l) = \sqrt{\frac{2}{N}} C(k) \sum_{m=0}^{N-1}\left\{\sqrt{\frac{2}{N}} C(l)\sum_{n=0}^{N-1} x(m, n)\cos\frac{(2n+1)l\pi}{2N}\right\}\cos\frac{(2m+1)k\pi}{2N} \quad (2.41)$$

where $k, l = 0, 1, \ldots, N-1$.

The inner summation $$\sqrt{\frac{2}{N}} C(l)\sum_{n=0}^{N-1} x(m, n)\cos\frac{(2n+1)l\pi}{2N}$$

is an N-point 1-D DCT of the rows of x(m,n), whereas the outer summation represents the N-point 1-D DCT of the columns of the "semi-transformed" matrix, whose elements are $$\sqrt{\frac{2}{N}} C(l)\sum_{n=0}^{N-1} x(m, n)\cos\frac{(2n+1)l\pi}{2N},$$

where $m,l=0, 1, \ldots, N-1$.

This implies that a 2-D N×N DCT can be implemented by N's N-point DCTs along the columns of x(m,n), followed by N's N-point DCTs along the rows of the results after the column transformations. In practice, the order in which the row transform and the column transform are done is theoretically immaterial.

All 1-D DCT fast algorithms discussed in section 2.2 can be used here to simplify the 2-D DCT computation, which requires totally 2N's 1-D DCTs. For example, if the 1-D DCT is carried out via the 1-D FFT, approximate $2N\times(2N \log_2 N)$ complex operations plus the scaling are required.

2.3.3 2-D DCT Based on Direct Matrix Factorization/Decomposition

In the RCM, the computation reduction applies only to one 1-D array at a time. That makes these algorithms less efficient and not quite modular in structure. Haque reported a 2-D fast DCT algorithm based on a rearrangement of the elements of the two-dimensional input matrix into a block matrix form [Haq85]. Each block of the matrix is then calculated via a "half-size" 2-D DCT.

The N×N DCT block decomposition of Eq. (2.34) is based upon the following procedures:

(1) Decompose the N×N input data x(m,n) into four (N/2)×(N/2) sub-blocks:

$p(m,n)=x(m,n), q(m,n)=x(m,N-n-1),$ $r(m,n)=x(N-m-1,n), s(m,n)=x(N-m-1,N-n-1) \quad (2.42)$ (2) Arrange the sub-blocks as a block column vector and multiply by a 4×4 block Walsh-Hadamard matrix H to get four (N/2)×(N/2) sub-blocks:

$$\begin{bmatrix}[g1']\\[g2']\\[g3']\\[g4']\end{bmatrix} = \begin{bmatrix}1 & 1 & 1 & 1\\1 & -1 & 1 & -1\\1 & 1 & -1 & -1\\1 & -1 & -1 & 1\end{bmatrix}\begin{bmatrix}[p(m,n)]\\[q(m,n)]\\[r(m,n)]\\[s(m,n)]\end{bmatrix} \quad (2.43)$$

(3) Scale these sub-blocks with a diagonal scale matrix W:

[g1]=[g1'], [g2]=[g2']W,

[g3]=[g3'], [g4]=[g4']W            (2.44)

where W=(1/2) diag [1/cos(π/2N), 1/cos(3π/2N), ..., 1/cos((N−1)π/2N)].

(4) Compute the four (N/2)×(N/2) 2-D DCTs of the scaled sub-blocks [g1], [g2], [g3] and [g4] to obtain the results [G1(k,l)], [G2(k,l)], [G3(k,l)] and [G4(k,l)].

(5) Denote the even-even, even-odd, odd-even and odd-odd elements of the transformed matrix [X(k,l)] in Eq. (2.35) by four (N/2)×(N/2) sub-blocks:

$P(k,l)=X(2k,2l)$, $Q(k,l)=X(2k,2l+1)$, $R(k,l)=X(2k+1,2l)$, $S(k,l)=X(2k+1,2l+1)$            (2.45)

(6) Convert [G1(k,l)], [G2(k,l)], [G3(k,l)] and [G4(k,l)] to [P(k,l)], [Q(k,l)], [R(k,l)] and [S(k,l)] by:

[P(k,l)]=[G1(k,l)], [Q(k,l)]=L[G2(k,l)],

[Q(k,l)]=[G2(k,l)]$L^T$[Q(k,l)]=L[G2(k,l)]$L^T$            (2.46)

where L is an (N/2)×(N/2) lower triangular matrix of the form $$L = \begin{bmatrix} 1 & 0 & 0 & \ldots & \ldots & 0 \\ -1 & 1 & 0 & \ldots & \ldots & 0 \\ \ldots & \ldots & \ldots & \ldots & \ldots & 0 \\ \pm 1 & \ldots & \ldots & \ldots & -1 & 1 \end{bmatrix} \quad (2.47)$$

The computation of the 2-D DCT based on the Haque's algorithm requires $((3/4)N^2 \log_2 N)$ multiplications and $(3N^2 \log_2 N - 2N^2 + 2N)$ additions [Haq85, RY90].

As an alternation, Cho and Lee proposed another approach for decomposing a 2-D DCT [CL91]. Using the following trigonometric relation $$\cos\frac{(2m+1)k\pi}{2N}\cos\frac{(2n+1)l\pi}{2N} = \quad (2.48)$$

$$\frac{1}{2}\left[\cos\frac{(2m+1)k\pi + (2n+1)l\pi}{2N} + \cos\frac{(2m+1)k\pi - (2n+1)l\pi}{2N}\right]$$

the 2-D DCT in Eq. (2.34) can be rewritten as $X(k,l)=\frac{1}{2}[A(k,l)+B(k,l)]$            (2.49)

where $$A(k,l) = \sum_{m=0}^{N-1}\sum_{n=0}^{N-1} x(m,n)\cos\frac{(2m+1)k\pi + (2n+1)l\pi}{2N} \text{ and} \quad (2.50)$$

$$B(k,l) = \sum_{m=0}^{N-1}\sum_{n=0}^{N-1} x(m,n)\cos\frac{(2m+1)k\pi - (2n+1)l\pi}{2N}$$

After some complicated data reordering and manipulations, Cho and Lee have shown that A(k,l) and B(k,l) can be expressed in terms of N's 1-D DCTs so that an N×N DCT can be obtained from N's separate 1-D DCTs [CL91].

2.3.4 2-D DCT/IDCT Hardware Implementations

A lot of papers have been written lately on the development of VLSI and chip implementation of the 2-D DCT/IDCT. Most of the works have concentrated on the basic block size of W, because the W block has been found to be able to provide sufficient details and localized activities of the image such that it has been adopted as the standard 2-D DCT/IDCT size in almost all existing image and video processing and compression protocols.

TABLE 2.2

Summary of some 2-D DCT algorithms

| Algorithm | 2-D DCT via | Number of Multiplications | Arithmetic Types | Inter-connection Complexity |
|---|---|---|---|---|
| [Nau81] | DFT/FFT | $(N^2/2 - 1) \log_2 N + N^2/3 - 2N - 8/3$ | Complex | High |
| [WC95] | RCM/Recursive | $4 N^2 (N - 1)$ | Real | Low |
| [CSF77] | RCM/Factorization | $N3$ | Real | Medium |
| [CL91] | Direct 2-D Factorization | $N3$ | Real | Very High |
| [Haq85] | Direct 2-D Factorization | $(3/4) N^2 \log_2 N$ | Real | Very High |

Because of the limitation of areas and interconnections in VLSI implementation, not much of the chip development work has included the mapping of fast, two-dimensional algorithms onto silicon directly. Instead, regularity of design and feasibility of layout seem to be the primary concern, together with a realistic throughput rate for real-time applications. However, there have been attempts to map Lee's algorithm [Lee84] onto silicon [RY90]. As well, chips based on a single processor rotation [LLM89] are also being reported [RY90]. But all of them are limited to 1-D DCT/IDCT applications.

In practice, the 2-D DCT algorithms based on other discrete transforms suffer the same setbacks as their 1-D counterparts: complex arithmetic operations. complicated conversion between the two different transforms and complex index mapping, which make the hardware implementations via other discrete transforms rather difficult.

Generally speaking, the 2-D DCT algorithms based on direct matrix factorization or decomposition are much more suitable for software implementation, because they usually require fewer multiplications than other approaches and the complex index mapping involved is not a problem for software. The high communication complexity and global interconnection involved in these algorithms make them difficult to be implemented using VLSI technology.

The 2-D DCT algorithms based on the RCM approach, however, can be realized using a very simple and regular structure, since the RCM reduces the 2-D DCT into two stages of 1-D DCTs and the existing 1-D DCT algorithms listed in section 2.2 can be employed directly. The relative simple localized interconnections of the RCM is another key feature making it suitable for VLSI implementation. The block diagram of the "row-column" transform approach to realize an N×N 2-D DCT is illustrated in FIG. 8.

Needless to say, variations on this basic block structure are many. Some use special devices for the intermediate memory transposition operation. Some use a single, 1-D DCT processor to perform both row and column transformations one-by-one in order to reduce the die size [MW95]. Others use time-recursive algorithms and architectures to achieve regular and modular structure [SL96, WC95]. Some proposed systolic array architecture of RCM can even avoid using an intermediate matrix transposition circuitry with the extra expense of data synchronization and input sequence reordering [CW95].

It is worth notice that all the chip developments have one common ground. Almost all the 2-D DCT or IDCT processors developed so far have made use of the separability property of the 2-D DCT or IDCT by decomposing it into two separate 1-D transforms. None have attempted to directly map a specific 2-D DCT or IDCT algorithm to silicon.

2.4 Summary

In this section, various conventional approaches for computing the 1-D DCT have been examined, as well as some of the algorithms designed to implement the 2-D DCT have also been investigated. The 1-D algorithms can be loosely classified as the DCT via other transforms, via sparse matrix factorization and via time-recursive approaches. Similar, the 2-D algorithms can be classified as DCT via other transforms, via direct matrix factorization/decomposition and via Row-Column methods. Both the 1-D IDCT and 2-D IDCT can be computed and implemented with approaches similar to the 1-D DCT and 2-D DCT.

The most prominent property is the separability property of the 2-D DCT or IDCT, which has been exploited both in the algorithms and in the chip designs. Almost all existing 2-D DCT or IDCT processors are based on the reduction of 2-D DCT or IDCT to a lexicographically ordered 1-D transforms (i.e. RCM).

Compared with the Row-Column methods, the direct 2-D DCT or IDCT matrix factorization/decomposition is more computation efficient and generally requires fewer multiplications. But the complex global communication interconnection of existing direct 2-D DCT or IDCT algorithms has prevented them from being implemented in VLSI chips due to design and layout concerns.

SUMMARY OF THE INVENTION

The present invention provides a method and system for computing 2-D DCT/IDCT which is easy to implement with VLSI technology to achieve high throughput to meet the requirements of high definition video processing in real time.

The present invention is based on a direct 2-D matrix factorization approach. The present invention computes the 8×8 DCT/IDCT through four 4×4 matrix multiplication sub-blocks. Each sub-block is half the size of the original 8×8 size and therefore requires a much lower number of multiplications. Additionally, each sub-block can be implemented independently with localized interconnection so that parallelism can be exploited and a much higher DCT/IDCT throughput can be achieved.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

Figure 1:
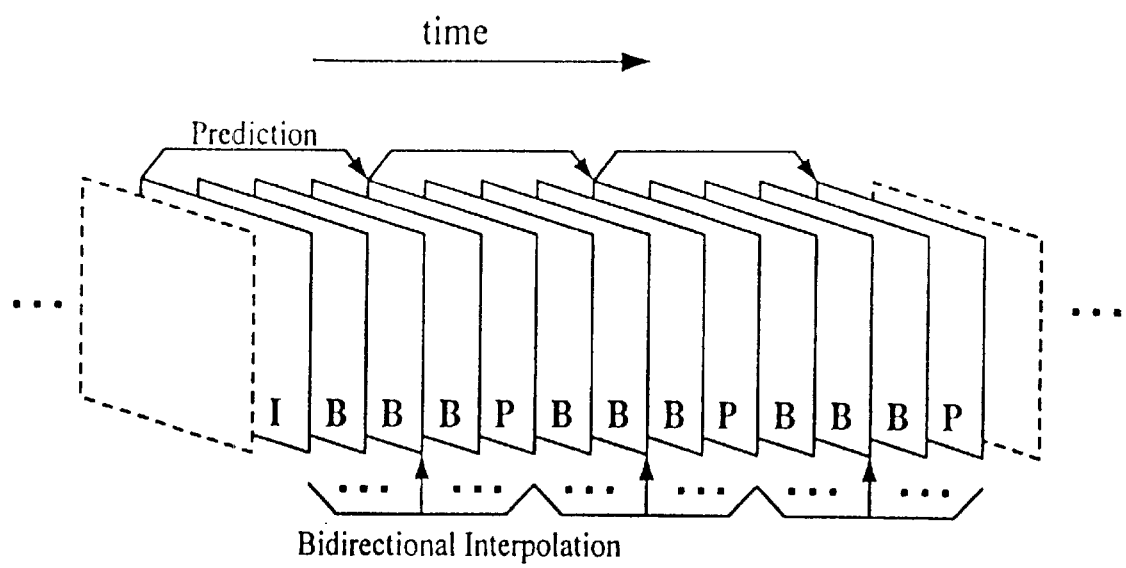
FIG. 1 is a diagram of a typical MPEG video pictures display order.
Figure 2:
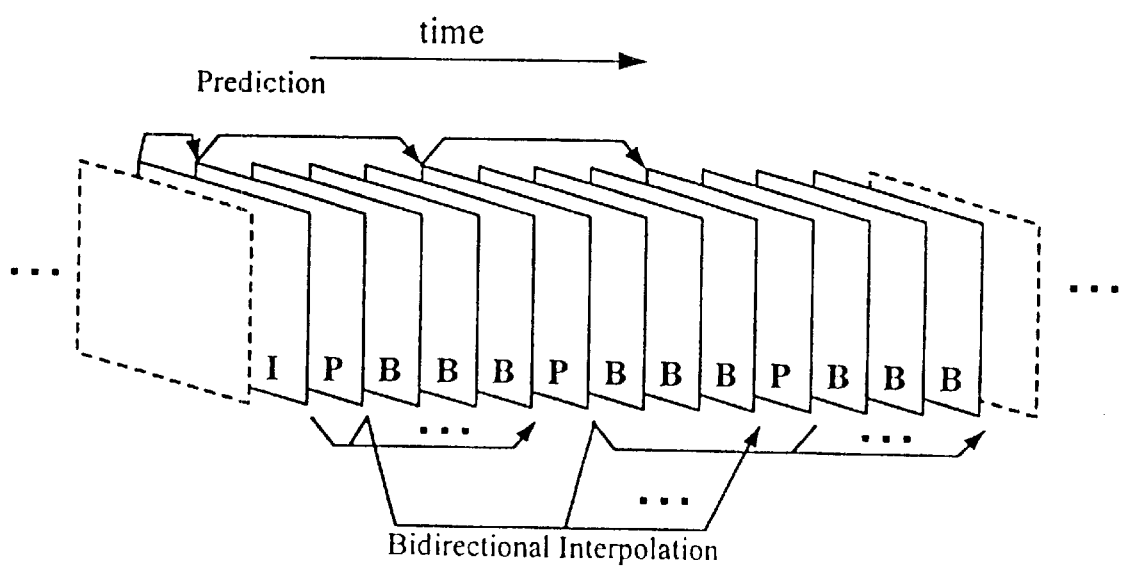
FIG. 2 is a diagram of a typical MPEG video pictures coding order.
Figure 3:
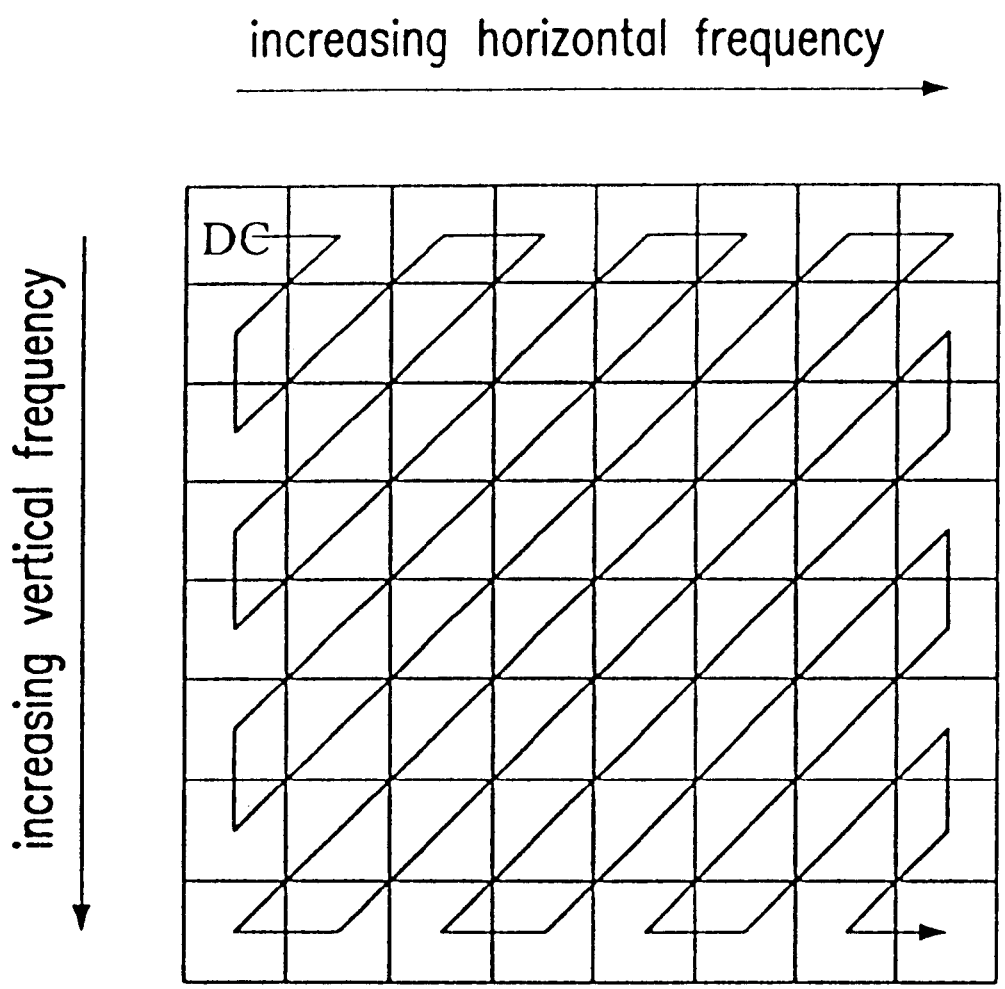
FIG. 3 is a diagram of a zig-zag scanning order of DCT scanning coefficients.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

Overview

As recognized by the inventor, given that the MPEG encoding/decoding process can be decomposed into parallel and serial operations, it seems natural to use some kind of hybrid scheme to implement all the functions in the MPEG-2 encoding/decoding process. One hybrid scheme approach that combines a specially designed hardware component with an ordinary DSP chip is:

(1) Use a specially designed ASIC with a parallel structure to implement the 2-D DCT/IDCT and the motion estimation; and (2) Use an inexpensive DSP to implement the serial operations and provide the control structure to the ASIC.

With this hybrid approach, the combined system not only can take advantage of the powerful parallel processing abilities of the hardware components, but also possesses the flexibility of software programming to cope with different encoding/decoding parameters required. The hybrid scheme, which includes dedicated 2-D DCT/IDCT and motion estimation (for encoder only) ASIC components plus a serial structured DSP chip, might be the best feasible architecture to meet the requirements of MPEG-2 real-time encoding/decoding.

Since the 2-D DCT/IDCT computation is the fundamental element of a MPEG video encoding and decoding, the development of a 2-D DCT/IDCT hardware module is a high priority. Existing systems have used a pure software approach to implement a MPEG-2 encoding/decoding system. The inventor has developed a new 2-D 8×8 DCT/IDCT algorithm and designed an ASIC to implement this algorithm.

A 2-D DCT/IDCT algorithm according to one embodiment of the present invention is described in Section 3. Starting with a simple matrix notation of the 2-D DCT and 2-D IDCT, it presents a detailed step-by-step description of the new algorithm. The algorithm is based on a direct 2-D matrix factorization and has better finite wordlength precision, requires fewer multiplication operations, and possesses regular structure and localized interconnection than traditional approaches. Furthermore, it is shown in Section 3 that the algorithm can easily be implemented with only adders, subtractors, and adder/subtractor combinations.

Finite wordlength simulation of an embodiment of the algorithm is described in Section 4. The impacts of both coefficient quantization and truncation errors are fully investigated. It is also shown in this section that optimal implementation scheme is achieved by combining different finite wordlengths for coefficient quantization and data truncation. In order to meet the accuracy requirements of H.261 and JPEG for both the 2-D DCT and 1-DCT, only 16-bit finite internal wordlength is required by the proposed algorithm.

Section 5 presents the detailed hardware architectural structure for the new 2-D DCT/IDCT algorithm according to one example implementation of the present invention. It is shown that the new algorithm leads to a highly modular, regular and concurrent architecture using standard components such as ac shuffler, adders, subtractors, accumulators, latches, and some multiplexers, etc. The combined 2-D DCT/IDCT architecture demonstrates that all execution components are 100% sharable between the 2-D DCT and 2-D IDCT operations.

The HDL design and logic synthesis processes for an embodiment of the algorithm are demonstrated in Chapter 6. Using a modern synthesis-oriented ASIC design approach, the chip implementation is simulated through I-ML functionality coding, RTL code simulation, logic synthesis from the verified RTL code and gate-level pre-layout simulation in several stages. The highly automated Computer Aided Design (CAD) tools used in the simulation process are Cadence's Verilog-XL® simulation package and Synopsys Design Compiler® synthesis package, respectively. The chip simulation shows that a 800 million samples per second throughput rate can be achieved for both 2-D DCT and IDCT computations according to the present invention.

Finally in Section 7, contributions of the present invention and applications of this invention are discussed.

OTLINE OF DETAILED DESCRIPTION SECTION 3.0 2-D DCT/IDCT Algorithm
   3.1 Introduction
   3.2 2-D 8×8 DCT Algorithm
   3.3 2-D 8×8 IDCT Algorithm
   3.4 Further Simplification of the 4×4 Matrix Multiplications
   3.5 Summary
4.0 Finite Wordlength Simulations
   4.1 Introduction
   4.2 Coefficient Quantization Error Effects
      4.2.1 2-D DCT Simulation Results
      4.2.2 2-D IDCT Simulation Results
   4.3 Truncation Error Effects
      4.3.1 2-D DCT Simulation Results
      4.3.2 2-D IDCT Simulation Results
   4.4 Combined Quantization and Truncation Error Effects
   4.5 Comparison with Row-Column Method
   4.6 Summary
5.0 Hardware Architecture Design
   5.1 Introduction
   5.2 Shuffler—Addition/Subtraction Shuffling Device
   5.3 Sub-block Operator—4×4 Matrix Multiplications Unit
   5.4 Auxiliary Components for 2-D DCT or IDCT Implementations
   5.5 Architectures for DCT, IDCT and Combined DCT/IDCT
   5.6 Summary
6.0 HDL Design and Synthesis for an Example 2-D DCT/IDCT Algorithm
   6.1 Introduction
   6.2 HDL Design for Shuffler
      6.2.1 HDL Design for Sub-block Operators
      6.2.2 HDL Design for Auxiliary Components
      6.2.3 HDL Simulation for Combined 2-D DCT/IDCT
   6.3 Login Synthesis for Example 2-D DCT/IDCT Algorithm
   6.4 Summary
7.0 Conclusions
   7.1 Contributions of this Invention
   7.2 Other Applications

3.0 2-D DCT/IDCT ALGORITHM

In this section, a 2-D 8×8 DCT/IDCT algorithm according to the present invention is described. Based on a direct 2-D approach, not only is this algorithm more computation efficient and requires fewer multiplications than traditional approaches, but it also results in a simple, regular architecture with localized communication interconnections.

3.1 Introduction

In 2-D DCT or IDCT chip development, almost all the 2-D DCT or IDCT processors developed so far have made use of the separability property of the 2-D DCT or IDCT.

Although the 2-D DCT or IDCT based on RCM approach can be realized using a very simple, regular structure with relative low design and layout-cost, there are several major drawbacks in almost all 2-D DCT/IDCT implementations based on the RCM approach [Ura96, SL92, Jan94, MW95, SL96, etc.]:

(1) Memory components are required to store the intermediate results between the 1-D row and 1-D column transform. And memory cells take a lot of silicon area to implement.

(2) Because it is relatively difficult to design the memory block with multiple read/write accesses, serial data in and serial data out mode is adopted by most of the RCM approaches. Serial data I/O results in relatively low system throughput for 2-D DCT or EDCT operation. Generally, RCM approaches can only achieve a half of the system clock rate as system sample processing rate, since the second 1-D transform will not start until the first 1-D transform finishes and the transposed intermediate data is ready. But exceptions have been made to achieve throughputs as high as the system clock rate by using a two intermediate memory buffers and transpose circuitry such that the intermediate data are stored in each of the memory buffers alternatively and latency constraints of the intermediate data can be avoided [UraM]. Some have adopted different I/O clock and system clock rates to balance the I/O and data processing speed [SL96].

(3) Complex transposition hardware is required to transpose the output of the 1-D row (column) transforms into the input format of the 1-D column (row) transforms. The faster matrix transposition the system requires, the higher communication complexity it will involve.

(4) The latency of the RCM is relatively high because the 1-D row and column transform must be calculated sequentially.

(5) The separability property of the 2-D DCT or IDCT used by the RCM limits it to be able to make full use of the 1-D optimal solution, and it is not possible for them to take the full advantage of 2-D's sparseness and factorization.

Although the direct 2-D DCT or IDCT matrix factorization is more computation efficient and generally requires a smaller number of multiplications, the major obstacle preventing this approach from being implemented in VLSI hardware is the complexity of its global communication interconnection. The present invention provides an algorithm which makes full use of the computational efficiency of a direct 2-D approach and has localized communication interconnection(s) so as to be suitable for VLSI implementation and meet the speed requirement of video applications, including real time applications.

This section describes an algorithm that achieves this goal. Direct 2-D DCT and IDCT algorithms are presented step-by-step in section 3.2 and 3.3, respectively. In addition, the core component of these direct algorithms according to one embodiment of the present invention is characterized in detail in section 3.4. A summary is provided in section 3.5.

3.2 2-D 8×8 DCT Algorithm

Let $X(m,n)$ and $X(k,l)$ be the N×N input and output sequences for $0 \leq m,n < N$, then the forward 2D Discrete Cosine Transform in Eq. (2.32) can be rewritten as:

$$Z(k,l) = \frac{2}{N} C(k)C(l) \sum_{m=0}^{N-1}\sum_{n=0}^{N-1} X(m,n)\cos\frac{(2m+1)k\pi}{2N}\cos\frac{(2n+1)l\pi}{2N} \quad (3.1)$$

where $$C(k), C(l) = \begin{cases} 1/\sqrt{2} & k,l = 0 \\ 1, & \text{otherwise} \end{cases}$$

For N+8, a coefficient vector W, which is the cosine function of angles (Kπ/2N) for k=1, 2, ..., N−1, can be defined as $$W = \begin{bmatrix} w_1 \\ w_2 \\ w_3 \\ w_4 \\ w_5 \\ w_6 \\ w_7 \end{bmatrix} = \frac{1}{2} \sim \begin{bmatrix} \cos(\pi/16) \\ \cos(2\pi/16) \\ \cos(3\pi/16) \\ \cos(4\pi/16) \\ \cos(5\pi/16) \\ \cos(6\pi/16) \\ \cos(7\pi/16) \end{bmatrix} \quad (3.2)$$

In the meanwhile, the 2-D 8×8 DCT in Eq. (3.1) can be expressed in matrix notation similar to 1-D case in Eq. (2.8), as:

$$Z = AXA^T \quad (3.3)$$

where $A^T$ is the transpose of matrix A and the elements of A are $$a_{ij} = \frac{1}{2}C(i)\cos\frac{(2j+1)i\pi}{2N}; i, j = 0, 1, \ldots, N-1.$$

If each $a_{ij}$ is replaced with the elements of coefficient vector W, the matrix A can be expressed as the function of coefficient $w_k$ for k=1, 2, ..., N−1 as $$A = \begin{bmatrix} w_4 & w_4 & w_4 & w_4 & w_4 & w_4 & w_4 & w_4 \\ w_1 & w_3 & w_5 & w_7 & -w_7 & -w_5 & -w_3 & -w_1 \\ w_2 & w_6 & -w_6 & -w_2 & -w_2 & -w_6 & w_6 & w_2 \\ w_3 & -w_7 & -w_1 & -w_5 & w_5 & w_1 & w_7 & -w_3 \\ w_4 & -w_4 & w_4 & w_4 & w_4 & -w_4 & -w_4 & w_4 \\ w_5 & -w_1 & w_7 & w_3 & -w_3 & -w_7 & w_1 & -w_5 \\ w_6 & -w_2 & w_2 & -w_6 & -w_6 & w_2 & -w_2 & w_6 \\ w_7 & -w_5 & w_3 & -w_1 & w_1 & -w_3 & w_5 & -w_7 \end{bmatrix} \quad (3.4)$$

From Eq. (3.3) one can see that the 2-D DCT can be decomposed into two stages of 1-D DCT as [Ura92, Jan94, MW95]:

$Y=AX$ and $$Z=(YA^T)^\tau \quad (3.5)$$

and a total of $2N^3$ multiplications are required to compute matrix X by brute force approach. Since the even rows of matrix A (i.e., A(0), A(2), A(4) and A(6)) are even-symmetric and the odd rows (i.e., A(1), A(3), A(5) and A(7)) are odd-symmetric, it is possible to facilitate the computation of 1-D column transform of Y=AX by simply switching all the even rows of matrices A and Y to the top half and all the odd rows to the bottom half, which can be carried out by multiplying a permutation matrix P1. Two new matrices Y' and A' can be defined as $Y'=P1\cdot Y$, $A'=P1\cdot A \quad (3.6)$ where P1 is defined as $$P1 = \begin{bmatrix} P2_{4\times 8} \\ P3_{4\times 8} \end{bmatrix}_{8\times 8} \text{ and} \quad (3.7)$$

$$P2 = \begin{bmatrix} 1 & 0 & 0 & 0 & 0 & 0 & 0 & 0 \\ 0 & 0 & 1 & 0 & 0 & 0 & 0 & 0 \\ 0 & 0 & 0 & 0 & 1 & 0 & 0 & 0 \\ 0 & 0 & 0 & 0 & 0 & 0 & 1 & 0 \end{bmatrix}, \quad P3 = \begin{bmatrix} 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix}$$

By expressing matrices Y' and A' as the functions of the row vectors of the matrices Y and A, Eq. (3.6) can be further extended as $$Y' = \begin{bmatrix} Y(0) \\ Y(2) \\ Y(4) \\ Y(6) \\ Y(1) \\ Y(3) \\ Y(5) \\ Y(7) \end{bmatrix} = \begin{bmatrix} A(0) \\ A(2) \\ A(4) \\ A(6) \\ A(1) \\ A(3) \\ A(5) \\ A(7) \end{bmatrix} X = \quad (3.7)$$

$$\begin{bmatrix} w_4 & w_4 & w_4 & w_4 & w_4 & w_4 & w_4 & w_4 \\ w_2 & w_6 & -w_6 & -w_2 & -w_2 & -w_6 & w_6 & w_2 \\ w_4 & -w_4 & -w_4 & w_4 & w_4 & -w_4 & -w_4 & w_4 \\ w_6 & -w_2 & w_2 & -w_6 & -w_6 & w_2 & -w_2 & w_6 \\ w_1 & w_3 & w_5 & w_7 & -w_7 & -w_5 & -w_3 & -w_1 \\ w_3 & -w_7 & -w_1 & -w_5 & w_5 & w_1 & w_7 & -w_3 \\ w_5 & -w_1 & w_7 & w_3 & -w_3 & -w_7 & w_1 & -w_5 \\ w_7 & -w_5 & w_3 & -w_1 & w_1 & -w_3 & w_5 & -w_7 \end{bmatrix} X$$

where Y(k) and A(k) are the row vectors of matrices Y and A, respectively. Now, the rows at the top half of matrix A'=P1·A are even-symmetric and the rows at the bottom half are odd-symmetric. Thus, the matrix multiplication of Y'=A'X can be calculated through two 4×8 matrices as $$\begin{bmatrix} Y(0) \\ Y(2) \\ Y(4) \\ Y(6) \end{bmatrix}_{4\times 8} = \begin{bmatrix} w_4 & w_4 & w_4 & w_4 \\ w_2 & w_6 & -w_6 & -w_2 \\ w_4 & -w_4 & -w_4 & w_4 \\ w_6 & -w_2 & w_2 & -w_6 \end{bmatrix}_{4\times 4} \begin{bmatrix} X(0)+X(7) \\ X(1)+X(6) \\ X(2)+X(5) \\ X(3)+X(4) \end{bmatrix}_{4\times 8} \quad (3.8)$$

$$\begin{bmatrix} Y(1) \\ Y(3) \\ Y(5) \\ Y(7) \end{bmatrix}_{4\times 8} = \begin{bmatrix} w_1 & w_3 & w_5 & w_7 \\ w_3 & -w_7 & -w_1 & -w_5 \\ w_5 & -w_1 & w_7 & w_3 \\ w_7 & -w_5 & w_3 & -w_1 \end{bmatrix}_{4\times 4} \begin{bmatrix} X(0)-X(7) \\ X(1)-X(6) \\ X(2)-X(5) \\ X(3)-X(4) \end{bmatrix}_{4\times 8} \quad (3.9)$$

where X(k) is the row vector of matrix X.

It can be seen that one 4×4 coefficient matrix in Eq. (3.9) only includes the even coefficients of vector W (i.e. $w_2$, $w_4$, $w_6$) and the other only includes the odd coefficients (i.e. $w_1$, $w_3$, $w_5$, $w_7$). In fact, they can be defined as two new 4×4 coefficient matrices E and O [Jan94, MW95]. By means of matrix notation, E and O can also be computed directly from the coefficient matrix A by the following matrix operations as:

$$E = \begin{bmatrix} w_4 & w_4 & w_4 & w_4 \\ w_2 & w_6 & -w_6 & -w_2 \\ w_4 & -w_4 & -w_4 & w_4 \\ w_6 & -w_2 & w_2 & -w_6 \end{bmatrix} = P2 \cdot A \cdot P4, \quad (3.10)$$

$$O = \begin{bmatrix} w_1 & w_3 & w_5 & w_7 \\ w_3 & -w_7 & -w_1 & -w_5 \\ w_5 & -w_1 & w_7 & w_3 \\ w_7 & -w_5 & w_3 & -w_1 \end{bmatrix} = P3 \cdot A \cdot P4$$

where P2 and P3 are defined in Eq. (3.7) as the top and bottom blocks of matrix P1, and P4 as a new permutation matrix that takes the first four columns of an 4×8 matrix to form an 4×4 one. Mathematically, the matrix P4 can be defined as $$P4 = \begin{bmatrix} I_4 \\ N_4 \end{bmatrix}_{8\times 4} \quad (3.11)$$

where the matrix $I_4$ is an 4×4 identity matrix, and the matrix $N_4$ is an 4×4 null (zero) matrix.

In addition, the matrices [X(i)+X(j)] and [X(i)−X(j)] in Eq. (3.8) and Eq. (3.9) can also be defined as two separate 4×8 matrices as $X_+$ and $X_-$ into their left and right blocks, respectively, as:

$$X_+ = ([X_{+l} \ X_{+r}])_{4\times 8} = \begin{bmatrix} X(0)+X(7) \\ X(1)+X(6) \\ X(2)+X(5) \\ X(3)+X(4) \end{bmatrix} \quad (3.12)$$

$$X_- = ([X_{-l} \ X_{-r}])_{4\times 8} = \begin{bmatrix} X(0)-X(7) \\ X(1)-X(6) \\ X(2)-X(5) \\ X(3)-X(4) \end{bmatrix}$$

After substituting the $X_+$, $X_-$, $X_{+l}$, $X_{+r}$, $X_{-l}$ and $X_{-r}$ in Eq. (3.12) and the E, O in Eq. (3.10) into Eq. (3.9), the 1-D column transform Y=AX can be calculated by first calculating its permutation Y'. The substitution can be carried out as follows:

$$Y' = \begin{bmatrix} EX_+ \\ OX_- \end{bmatrix}_{8\times 8} \quad (3.13)$$

$$= \begin{bmatrix} EX_{+l} & EX_{+r} \\ OX_{-l} & OX_{-r} \end{bmatrix}_{8\times 8} \text{ and}$$

$$Y = (P1)^{-1}Y'$$

Furthermore, if the input matrix X is decomposed into four 4×4 sub-matrices as $$X = \begin{bmatrix} X1_{4\times 4} & X2_{4\times 4} \\ X3_{4\times 4} & X4_{4\times 4} \end{bmatrix}_{8\times 8} \quad (3.14)$$

Using the Eq. (3.12), the matrices $X_{+l}$, $X_{+r}$, $X_{-l}$ and $X_{-r}$ can also be expressed as the functions of matrices X1, X2, X3 and X4 as $$X_{+l} = X1 + \tilde{I}_4 X3,$$

$$X_{+r} = X2 + \tilde{I}_4 X4,$$

$X_{-l}=X1-\tilde{I}_4X3,$ $X_{-r}=X2-\tilde{I}_4X4$  (3.15)

where $\tilde{I}_4$ is defined as an 4×4 opposite identity matrix as $$\tilde{I}_4 = \begin{bmatrix} 0001 \\ 0010 \\ 0100 \\ 1000 \end{bmatrix}$$  (3.16)

Since the $X_{+l}$, $X_{+r}$, $X_{-l}$ and $X_{-r}$ have been expressed as the functions of matrices X1, X2, X3 and X4 in Eq. (3.15), by substituting them into Eq. (3.13), the first stage of 1-D column transform Y=AX can be expressed directly as the function of input matrix X as $$Y' = \begin{bmatrix} E(X1+\tilde{I}_4X3) & E(X2+\tilde{I}_4X4) \\ O(X1-\tilde{I}_4X3) & O(X2-\tilde{I}_4X4) \end{bmatrix}_{8\times 8} \text{ and}$$  (3.17)

$$Y = (P1)^{-1}Y' = (P1)^{-1}\begin{bmatrix} E(X1+\tilde{I}_4X3) & E(X2+\tilde{I}_4X4) \\ O(X1-\tilde{I}_4X3) & O(X2-\tilde{I}_4X4) \end{bmatrix}_{8\times 8}$$

where matrices P1, E and O are defined in Eq. (3.7) and (3.10), respectively.

Similar mathematical manipulations can be applied to the second stage of 1-D row transform $Z=YA^T$, too. By switching the row vectors of matrix Z, a new matrix Z' can be formed as the function of the row vectors of matrix Z as $$Z' = \begin{bmatrix} Z(0) \\ Z(2) \\ Z(4) \\ Z(6) \\ Z(1) \\ Z(3) \\ Z(5) \\ Z(7) \end{bmatrix} = P1 \cdot Z = P1 \cdot YA^T = \begin{bmatrix} Y(0) \\ Y(2) \\ Y(4) \\ Y(6) \\ Y(1) \\ Y(3) \\ Y(5) \\ Y(7) \end{bmatrix} A^T = Y'A^T$$  (3.18)

Take a transpose on the both sides of Eq. (3.18), the transposition of matrix Z' can be expressed as $(Z')^T = (Y'A^T)^T = A(Y')^T$  (3.19)

The matrix multiplication $(Z')^T = A(Y')^T$ can be calculated in the same fashion as calculating Y=AX since they are the same matrix multiplication in essence (i.e. matrix A multiplied by an another matrix).

In order to be able to use Eq. (3.17) to compute $(Z')^T = A(Y')^T$, $(Y')^T$ should be decomposed as four 4×4 sub-matrices as done to the matrix X. By taking the transpose on the both sides of the first equation in Eq. (3.17), one can decompose the $(Y')^T$ as $$(Y')^T = \begin{bmatrix} E(X1+\tilde{I}_4X3) & E(X2+\tilde{I}_4X4) \\ O(X1-\tilde{I}_4X3) & O(X2+\tilde{I}_4X4) \end{bmatrix}_{8\times 8}^T$$  (3.20)

$$= \begin{bmatrix} (X1+\tilde{I}_4X3)^T E^T & (X1-\tilde{I}_4X3)^T O^T \\ (X2+\tilde{I}_4X4)^T E^T & (X2-\tilde{I}_4X4)^T O^T \end{bmatrix}_{8\times 8}$$

by replacing the X1, X2, X3 and X4 with $(X1+\tilde{I}_4X3)^T E^T$, $(X1-\tilde{I}_4X3)^T O^T$, $(X2+\tilde{I}_4X4)^T E^T$ and $(X2-\tilde{I}_4X4)^T O^T$ in the second equation in Eq. (3.17), the matrix multiplication $(Z')^T = A(Y')^T$ can be computed as $$(Z')^T = (P1)^{-1}\begin{bmatrix} E((X1+\tilde{I}_4X3)^T E^T + \tilde{I}_4(X2+\tilde{I}_4X4)^T E^T) & E((X1-\tilde{I}_4X3)^T O^T + \tilde{I}_4(X2-\tilde{I}_4X4)^T O^T) \\ O((X1+\tilde{I}_4X3)^T E^T - \tilde{I}_4(X2+\tilde{I}_4X4)^T E^T) & O((X1-\tilde{I}_4X3)^T O^T - \tilde{I}_4(X2-\tilde{I}_4X4)^T O^T) \end{bmatrix}$$  (3.21)

$$= (P1)^{-1}\begin{bmatrix} E((X1+\tilde{I}_4X3)^T + \tilde{I}_4(X2+\tilde{I}_4X4)^T)E^T & E((X1-\tilde{I}_4X3)^T + \tilde{I}_4(X2-\tilde{I}_4X4)^T)O^T \\ O((X1+\tilde{I}_4X3)^T - \tilde{I}_4(X2+\tilde{I}_4X4)^T)E^T & O((X1-\tilde{I}_4X3)^T - \tilde{I}_4(X2-\tilde{I}_4X4)^T)O^T \end{bmatrix}$$

Consequently, one can compute the 2-D DCT result Z by first solving the matrix $(Z')^T$ through Eq. (3.21). Let's define four new 4×4 matrices $X_{++}$, $X_{-+}$, $X_{+-}$ and $X_{--}$ directly from input matrix X as $X_{++}=(X1+\tilde{I}_4X3)^T+\tilde{I}_4(X2+\tilde{I}_4X4)^T,$ $X_{-+}=(X1-\tilde{I}_4X3)^T+\tilde{I}_4(X2-\tilde{I}_4X4)^T,$ $X_{+-}=(X1+\tilde{I}_4X3)^T-\tilde{I}_4(X2+\tilde{I}_4X4)^T,$ $X_{--}=(X1-\tilde{I}_4X3)^T-\tilde{I}_4(X2-\tilde{I}_4X4)^T,$  (3.22)

such that the Eq. (3.21) can be rewritten as $$(P1)(Z')^T = \begin{bmatrix} EX_{++}E^T & EX_{-+}O^T \\ OX_{+-}E^T & OX_{--}O^T \end{bmatrix}_{8\times 8}$$  (3.23)

By decomposing $(P1)(Z')^T$ into four 4×4 matrices as its top-left, top-right, bottom-left and bottom-right blocks as $$(P1)(Z')^T = (P1)(P1 \cdot Z)^T = \begin{bmatrix} Z1_{4\times 4} & Z2_{4\times 4} \\ Z3_{4\times 4} & Z4_{4\times 4} \end{bmatrix}_{8\times 8}$$  (3.24)

one can finally compute the elements of the 2-D DCT $Z=AXA^T$ through Eq. (3.23) as $$Z1 = \begin{bmatrix} Z_{00}Z_{20}Z_{40}Z_{60} \\ Z_{02}Z_{22}Z_{42}Z_{62} \\ Z_{04}Z_{24}Z_{44}Z_{64} \\ Z_{06}Z_{26}Z_{46}Z_{66} \end{bmatrix} = EX_{++}E^T,$$  (3.25)

$$Z2 = \begin{bmatrix} Z_{10}Z_{30}Z_{50}Z_{70} \\ Z_{12}Z_{32}Z_{52}Z_{72} \\ Z_{14}Z_{34}Z_{54}Z_{74} \\ Z_{16}Z_{36}Z_{56}Z_{76} \end{bmatrix} = EX_{-+}O^T,$$

$$Z3 = \begin{bmatrix} Z_{01}Z_{21}Z_{41}Z_{61} \\ Z_{03}Z_{23}Z_{43}Z_{63} \\ Z_{05}Z_{25}Z_{45}Z_{65} \\ Z_{07}Z_{27}Z_{47}Z_{67} \end{bmatrix} = OX_{+-}E^T,$$

$$Z4 = \begin{bmatrix} Z_{11}Z_{31}Z_{51}Z_{71} \\ Z_{13}Z_{33}Z_{53}Z_{73} \\ Z_{15}Z_{35}Z_{55}Z_{75} \\ Z_{17}Z_{37}Z_{57}Z_{77} \end{bmatrix} = OX_{--}O^T$$

Without the present invention, one would need to compute the matrix product of three 8×8 matrices in $Z = AXA^T$. By using Eq. (3.25), the result matrix Z is decomposed as four 4×4 matrices, and each of them can be calculated as the matrix product of three 4×4 matrices, the "half-size" operations compared with original 8×8 one. The total number of multiplications is reduced from $2N^3$ to $N^3$ since each of the 4×4 matrix products requires $2(N/2)^3$ multiplications when computed by brute force.

3.3 2-D 8×8 IDCT Algorithm

Similar to the 2-D DCT, one can also decompose the 2-D IDCT into a much simpler form, and thus reduce the total amount of computation of the 2-D IDCT.

Let's define $Z(k,l)$ and $X(m,n)$ as 2-D IDCT input and output matrices, respectively. The 2-D IDCT definition in Eq. (2.33) can them be rewritten as:

$$X(m,n) = \frac{2}{N} \sum_{k=0}^{N-1} \sum_{l=0}^{N-1} C(k)C(l)Z(k,l) \cos\frac{(2m+1)}{2N} \cos\frac{(2n+1)}{2N} \text{ where } C(k), \quad (3.26)$$

$$C(l) = \begin{cases} 1/\sqrt{2}, & k, l = 0 \\ 1, & \text{otherwise} \end{cases}$$

For N=8, the definition of the coefficient vector W in Eq. (3.2) and the coefficient matrix A in Eq. (3.4) can also be used in the computation of the 2-D IDCT. And Eq. (3.26) can be expressed with the 2-D IDCT matrix notation as $$X = A^T Z A \qquad (3.27)$$

In order to have consistent input and output matrix notations with the 2-D DCT, X represents a 2-D IDCT input matrix and Z represents a 2-D IDCT output matrix in the rest of this section. In this way, the 2-D IDCT matrix expression in Eq. (3.27) will be rewritten again as $$Z = A^T X A \qquad (3.28)$$

The 2-D IDCT in Eq. (3.28) can also be decomposed into two stages of 1-D IDCT as [Ura92, MW95]:

$$Y = A^T X \text{ and}$$

$$Z = YA = (A^T Y^T)^T \qquad (3.29)$$

Note that the notation Y is reused to express the result of 1-D IDCT column transform, which is different from the Y in Eq. (3.15) as the result of 1-D DCT column transform.

Because of the symmetric characteristics of the coefficient matrix A, the first stage of 1-D IDCT $Y = A^T X$ can be computed through a permuted matrix $$Y'' = \begin{bmatrix} Y(0) \\ Y(1) \\ Y(2) \\ Y(3) \\ Y(7) \\ Y(6) \\ Y(5) \\ Y(4) \end{bmatrix} = P5 \cdot Y = (P5 \cdot A^T) X \qquad (3.30)$$

to reverse the orders of the rows in the bottom half of matrices Y and $A^T$, where the permutation matrix P5 is defined as $$P5 = \begin{bmatrix} I_4 & N_4 \\ N_4 & \tilde{I}_4 \end{bmatrix} \qquad (3.31)$$

Thus, the matrix multiplication of $Y'' = (P5 \cdot A^T) X$ can be calculated through two 4×8 matrices as the functions of the row vectors of matrix X as [Ura92,MW95]:

$$\begin{bmatrix} Y(0) \\ Y(1) \\ Y(2) \\ Y(3) \end{bmatrix}_{4 \times 8} = E^T \begin{bmatrix} X(0) \\ X(2) \\ X(4) \\ X(6) \end{bmatrix} + O^T \begin{bmatrix} X(1) \\ X(3) \\ X(5) \\ X(7) \end{bmatrix} \qquad (3.32)$$

$$\begin{bmatrix} Y(7) \\ Y(6) \\ Y(5) \\ Y(4) \end{bmatrix}_{4 \times 8} = E^T \begin{bmatrix} X(0) \\ X(2) \\ X(4) \\ X(6) \end{bmatrix} - O^T \begin{bmatrix} X(1) \\ X(3) \\ X(5) \\ X(7) \end{bmatrix}$$

where the matrices E and O are the same ones defined in Eq. (3.10).

By defining two 4×8 matrices $X_e$ and $X_o$ as the even rows (i.e. X(0), X(2), X(4) and X(6)) and the odd rows (i.e. X(1), X(3), X(5) and X(7)) of matrix X as:

$$Y = (P1)^{-1} Y' = (P1)^{-1} \begin{bmatrix} E(X1 + \tilde{I}_4 X3) & E(X2 + \tilde{I}_4 X4) \\ O(X1 - \tilde{I}_4 X3) & O(X2 - \tilde{I}_4 X4) \end{bmatrix}_{8 \times 8} \qquad (3.33)$$

$$X_e = \begin{bmatrix} X(0) \\ X(2) \\ X(4) \\ X(6) \end{bmatrix}_{4 \times 8} = P2 \cdot X,$$

$$X_o = \begin{bmatrix} X(1) \\ X(3) \\ X(5) \\ X(7) \end{bmatrix}_{4 \times 8} = P3 \cdot X$$

where matrices P2 and P3 are defined in Eq. (3.7), the 1-D IDCT column transform $Y = A^T X$ can be computed through Eq. (3.30), (3.32) and (3.33) as $$Y'' = \begin{bmatrix} E^T X_e + O^T X_o \\ E^T X_e - O^T X_o \end{bmatrix} \quad \text{and} \qquad (3.34)$$

$$Y = (P5)^{-1} Y'' = (P5)^{-1} \begin{bmatrix} E^T X_e + O^T X_o \\ E^T X_e - O^T X_o \end{bmatrix}$$

Defining another permutation matrix P6 as $$P6 = \begin{bmatrix} N_4 \\ I_4 \end{bmatrix}_{8\times 4} \quad (3.35)$$

then the matrices $X_e$ and $X_o$ can be separated into their left and right blocks as $$X_{el} = X_e \cdot P4 = P2 \cdot X \cdot P4,$$

$$X_{er} = X_e \cdot P6 = P2 \cdot X \cdot P6,$$

$$X_{ol} = X_e \cdot P4 = P3 \cdot X \cdot P4,$$

$$X_{or} = X_e \cdot P6 = P3 \cdot X \cdot P6,$$

such that the Eq. (3.33) can be rewritten as $$Y'' = \begin{bmatrix} E^T X_{el} + O^T X_{ol} & E^T X_{er} + O^T X_{or} \\ E^T X_{el} - O^T X_{ol} & E^T X_{er} - O^T X_{or} \end{bmatrix} \text{ and } \quad (3.37)$$

$$Y = (P5)^{-1} Y'' = (P5)^{-1} \begin{bmatrix} E^T X_{el} + O^T X_{ol} & E^T X_{er} + O^T X_{or} \\ E^T X_{el} - O^T X_{ol} & E^T X_{er} - O^T X_{or} \end{bmatrix}$$

And the 8×8 matrix multiplication $Y'' = (P5 \cdot A^T)X$ has been simplified as several "half-size" matrix multiplications.

The second stage of 1-D IDCT can be evaluated in the similar way. After multiplying the permutation matrix P5 on the both sides of Z=YA, a new permuted matrix Z'' can be defined as $$Z'' = P5 \cdot Z = (P5 \cdot Y)A = Y''A \quad (3.38)$$

Thus, the transposition of matrix Z'' can be expressed as $$(Z'')^T = A^T (Y'')^T \quad (3.39)$$

which happens to have the same format as the first stage of 1-D IDCT Y=ATX does. And the matrix $(Y'')^T$ can be computed directly by transposing Y'' in Eq. (3.3.7) as $$(Y'')^T = \begin{bmatrix} E^T X_{el} + O^T X_{ol} & E^T X_{er} + O^T X_{or} \\ E^T X_{el} - O^T X_{ol} & E^T X_{er} - O^T X_{or} \end{bmatrix}^T \quad (3.40)$$

$$= \begin{bmatrix} X_{el}^T E + X_{ol}^T O & X_{el}^T E - X_{ol}^T O \\ X_{er}^T E + X_{or}^T O & X_{er}^T E - X_{or}^T O \end{bmatrix}$$

Furthermore, by separating $(Y'')^T$ into even-left, even-right, odd-left and odd-right four 4×4 sub-matrices as done for matrix X in Eq. (3.36), the result of Eq. (3.3.7) can be directly used to express the matrix $(Z'')^T$ as $$(Z'')^T = \quad (3.41)$$

$$(P5)^{-1} \begin{bmatrix} E^T((Y'')^T)_{el} + O^T((Y'')^T)_{ol} & E^T((Y'')^T)_{er} + O^T((Y'')^T)_{or} \\ E^T((Y'')^T)_{el} - O^T((Y'')^T)_{ol} & E^T((Y'')^T)_{er} - O^T((Y'')^T)_{or} \end{bmatrix}$$

In fact, the even-left, even-right, odd-left and odd-right four 4×4 sub-matrices of $(Y'')^T$ can be computed by replacing the matrix X with the $(Y'')^T$ in Eq. (3.36) as $$((Y'')^T)_{el} = P2 \cdot (Y'')^T \cdot P4 = P2 \begin{bmatrix} X_{el}^T E + X_{ol}^T O \\ X_{er}^T E + X_{or}^T O \end{bmatrix}_{8\times 4}, \quad (3.42)$$

$$((Y'')^T)_{er} = P2 \cdot (Y'')^T \cdot P6 = P2 \begin{bmatrix} X_{el}^T E - X_{ol}^T O \\ X_{er}^T E - X_{or}^T O \end{bmatrix}_{8\times 4},$$

$$((Y'')^T)_{ol} = P3 \cdot (Y'')^T \cdot P4 = P3 \begin{bmatrix} X_{el}^T E + X_{ol}^T O \\ X_{er}^T E + X_{or}^T O \end{bmatrix}_{8\times 4},$$

$$((Y'')^T)_{or} = P3 \cdot (Y'')^T \cdot P6 = P3 \begin{bmatrix} X_{el}^T E - X_{ol}^T O \\ X_{er}^T E - X_{or}^T O \end{bmatrix}_{8\times 4}$$

In order to resolve the Eq. (3.42) as a serial of 4×4 matrix operations, four new 4×4 matrices P7, P8, P9 and P10 can be defined as $$P2 = [P7_{4\times 4} P8_{4\times 4}]_{4\times 8}, \quad P3 = [P9_{4\times 4} P10_{4\times 4}]_{4\times 8} \quad (3.43)$$

By replacing P2 and P3 with P7, P8, P9 and P10, the Eq. (3.42) can be further expressed as $$((Y'')^T)_{el} = P7(X_{el}^T E + X_{ol}^T O) + P8(X_{er}^T E + X_{or}^T O) \quad (3.44)$$
$$= (P7 \cdot X_{el}^T + P8 \cdot X_{er}^T)E + (P7 \cdot X_{ol}^T + P8 \cdot X_{or}^T)O,$$

$$((Y'')^T)_{er} = P7(X_{el}^T E - X_{ol}^T O) + P8(X_{er}^T E - X_{or}^T O)$$
$$= (P7 \cdot X_{el}^T + P8 \cdot X_{er}^T)E - (P7 \cdot X_{ol}^T + P8 \cdot X_{or}^T)O,$$

$$((Y'')^T)_{ol} = P9(X_{el}^T E + X_{ol}^T O) + P10(X_{er}^T E + X_{or}^T O)$$
$$= (P9 \cdot X_{el}^T + P10 \cdot X_{er}^T)E + (P9 \cdot X_{ol}^T + P10 \cdot X_{or}^T)O,$$

$$((Y'')^T)_{or} = P9(X_{el}^T E - X_{ol}^T O) + P10(X_{er}^T E - X_{or}^T O)$$
$$= (P9 \cdot X_{el}^T + P10 \cdot X_{er}^T)E - (P9 \cdot X_{ol}^T + P10 \cdot X_{or}^T)O$$

By defining four 4×4 matrices in the following way as $$X_{ee} = P7 \cdot X_{el}^T + P8 \cdot X_{er}^T \quad (3.45)$$
$$= P7(P2 \cdot X \cdot P4)^T + P8(P2 \cdot X \cdot P6)^T$$
$$= P2(P2 \cdot X)^T$$

$$X_{oe} = P7 \cdot X_{ol}^T + P8 \cdot X_{er}^T$$
$$= P7(P3 \cdot X \cdot P4)^T + P8(P3 \cdot X \cdot P6)^T$$
$$= P2(P3 \cdot X)^T$$

$$X_{eo} = P9 \cdot X_{el}^T + P10 \cdot X_{er}^T$$
$$= P9(P2 \cdot X \cdot P4)^T + P10(P2 \cdot X \cdot P6)^T$$
$$= P3(P2 \cdot X)^T$$

$$X_{oo} = P9 \cdot X_{ol}^T + P10 \cdot X_{or}^T$$
$$= P9(P3 \cdot X \cdot P4)^T + P10(P3 \cdot X \cdot P6)^T$$
$$= P3(P3 \cdot X)^T$$

Eq. (3.44) can be rewritten as $$((Y'')^T)_{el} = X_{ee} E + X_{oe} O,$$

$$((Y'')^T)_{er} = X_{ee} E - X_{oe} O,$$

$$((Y'')^T)_{ol} = X_{eo} E + X_{oo} O,$$

$$((Y'')^T)_{or} = X_{eo} E - X_{oo} O, \quad (3.46)$$

Further substituting Eq. (3.46) into Eq. (3.41) yields $$(P5)(Z'')^T = \begin{bmatrix} E^T(X_{ee}E + X_{oe}O) + O^T(X_{eo}E + X_{oo}O) & E^T(X_{ee}E - X_{oe}O) + O^T(X_{eo}E - X_{oo}O) \\ E^T(X_{ee}E + X_{oe}O) - O^T(X_{eo}E + X_{oo}O) & E^T(X_{ee}E - X_{oe}O) - O^T(X_{eo}E - X_{oo}O) \end{bmatrix} \quad (3.47)$$

$$= \begin{bmatrix} E^T X_{ee}E + E^T X_{oe}O + O^T X_{eo}E + O^T X_{oo}O & E^T X_{ee}E - E^T X_{oe}O + O^T X_{eo}E - O^T X_{oo}O \\ E^T X_{ee}E + E^T X_{oe}O - O^T X_{eo}E - O^T X_{oo}O & E^T X_{ee}E - E^T X_{oe}O - O^T X_{eo}E + O^T X_{oo}O \end{bmatrix}$$

By decomposing $(P5)(Z'')^T$ into four 4×4 matrices as its top-left, top-right, bottom-left and bottom-right blocks as $$(P5)(Z'')^T = (P5)(P5 \cdot Z)^T = \begin{bmatrix} Z5_{4 \times 4} & Z6_{4 \times 4} \\ Z7_{4 \times 4} & Z8_{4 \times 4} \end{bmatrix}_{8 \times 8} \quad (3.48)$$

one can finally compute each element of the 2-D IDCT $Z = A^T X A$ through Eq. (3.27) as $$Z5 = \begin{bmatrix} Z_{00} & Z_{10} & Z_{20} & Z_{30} \\ Z_{01} & Z_{11} & Z_{21} & Z_{31} \\ Z_{02} & Z_{12} & Z_{22} & Z_{32} \\ Z_{03} & Z_{13} & Z_{23} & Z_{33} \end{bmatrix} = \quad (3.49)$$

$$E^T X_{ee}E + E^T X_{oe}O + O^T X_{eo}E + O^T X_{oo}O,$$

$$Z6 = \begin{bmatrix} Z_{70} & Z_{60} & Z_{50} & Z_{40} \\ Z_{71} & Z_{61} & Z_{51} & Z_{41} \\ Z_{72} & Z_{62} & Z_{52} & Z_{42} \\ Z_{73} & Z_{63} & Z_{53} & Z_{43} \end{bmatrix} =$$

$$E^T X_{ee}E - E^T X_{oe}O + O^T X_{eo}E - O^T X_{oo}O,$$

$$Z7 = \begin{bmatrix} Z_{07} & Z_{17} & Z_{27} & Z_{37} \\ Z_{06} & Z_{16} & Z_{26} & Z_{36} \\ Z_{05} & Z_{15} & Z_{25} & Z_{35} \\ Z_{04} & Z_{14} & Z_{24} & Z_{34} \end{bmatrix} =$$

$$E^T X_{ee}E + E^T X_{oe}O - O^T X_{eo}E - O^T X_{oo}O,$$

$$Z8 = \begin{bmatrix} Z_{77} & Z_{67} & Z_{57} & Z_{47} \\ Z_{76} & Z_{66} & Z_{56} & Z_{46} \\ Z_{75} & Z_{65} & Z_{55} & Z_{45} \\ Z_{74} & Z_{64} & Z_{54} & Z_{44} \end{bmatrix} =$$

$$E^T X_{ee}E - E^T X_{oe}O - O^T X_{eo}E + O^T X_{oo}O$$

Similar to 2-D DCT, the 2-D IDCT $Z = A^T X A$ is also simplified from three 8×8 matrix multiplications to four 4×4 matrix multiplications $E^T X_{ee}E$, $E^T X_{oe}O$, $O^T X_{eo}E$ and $O^T X_{oo}O$, where each of them can be calculated as the matrix product of three 4×4 matrices, the "half-size" operations compared with original 8×8 one. Since the matrices P7, P8, P9 and P10 used in Eq. (3.45) are all pure permutation matrices, so no extra multiplication has been introduced for computing $X_{ee}$, $X_{oe}$, $X_{eo}$ and $X_{oo}$, Generally speaking, each element of matrix Z can be calculated with the same general formula as $$\sum_{l=0}^{3} \sum_{k=0}^{3} [x_{kl}^{ee} \cdot (e_{ki}e_{lj}) \pm x_{kl}^{oe} \cdot (e_{ki}o_{lj}) \pm x_{kl}^{eo} \cdot (o_{ki}e_{lj}) \pm x_{kl}^{oo} \cdot (o_{ki}o_{lj})] \quad (3.50)$$

where $X_{ee} = [x_{kl}^{ee}]$, $X_{oe} = [x_{kl}^{oe}]$, $X_{eo} = [x_{kl}^{eo}]$, $X_{oo} = [x_{kl}^{oo}]$, $E = [e_{ki}]$ and $O = [o_{ij}]$.

3.4 Further Simplification of the 4×4 Matrix Multiplications

Eq. (3.25) and Eq. (3.49) show that the core components of the 2-D DCT and 2-D IDCT algorithms are four matrix products, where each of them consists of the matrix multiplications of three 4×4 matrices.

Generalizing the product of three 4×4 matrices, such as $EX_{++}E^T$, $EX_{-+}O^T$, $OX_{+-}E^T$, $OX_{--}O^T$, $E^T X_{ee}E$, $E^T X_{oe}O$, $O^T X_{eo}E$ and $O^T X_{oo}O$, as:

$$V_{4 \times 4} = B_{4 \times 4} U_{4 \times 4} C_{4 \times 4}^T \quad (3.51)$$

and the function unit to implement $B_{4 \times 4} U_{4 \times 4} C_{4 \times 4}^T$ is considered as a sub-block unit. For $V = [v_{ij}]$, $B = [b_{ij}]$, $U = [u_{ij}]$ and $C = [c_{ij}]$, the multiplications of the three 4×4 matrices can be carried out by switching the order of the $\Sigma$ and combining the $b_{ik}$ and $c_{jl}$ together such that each element of matrix V can be determined as:

$$v_{ij} = \sum_{l=0}^{3} \left( \sum_{k=0}^{3} b_{ik} u_{kl} \right) \cdot c_{jl} = \sum_{l=0}^{3} \sum_{k=0}^{3} b_{ik} u_{kl} c_{jl} = \sum_{l=0}^{3} \sum_{k=0}^{3} u_{kl} \cdot (b_{ik} c_{jl}) \quad (3.52)$$

From this equation, one can see that each $v_{ij}$, $0 \leq i, j \leq 3$, is expressed as a sum of products of $u_{kl} \cdot (b_{ik} c_{jl})$ for $0 \leq k, l \leq 3$, where $u_{kl}$ is a function of the input sequence X (see Eq. (3.22) and (3.45) above), and $b_{ik} c_{jl}$ is a function of the coefficient matrix A (see Eq. (3.10) above) and can be pre-calculated as one of the $\pm w_m w_n$, $1 \leq m, n \leq 7$. Since each $w_m$ defined in Eq. (3.2) has 7 possible values, there are total 28 different combinations for pre-calculated constants $w_m w_n$, $1 \leq m, n \leq 7$.

Since $b_{ik} c_{jl}$ is a pre-calculated constant, the multiplication $u_{kl} \cdot (b_{ik} c_{jl})$ falls into the pattern x·d, which, in fact, is a variable multiplied by a constant instead of the multiplication between two variables as x·y. The multiplication between a variable and a constant can be very easily implemented by a group of hardwired adders with not need for using real multiplier.

Further reviewing of multiplication $u_{kl} \cdot (b_{ik} c_{jl})$ as a basic processing element (PE) of the proposed 2-D DCT/IDCT algorithm shows that because the computation of $u_{kl} \cdot (b_{ik} c_{jl})$ is exactly the same as computing x·d, this algorithm only suffers one coefficient quantization loss and one computation truncation loss when the $X_{xx}$ are used to directly compute the final 2-D DCT/IDCT output results in Eq. (3.52) (given there is no truncation loss for all additions and subtractions in Eq. (3.49) for 2-D IDCT). In contrast, the row-column decomposition method suffers at least two coefficient quantization losses and two computation truncation losses—one occurs when computing the 1-D column transform and another one occurs when computing the 1-D row transform, and it is prone to both accumulated errors and error propagation from the first 1-D to the second 1-D transform. Thus, much higher computation accuracy can be achieved by the proposed algorithm given that the same finite wordlength is adopted by both approaches.

Since each 4×4 sub-block can be implemented without multipliers, the proposed algorithms can be implemented with only adders and subtractors as the basic processing elements (PE). This results in a great reduction of the complexity and design cost of hardware implementations.

Besides, each 4×4 sub-block is totally independent from other sub-blocks in the proposed 2-D DCT and 2-D IDCT algorithm. There is no communication interconnections among the four sub-blocks in either 2-D DCT or 2-D IDCT computation, which means the drawback of complex global communication interconnection associated with other existing direct 2-D DCT and 2-D IDCT approaches has been overcome by the reduction of routing complexity for hardware implementations.

Another advantage brought up by the localized interconnection is that a paralleled architecture can be adopted to implement the four 4×4 sub-blocks independently. Parallel data in and parallel data out I/O scheme will guarantee that the system throughput can meet the requirements of current and future video applications.

3.5 Summary

In this section, an algorithm to compute 2-D 8×8 DCT/IDCT according to the present invention has been presented. Based on direct 2-D coefficient matrix factorization approach, the 8×8 DCT/IDCT can be calculated through four 4×4 sub-blocks, which are only "half-size" of the original one.

Further simplification of the core component—4×4 sub-block shows that this direct 2-D approach not only is more computation efficient and requires a smaller number of multiplications, but also has localized interconnection and can be easily implemented with paralleled structure to accommodate four independent sub-blocks.

Moreover, each multiplication in this scheme has been confined as a variable multiplied by a constant instead of two variables in general. Every multiplication operation can be very easily fulfilled by a group of hardwired adders and the whole 2-D DCT/IDCT computation can be carried out by using only adders and subtractors. The higher computation accuracy of this scheme means that a shorter finite internal wordlength can be used in the hardware implementation of the algorithm while the same accuracy requirements for both 2-D DCT/IDCT can still be met. A shorter internal finite wordlength means that fewer number of registers and less complicated circuit are required for the hardware implementation.

The simplified processing elements (just adders and subtractors, no multiplier is required), paralleled sub-block structure, localized interconnection and shorter finite internal wordlength associated with the proposed 2-D DCT/IDCT algorithm demonstrate that the proposed algorithm is a perfect candidate for VLSI implementation.

4.0 FINITE WORDLENGTH SIMULATIONS

In this section, finite wordlength simulations of a 2-D DCT/IDCT algorithm according to an embodiment of the present invention are carried out. The simulation results show that the algorithm can meet JPEG 2-D IDCT specification with only 16-bit finite internal wordlength for the arithmetic operations, which means that all additions, subtractions and multiplications required in this algorithm use no more than 16-bit.

4.1 Introduction

In the hardware implementation of any algorithm, there are tight trade-offs among various quantities like accuracy, speed and chip area, etc. For a 2-D DCT or IDCT algorithm, it is coefficient quantization and finite wordlength truncation that are the two major factors which decide the accuracy, speed and chip area.

To represent any cosine coefficient $\cos(i\pi/16)$, i=0, 1, ..., 15, with finite wordlength introduces coefficient quantization (or coefficient approximation) errors. Furthermore, the implementation of any arithmetic operation with finite internal wordlength arithmetic (due to fixed register length) introduces truncation (or rounding) errors. To minimize the effects of quantization errors, more bits are needed to approximate the cosine coefficients $\cos(i\pi/16)$, which would require wider inputs for multipliers. To minimize the effect of truncation errors, wider registers are required for each arithmetic operation. Doing so, however, results in a slower critical path a larger chip area for each execution unit. In fact, the optimal coefficient and register width can lead to a higher speed and a smaller chip area. However, both widths should be chosen to ensure the minimum accuracy criteria for 2-D DCT specified by ITU-T Recommendation H.261 and 2-D IDCT specified by the Joint CCITT/ISO committee (JPEG).

For a 2-D DCT, the final result is computed by using Eq. (3.52), where all other quantities can be precisely pre-computed. For a 2-D IDCT, the final result cam be computed by using Eq. (3.52) and (3.49), where both coefficient quantization errors and finite wordlength truncation errors are still determined by Eq. (3.52). So the error analysis will be focused on all the arithmetic operations of Eq. (3.52).

In section 4.2, the coefficient quantization error effects for the algorithm according to the present invention are investigated. In section 4.3, the focus is shifted to the effects of arithmetic operations with different finite internal wordlengths. One optimal candidate for VLSI implementation, which combines optimal coefficient quantization errors and truncation errors, is presented in section 4.4.

4.2 Coefficient Quantization Error Effects

For the coefficients $w_1=(\frac{1}{2})\cos(i\pi/16)$ in Eq. (3.2) one can factor the constant "½" out of each $w_i$. By using $\cos(i\pi/16)$ instead of $w_l$ in Eq. (3.3) and (3.28), one must scale by four, which can be overcome by shifting the final results right for two bits. Let's define new coefficient parameters $\Omega_{ij}$ as:

$$\Omega_{ij}=4w_iw_j=4w_jw_i=\cos(i\pi/16)\cos(j\pi/16) \quad (4.1)$$

Since $0<\cos(i\pi/16)<1$, the $\Omega_{ij}$ would still fall into the range $0<\Omega_{ij}<1$, i,j=0, 1, ..., 7. In Eq. (4.1), the calculation of $\cos(i\pi/16)\cos(j\pi/16)$ can be precisely pre-computed so that there is no precision loss. And the quantization error is greatly reduced as only one approximation error instead of two approximation errors is associated with each multiplication unit $(u_{kl}\Omega_{ij})$.

In rest of the section 4.2, the impact of coefficient quantization errors for the algorithm according to the present invention is investigated. The impact of truncation errors caused by finite wordlength can be overcome by using a total of 31-bit in Eq. (3.52) for both 2-D DCT and 2-D IDCT.

Table 4.1 shows a 16-bit representation for the coefficients $\Omega_{ij}$, which is the highest quantization precision used in the simulation for the proposed algorithm. The maximum quantization error with 16-bit representation for all $\Omega_{ij}$ is 0.000007.

TABLE 4.1

16-bit Representation of Coefficient $\Omega_{ij}$

| $\Omega_{ij}$ (Hex) | j = 1 | j = 2 | j = 3 | j = 4 | j = 5 | j = 6 | j = 7 |
|---|---|---|---|---|---|---|---|
| i = 1 | 0.F642 | 0.E7F8 | 0.D0C4 | 0.B18B | 0.8B7E | 0.6016 | 0.30FC |
| i = 2 |  | 0.DA83 | 0.C4A7 | 0.A73D | 0.8366 | 0.5A82 | 0.2E24 |
| i = 3 |  |  | 0.B0FC | 0.9683 | 0.7642 | 0.5175 | 0.2987 |
| i = 4 |  |  |  | 0.8000 | 0.6492 | 0.4546 | 0.2351 |
| i = 5 |  |  |  |  | 0.4F04 | 0.366D | 0.1BBF |
| i = 6 |  |  |  |  |  | 0.257E | 0.131D |
| i = 7 |  |  |  |  |  |  | 0.09BE |

4.2.1 2-D DCT Simulation Results

The simulation of quantization errors for an example of a 2-D DCT algorithm according to the present invention is carried out on 10,000 sets of W input data. Each input data is randomly generated within the range of −256 to 255. The final 2-D DCT outputs are rounded to 12-bit integers.

The accuracy requirements for the 2-D DCT simulations are adopted from the H.261 Specification. Each of the W DCT output pixels should be in compliance with the specification for parameters like Peak Pixel Error, Peak Pixel Mean Square Error, Overall Mean Square Error, Peak Pixel Mean Error and Overall Mean Error for each of the 10,000 block data sets generated above. The reference data used in the statistical calculation are generated by the formula in Eq. (2.32). Additionally, the error of DC component is analyzed since it is the most important parameter for 2-D DCT. The simulation results and accuracy requirements of H.261 for 2-D DCT are shown in Table 4.2.

TABLE 4.2

Coefficient quantization effects for 2-DCT

| Quantization Length of $\Omega_{ij}$ | Peak Pixel Error | Peak Pixel Mean Square Error | Overall Mean Square Error | Peak Pixel Mean Error | Overall Mean Error | Fixed-point DC Error |
|---|---|---|---|---|---|---|
| H.261 Spec | ≤1 | ≤0.06 | ≤0.02 | ≤0.015 | ≤0.0015 |  |
| 8-bit | 1.3425 | 0.073803 | 0.025681 | 0.005270 | 0.000109 | 0 |
| 9-bit | 0.8204 | 0.039675 | 0.011384 | 0.003949 | 0.000024 | 0 |
| 10-bit | 0.5130 | 0.010145 | 0.003495 | 0.001760 | 0.000125 | 0 |
| 11-bit | 0.2457 | 0.002973 | 0.001227 | 0.001084 | 0.000080 | 0 |
| 12-bit | 0.1137 | 0.000653 | 0.000445 | 0.000690 | 0.000014 | 0 |
| 13-bit | 0.0563 | 0.000156 | 0.000116 | 0.000297 | 0.000025 | 0 |
| 14-bit | 0.0400 | 0.000068 | 0.000041 | 0.000155 | 0.000003 | 0 |
| 15-bit | 0.0221 | 0.000028 | 0.000011 | 0.000092 | 0.000013 | 0 |
| 16-bit | 0.0084 | 0.000005 | 0.000002 | 0.000031 | 0.000001 | 0 |

From above table, one can see that the computation accuracy of the proposed 2-D DCT algorithm drops gradually when the coefficient representations are reduced from 16-bit to 8-bit. And at least 9-bit coefficient representation for $\Omega_{ij}$, which is equivalent to the 4.5 bits coefficient representation for each $\cos(i\pi/16)$, is required in order to meet the 2-D DCT accuracy requirements by H.261. The graphic expressions of the simulation results are also illustrated in FIG. 9.

4.2.2 2-D IDCT Simulation Results

In contrast with 2-D DCT, 2-D IDCT simulations of the proposed algorithm need to be carried out in much more complicated way, which can be summarized as [JPEG, RY90]:

(1) Generate random integer data values in the range −L to +H.10,000 block sets of 8×8 input data should be generated for (L=300, H=300), (L=256, H=255) and (L=5, H=5), each;

(2) For each 8×8 input data, 2-D DCT is performed with at least 64-bit floating point accuracy;

(3) For each block, the 8×8 transformed results are rounded to the nearest integer values and clipped to the range −2048 to +2047;

(4) The "reference" 2-D IDCT output results are computed with at least 64-bit floating point accuracy, in which the input data are the data generated in step (3), the output data are clipped to the range −256 to +255;

(5) The proposed 2-D IDCT algorithm ("test") is used to compute 2-D IDCT output data with the same input data generated in step (3);

(6) For each of the W IDCT output pixels-in 10000 block sets, measure the peak, mean, and mean square errors between the "reference" and "test" data.

The simulations of quantization error effects for proposed 2-D IDCT algorithm are also carried out on 10,000 sets of randomly generated 8×8 input blocks. The 2-D IDCT output data are rounded to 9-bit integer through saturation control with ±0.5 adjustment (based on the ±sign of each number). Several important parameters, such as Peak Pixel Error, Peak Pixel Mean Square Error, Overall Mean Square Error, Peak Pixel Mean Error and Overall Mean Error, are summarized in Table 4.3 for total 10,000 sets simulation. The results calculated with 2-D IDCT formula in Eq. (2.33) have been used as "reference", and the input data range is from −256 to +255.

From Table 4.3, a conclusion similar to the proposed 2-D DCT algorithm can be reached: the computation accuracy of the proposed 2-D IDCT algorithm drops gradually when the coefficient quantization precision is reduced from 16-bit to 8-bit. And at least 9bit coefficient representation for $\Omega_{ij}$, which is equivalent to the 4.5 bits coefficient representation for each $\cos(i\pi/16)$, is required in order to meet the 2-D IDCT accuracy requirements by JPEG. The specification and the results for all required input data ranges, are illustrated in Table 4.4. The graphic expressions of the simulation results are also illustrated in FIG. 10.

TABLE 4.3

Coefficient quantization effects for 2-D IDCT

| Quantization Length of $\Omega_{ij}$ | Peak Pixel Error | Peak Pixel Mean Square Error | Overall Mean Square Error | Peak Pixel Mean Error | Overall Mean Error |
|---|---|---|---|---|---|
| JPEG Spec | ≦1 | ≦0.06 | <0.02 | ≦0.015 | ≦0.0015 |
| 8-bit | 1.7694 | 0.156273 | 0.151710 | 0.005913 | 0.000003 |
| 9-bit | 0.4973 | 0.011707 | 0.011359 | 0.002877 | 0.000018 |
| 10-bit | 0.2869 | 0.003702 | 0.003574 | 0.001670 | 0.000007 |
| 11-bit | 0.1653 | 0.001346 | 0.001303 | 0.000811 | 0.000007 |
| 12-bit | 0.1126 | 0.000545 | 0.000523 | 0.000600 | 0.000007 |
| 13-bit | 0.0651 | 0.000204 | 0.000197 | 0.000360 | 0.000004 |
| 14-bit | 0.0480 | 0.000127 | 0.000123 | 0.000256 | 0.000013 |
| 15-bit | 0.0369 | 0.000095 | 0.000093 | 0.000228 | 0.000016 |
| 16-bit | 0.0320 | 0.000086 | 0.000083 | 0.000261 | 0.000006 |

TABLE 4.4

Simulation results for 2-D IDCT with 9-bit $\Omega_{ij}$ quantization

| Input Data Range (−L to +H) | Peak Pixel Error | Peak Pixel Mean Square Error | Overall Mean Square Error | Peak Pixel Mean Error | Overall Mean Error |
|---|---|---|---|---|---|
| JPEG Spec | ≦1 | ≦0.06 | ≦0.02 | ≦0.015 | ≦0.0015 |
| L = 256, H = 255 | 0.4973 | 0.011707 | 0.011359 | 0.012877 | 0.000018 |
| L = 300, H = 300 | 0.5642 | 0.016135 | 0.015625 | 0.012206 | 0.000010 |
| L = 5, H = 5 | 0.0449 | 0.000236 | 0.000108 | 0.011574 | 0.000005 |

4.3 Truncation Error Effects

In order to determine the truncation errors for an example of an algorithm according to the present invention, different finite internal worldlengths are used in all arithmetic operations whereas the $\Omega_{ij}$ coefficient quantization is kept as fixed 16-bit precision. For both the 2-D DCT and 2-D IDCT, the corresponding maximum finite wordlengths used in Eq. (3.52) are 30-bit.

4.3.1 2-D DCT Simulation Results

The finite wordlength simulations for the proposed 2-D DCT algorithm are carried out on 10,000 sets of randomly generated (in range of −256 to 255) W input data. All the parameters used in this section are the same ones used in section 4.2.1. The simulation results and accuracy requirements of H.261 for 2-D DCT are shown in Table 4.5.

TABLE 4.5

Finite wordlength truncation effects for 2-D DCT

| Finite Wordlengths | Peak Pixel Error | Peak Pixel Mean Square Error | Overall Mean Square Error | Peak Pixel Mean Error | Overall Mean Error | Fixed-point DC Error |
|---|---|---|---|---|---|---|
| H.261 Spec | ≦1 | ≦0.06 | ≦0.02 | ≦0.0015 | 0.0015 | |
| 14-bit | 1.8750 | 1.059886 | 0.097640 | 0.998788 | 0.15678 | 0 |
| 15-bit | 0.6257 | 0.021530 | 0.019566 | 0.004038 | 0.000070 | 0 |
| 16-bit | 0.3233 | 0.005382 | 0.004862 | 0.001518 | 0.000078 | 0 |
| 17-bit | 0.1593 | 0.001347 | 0.001221 | 0.001022 | 0.000018 | 0 |
| 18-bit | 0.0802 | 0.000338 | 0.000307 | 0.000476 | 0.000018 | 0 |
| 20-bit | 0.0214 | 0.000025 | 0.000021 | 0.000127 | 0.000001 | 0 |
| 22-bit | 0.0092 | 0.000006 | 0.000003 | 0.000089 | 0.000001 | 0 |
| 24-bit | 0.0085 | 0.000005 | 0.000002 | 0.000081 | 0.000001 | 0 |
| 26-bit | 0.0084 | 0.000005 | 0.000002 | 0.000085 | 0.000001 | 0 |
| 28-bit | 0.0084 | 0.000005 | 0.000002 | 0.000062 | 0.000001 | 0 |
| 30-bit | 0.0084 | 0.000005 | 0.000002 | 0.000031 | 0.000001 | 0 |

The simulation results clearly show that truncation errors do not have much effect until the finite wordlengths are reduced to less than 20-bit. Take parameter Peak Pixel Error for example, it has inverse linear relation with the finite wordlengths when they are equal or less than 20-bit, but it hardly changes when the finite wordlengths are more than 20-bit. And at least 15-bit internal wordlength is required in order to meet the 2-D DCT accuracy requirements by H.261.

Figure 4:
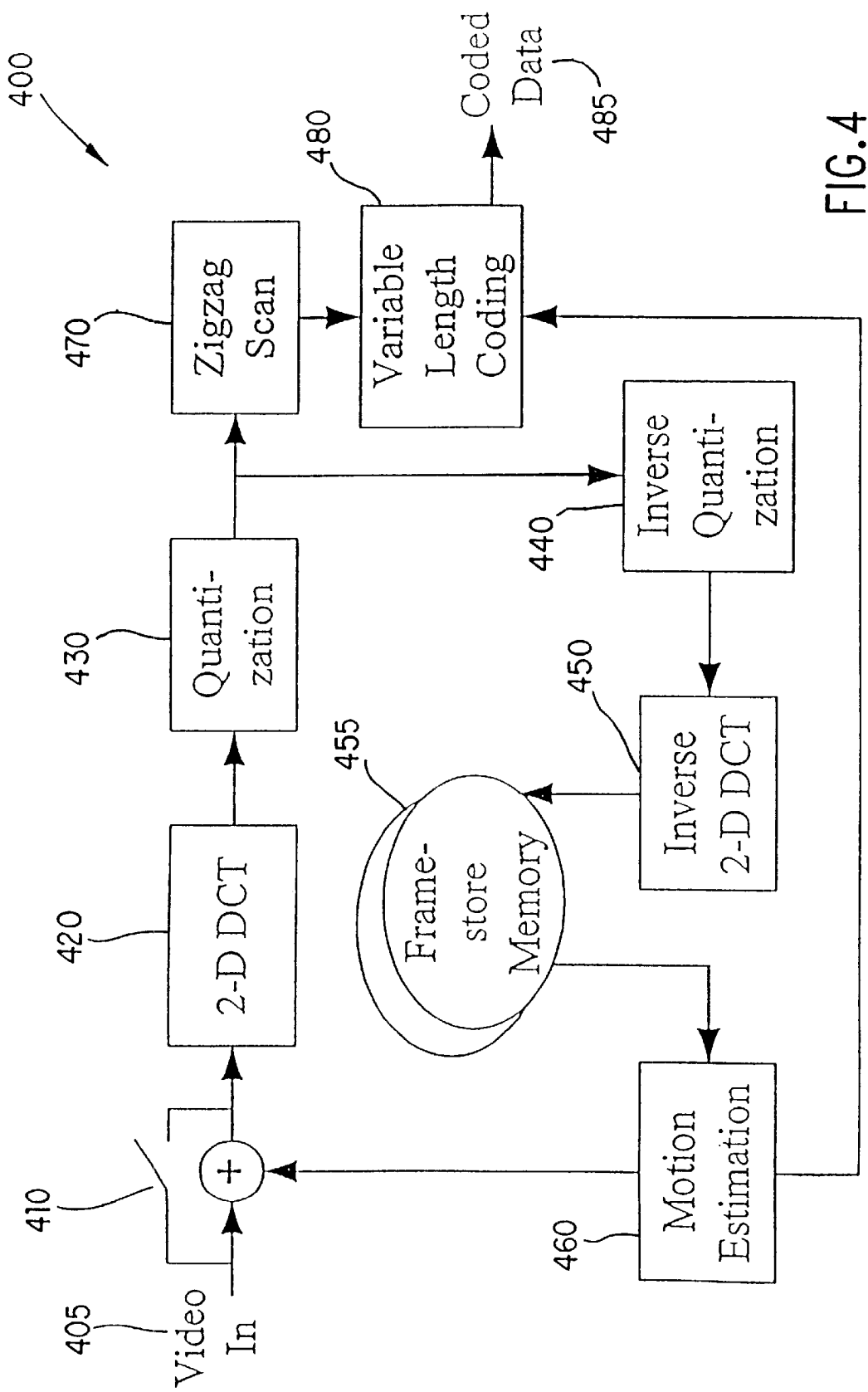
FIG. 4 is a diagram of an example simplified MPEG video encoding process.
Figure 5:
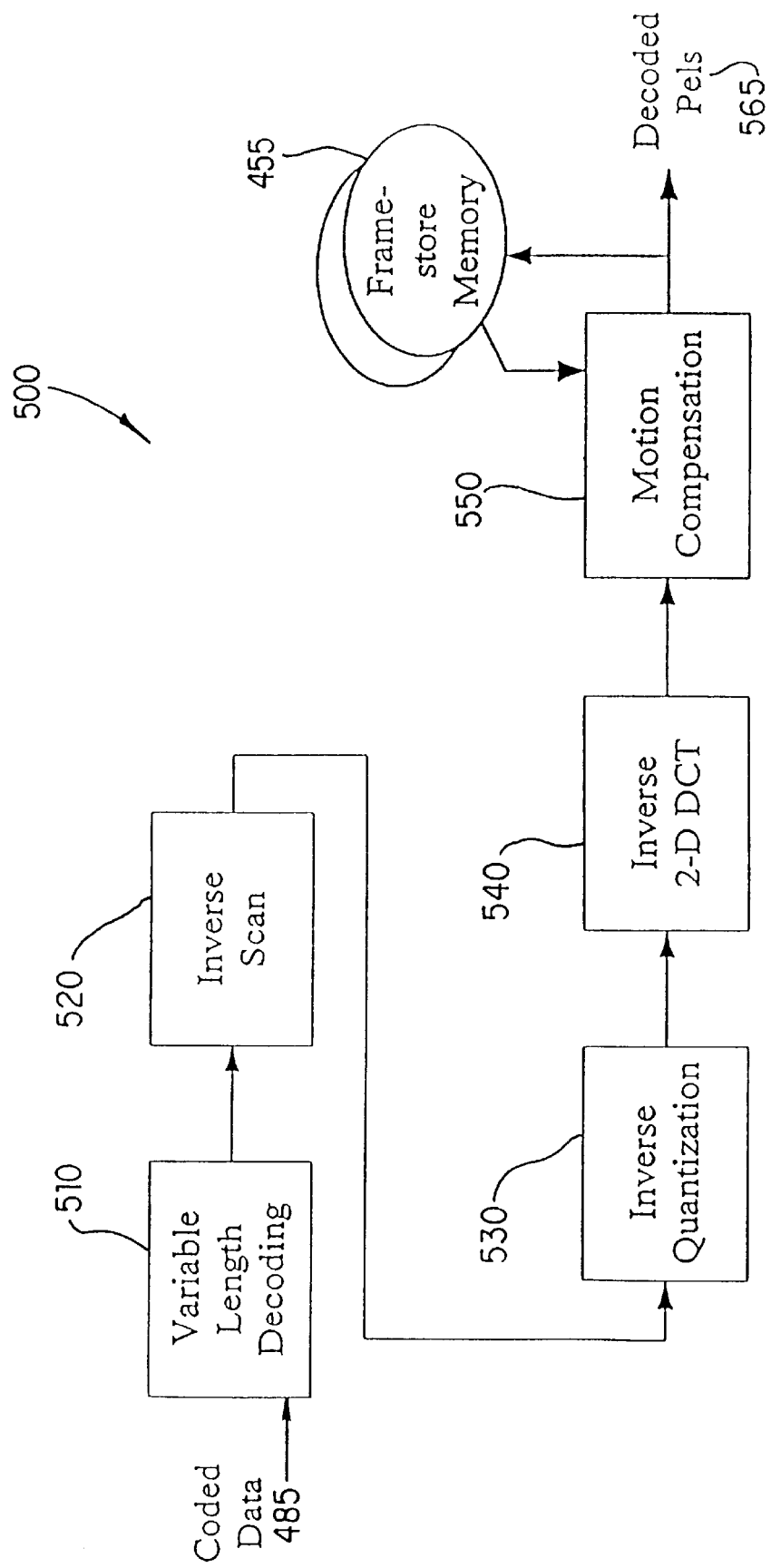
FIG. 5 is a diagram of an example simplified MPEG video decoding process.
Figure 6:
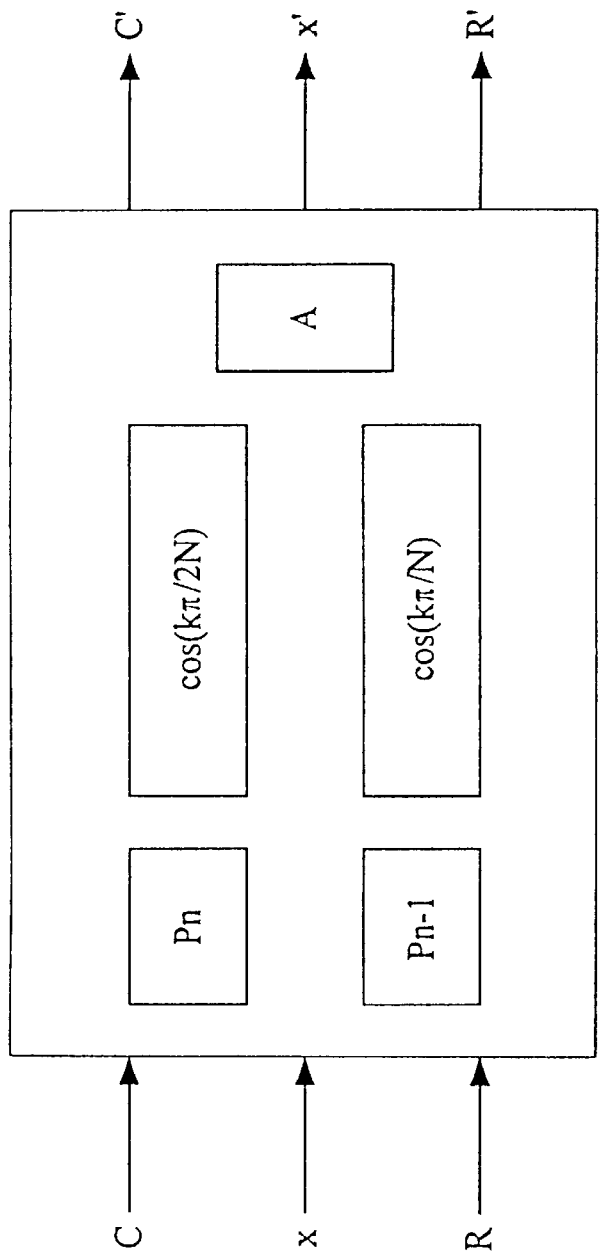
FIG. 6 is a block diagram of an example processing element cell k for a Chebyshev polynomial recurrence.
Figure 7:
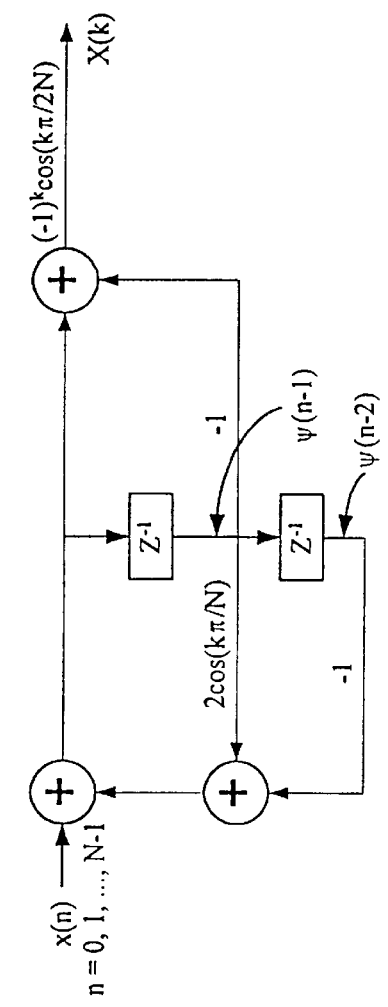
FIG. 7 is a block diagram of a recursive implementation of 1-D DCT based on Clenshaw's formula.
Figure 8:
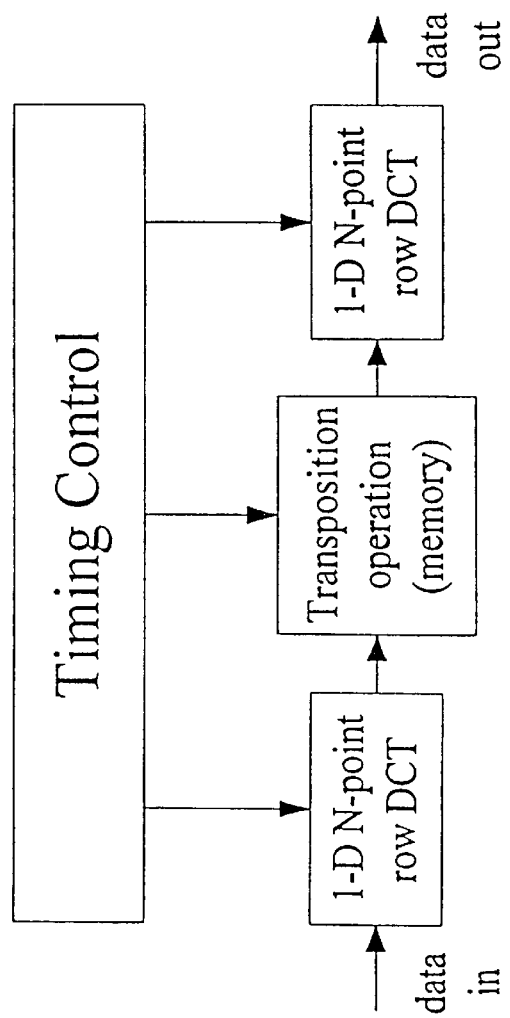
FIG. 8 is a block diagram of a row-column approach for performing a 2-D DCT.
Figure 9A:
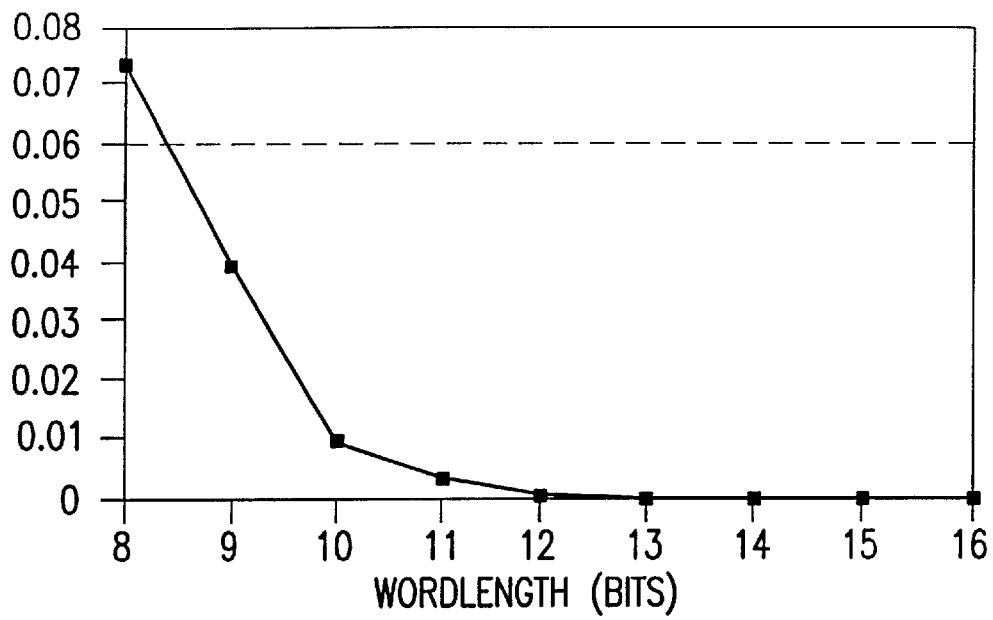
FIG. 9 shows five graphs of an example 2-D DCT simulation with finite coefficient word lengths according to the present invention.
Figure 9B:
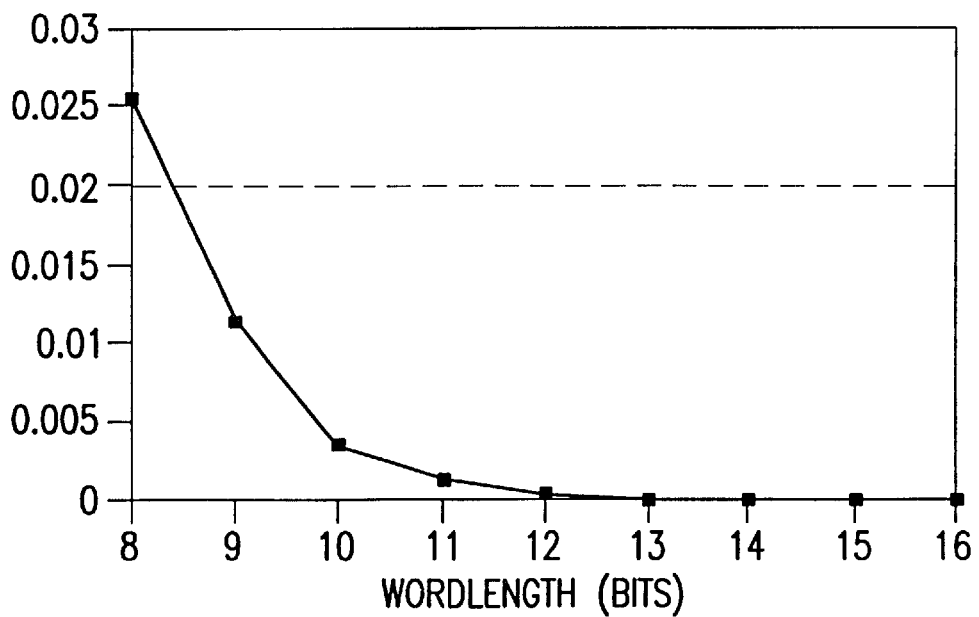
Figure 9C:
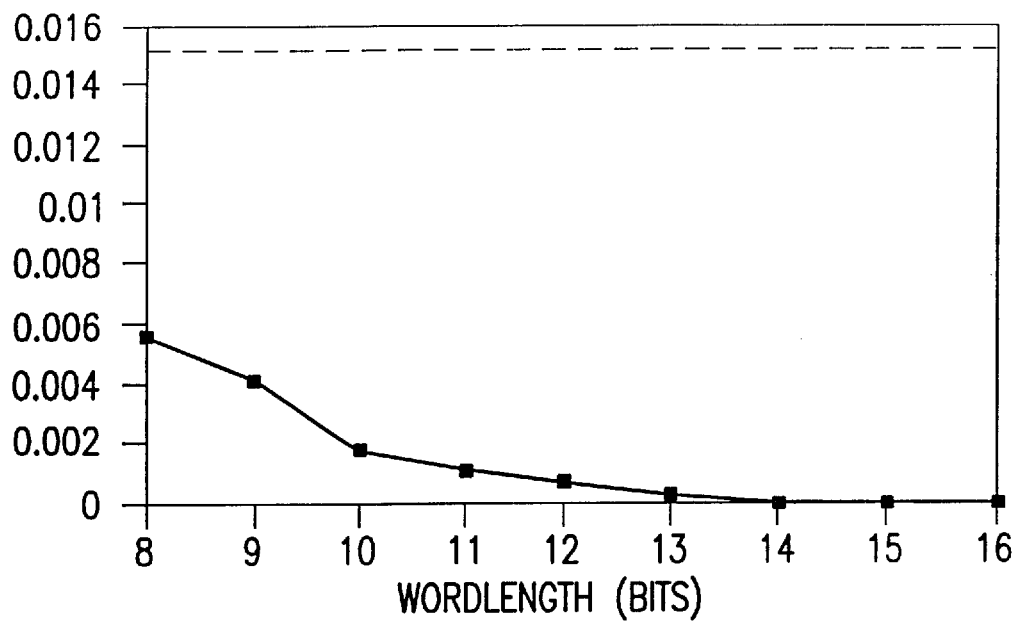
Figure 9D:
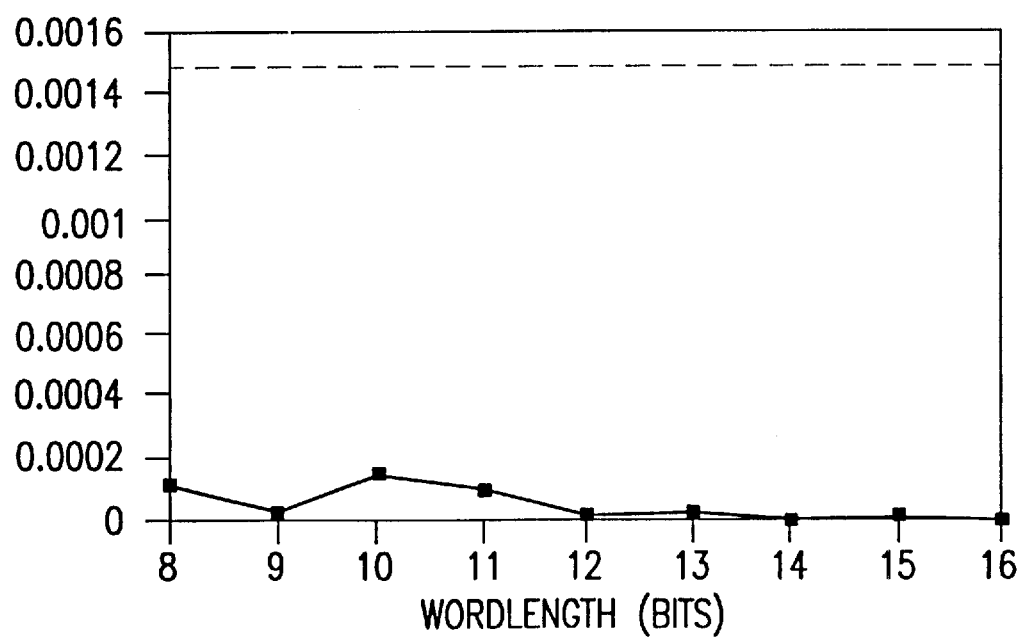
Figure 9E:
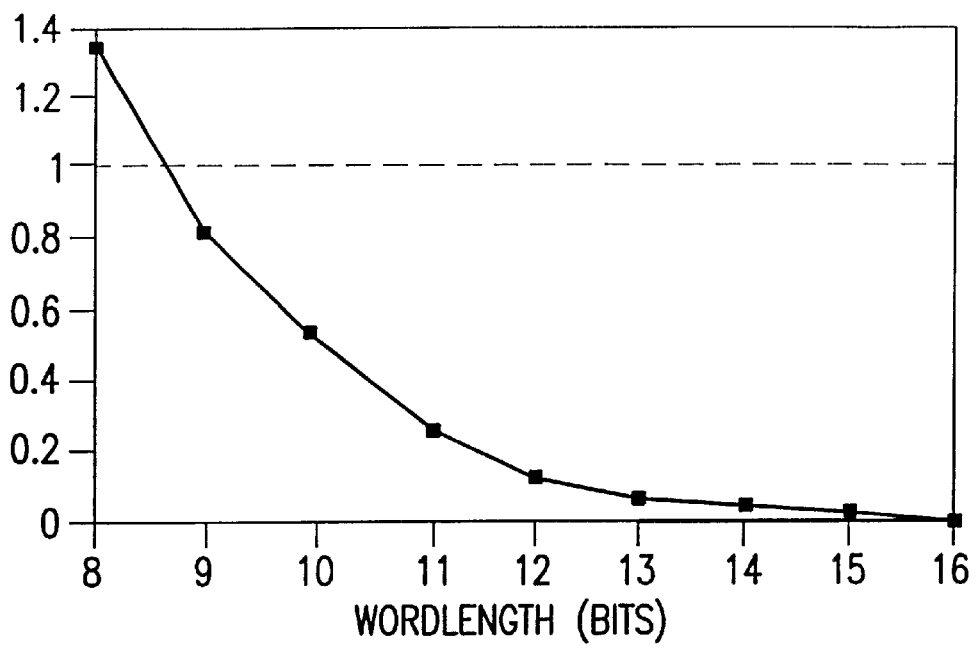
Figure 10A:
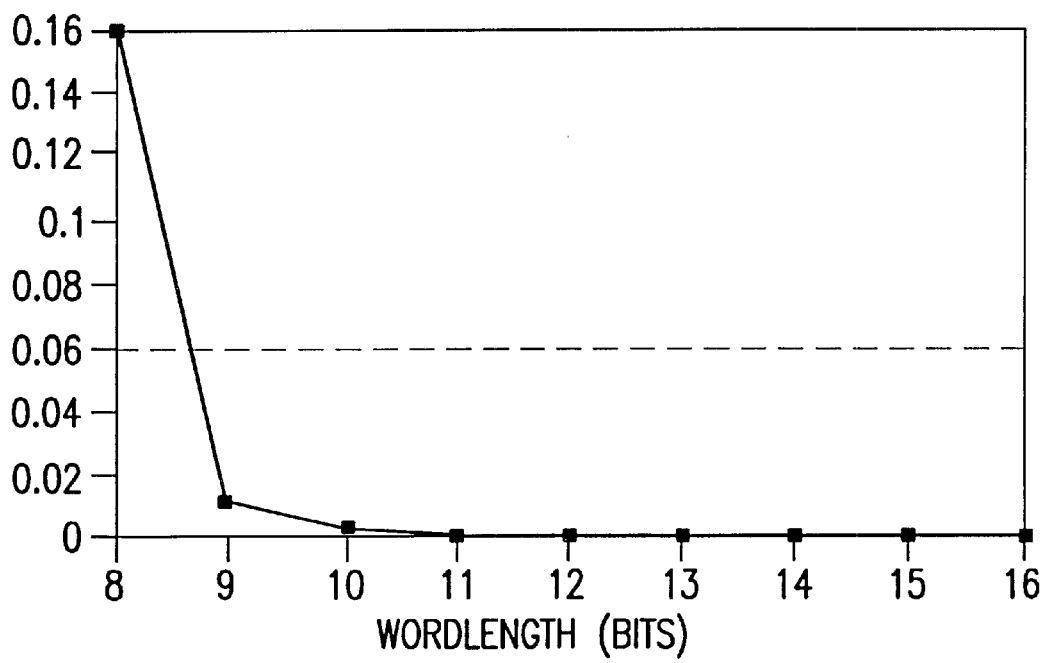
FIG. 10 shows five graphs of an example 2-D IDCT simulation with finite coefficient word lengths according to the present invention.
Figure 10B:
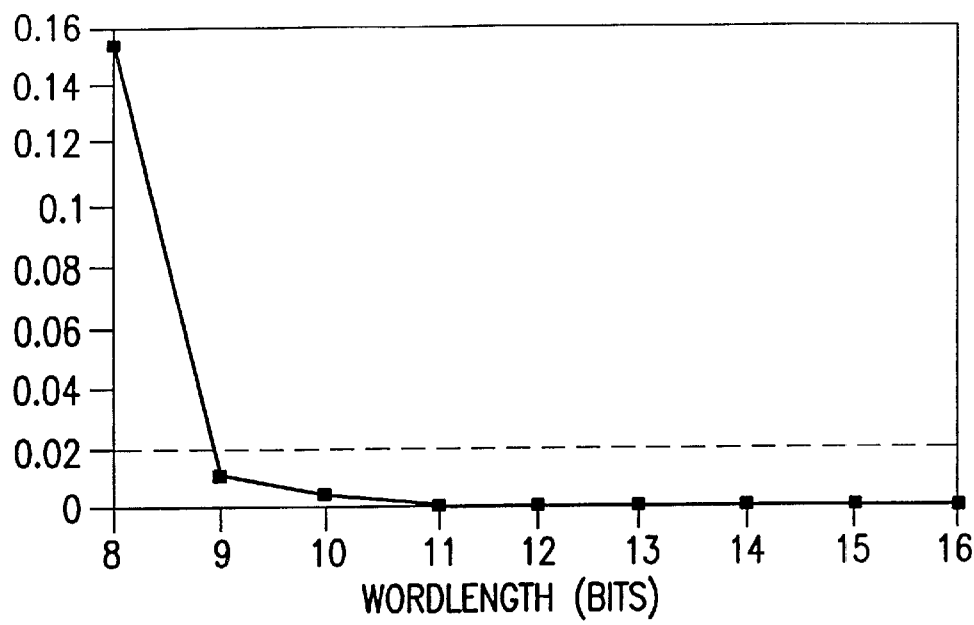
Figure 10C:
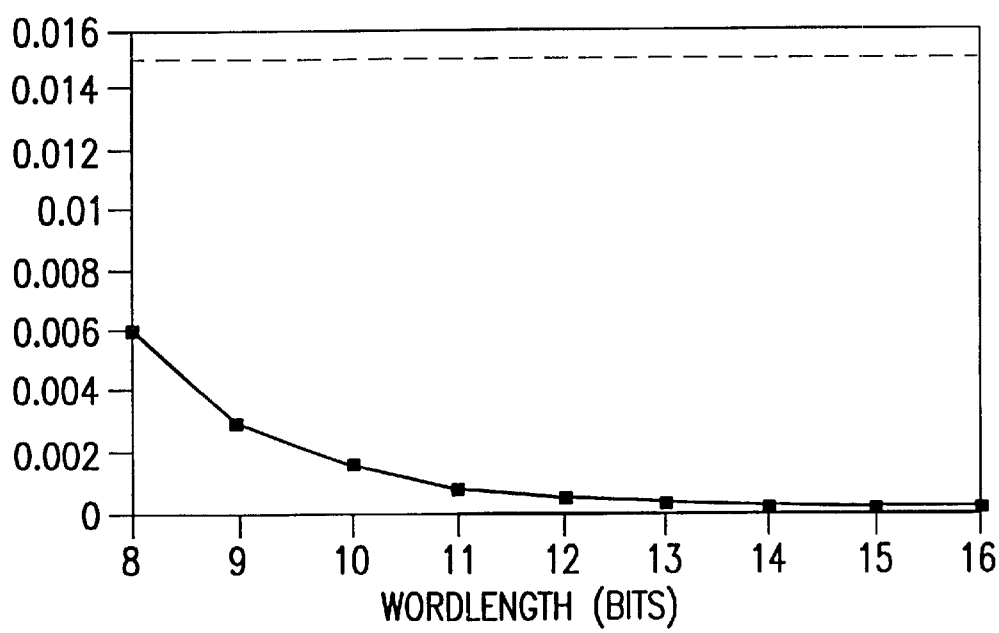
Figure 10D:
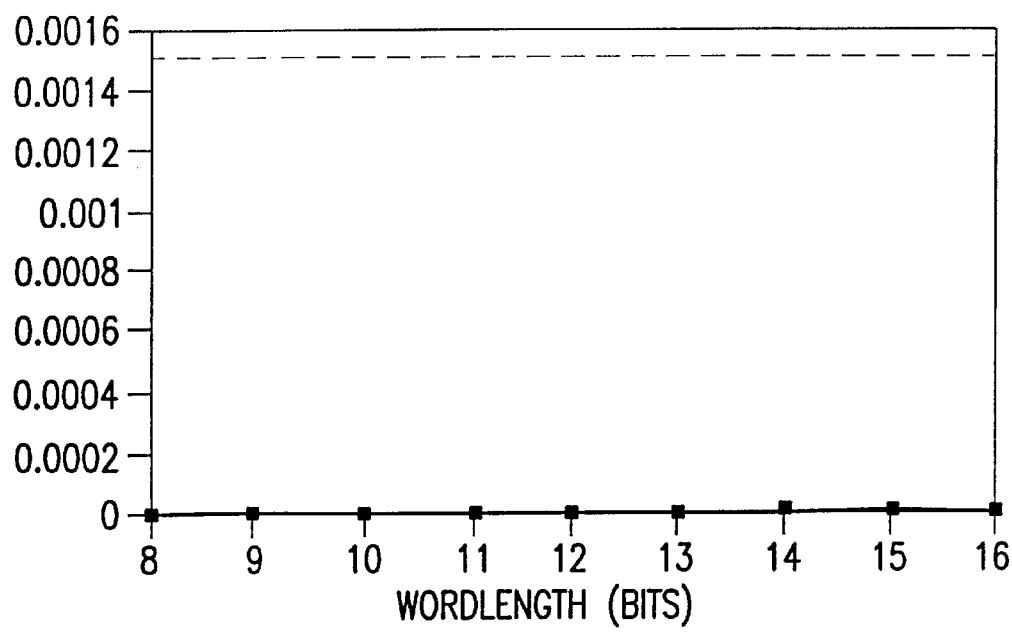
Figure 10E:
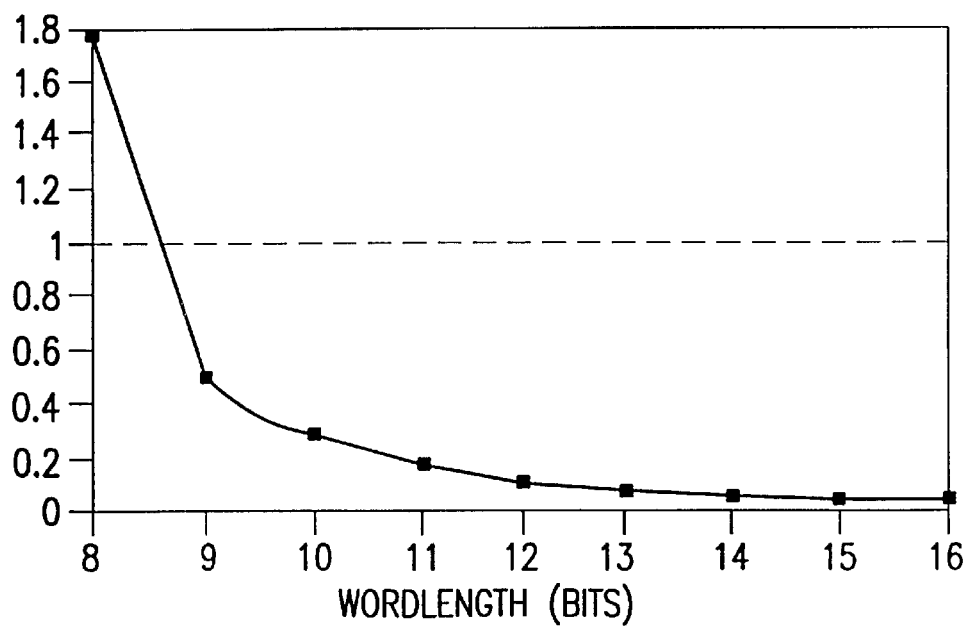
Figure 11A:
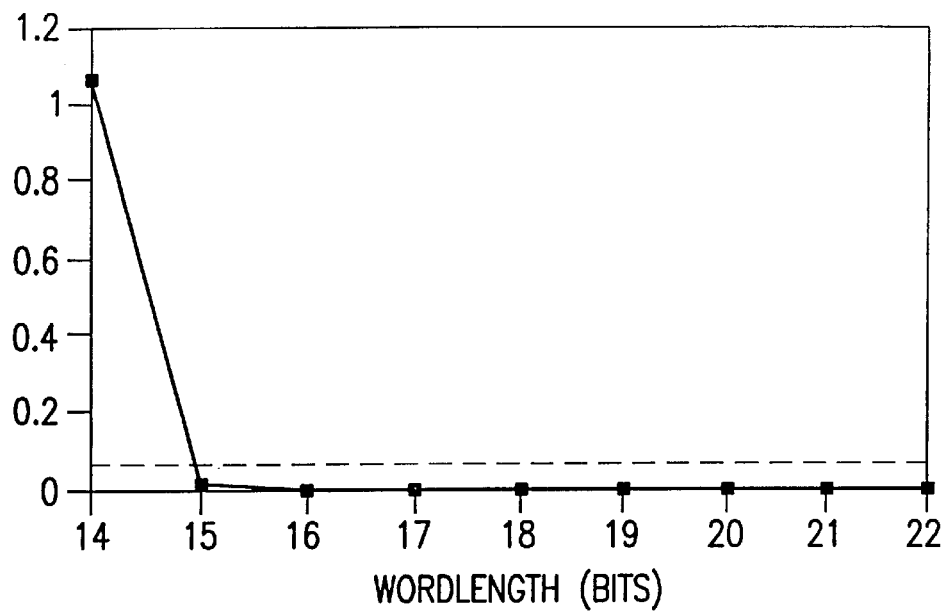
FIG. 11 shows five graphs of an example 2-D DCT simulation with finite truncation lengths according to the present invention.
Figure 11B:
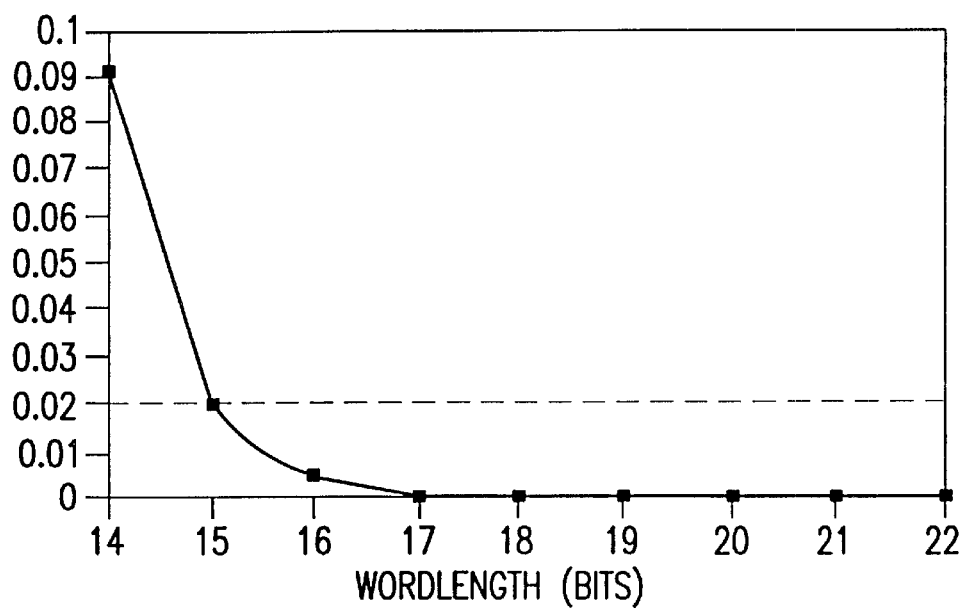
Figure 11C:
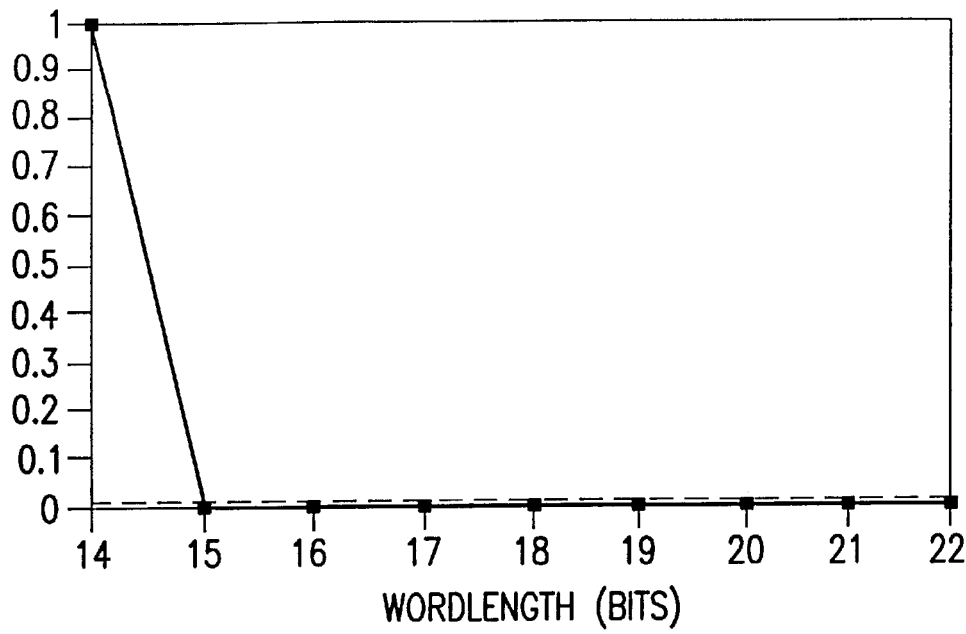
Figure 11D:
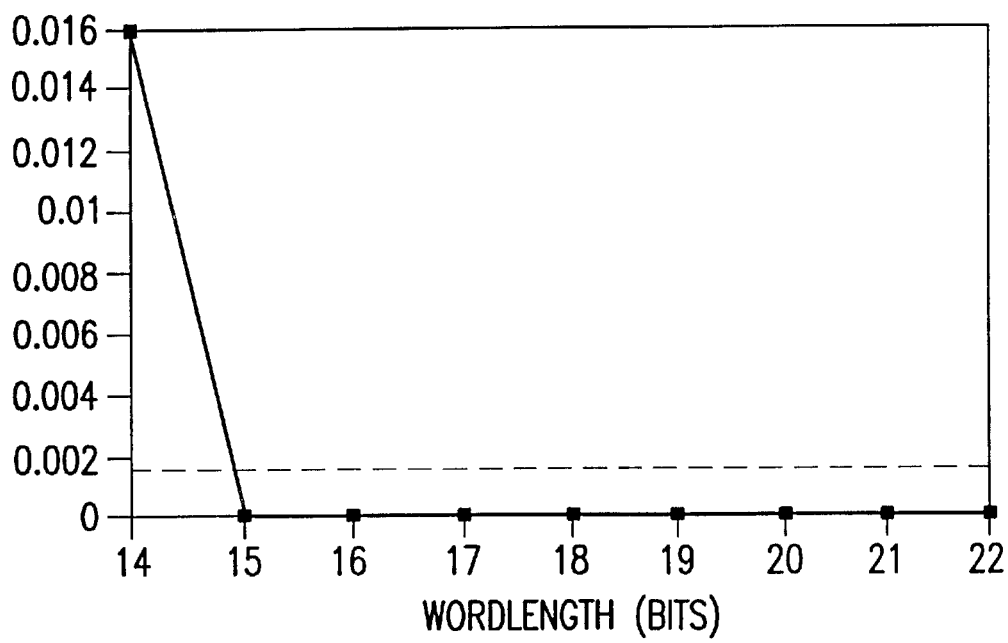
Figure 11E:
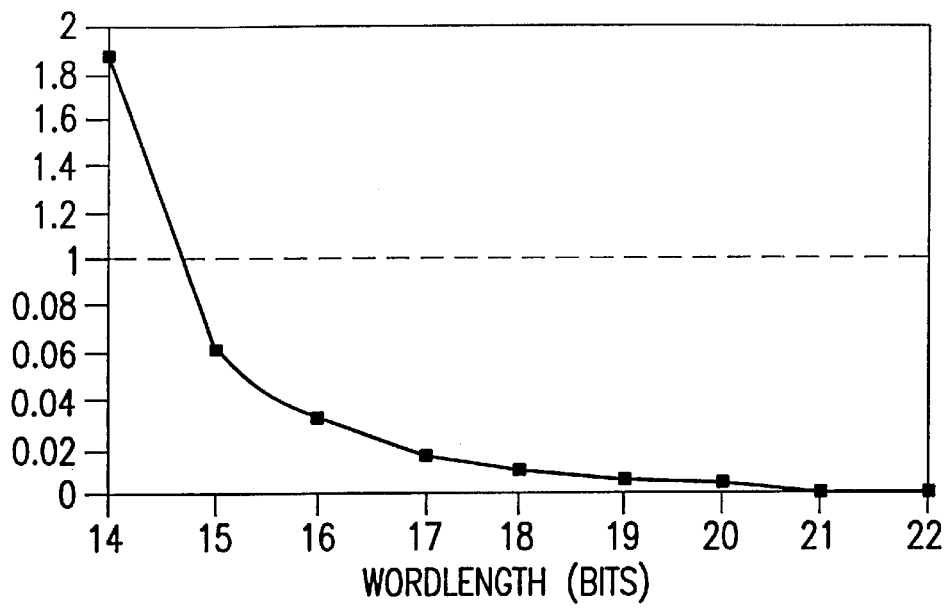
Figure 12A:
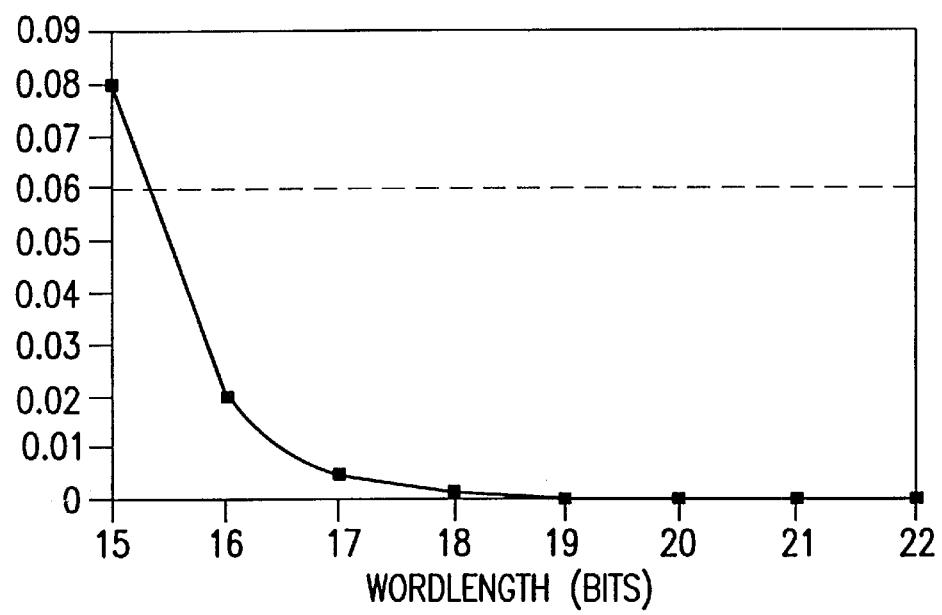
FIG. 12 shows five graphs of an example 2-D IDCT simulation with finite truncation lengths according to the present invention.
Figure 12B:
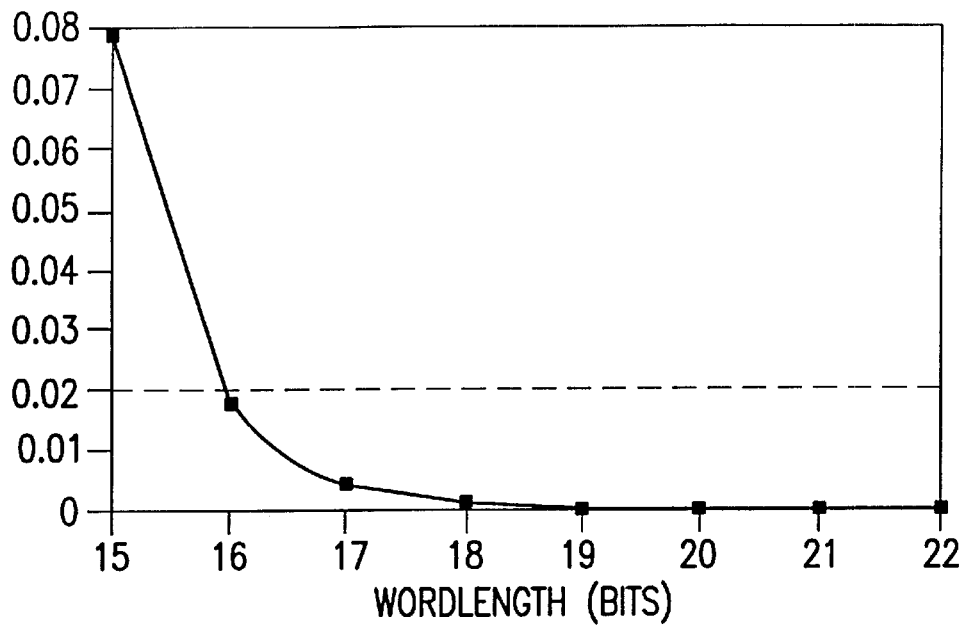
Figure 12C:
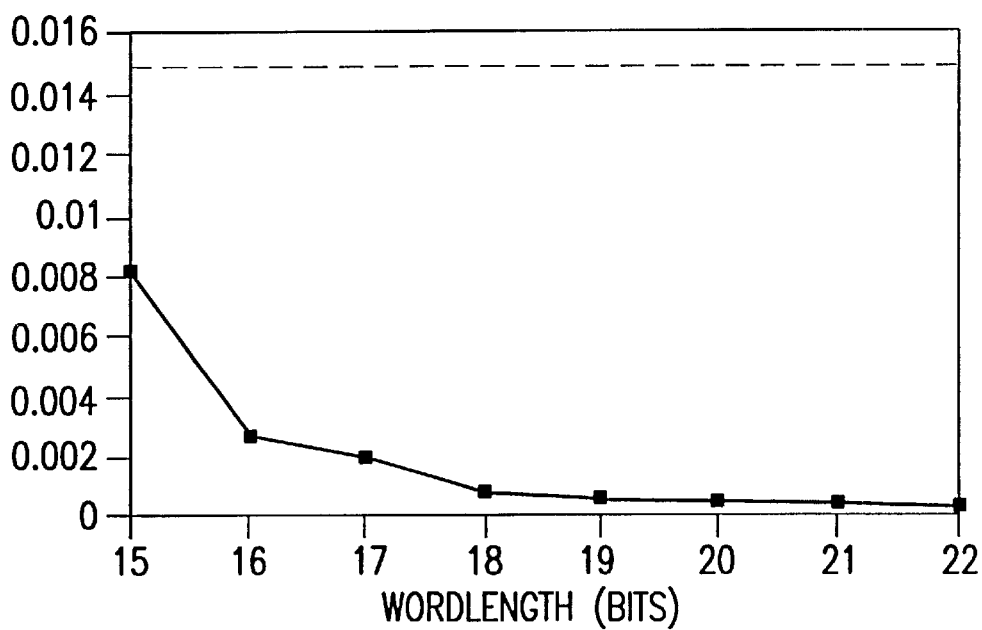
Figure 12D:
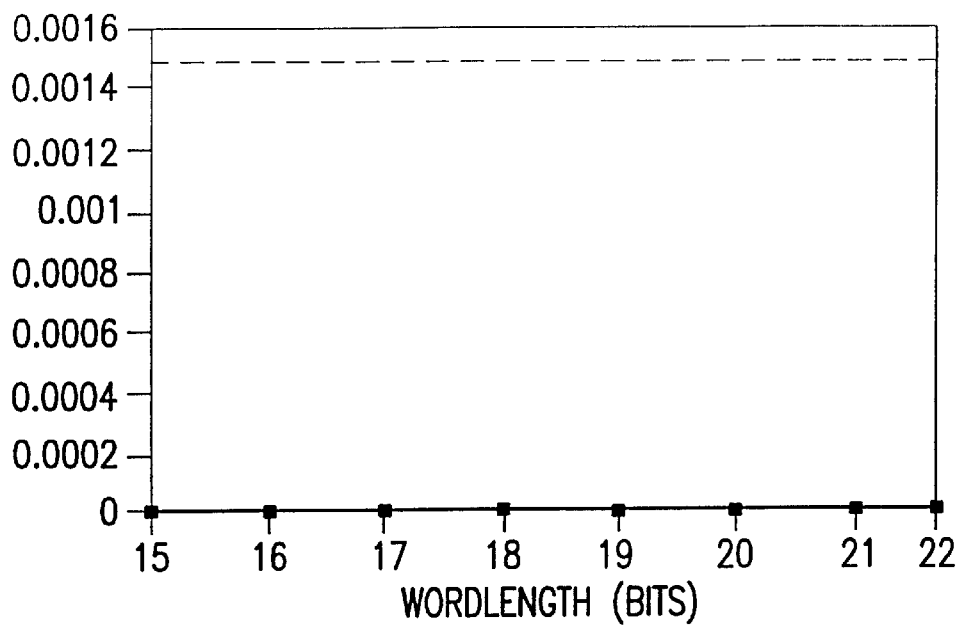
Figure 12E:
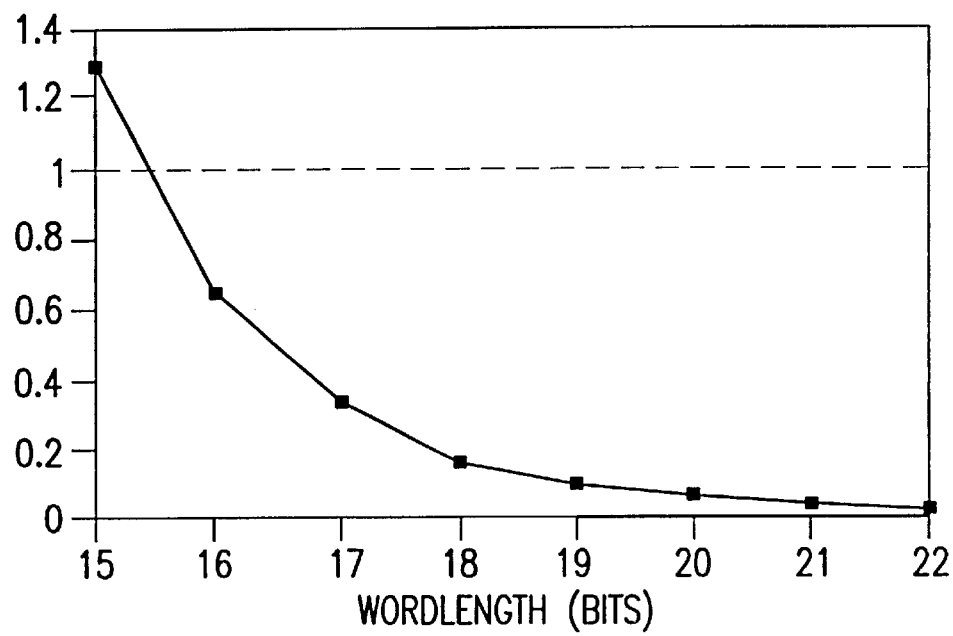

The graphic expressions of the simulation results are also illustrated in FIG. 4.3.

4.3.2 2-D IDCT Simulation Results

The finite wordlength simulations of the proposed 2-D IDCT algorithm are also carried out with 10,000 sets of randomly generated 8×8 input blocks. All the parameters used in this section are the same ones used in section 4.2.2. The input data range is from −256 to +255. The same "reference" and "test" results are used to calculate the error statistics. The simulation results and accuracy requirements of JPEG for 2-D IDCT are shown in Table 4.6.

cation have different impact on the accuracy of the proposed algorithm. It can be seen in section 4.3 that arithmetic operations with 16-bit finite internal wordlength would keep the truncation errors low enough to meet both H.261 and JPEG's requirements, as long as the coefficient quantization errors are relatively small. Smaller finite wordlength means the complexity of hardware implementation can be reduced, which would result in the cost reductions for both chip design and implementation. It can be seen from section 4.2 that the minimum coefficient representation for $\Omega_{ij}$ is 9-bit.

TABLE 4.6

Finite wordlength truncation effects for 2-D IDCT

| Finite Wordlengths | Peak Pixel Error | Peak Pixel Mean Square Error | Overall Mean Square Error | Peak Pixel Mean Error | Overall Mean Error |
|---|---|---|---|---|---|
| JPEG Spec | ≦1 | ≦0.06 | ≦0.02 | ≦0.015 | ≦0.0015 |
| 15-bit | 1.2864 | 0.080420 | 0.078200 | 0.008168 | 0.000000 |
| 16-bit | 0.6514 | 0.020007 | 0.019454 | 0.002817 | 0.000000 |
| 17-bit | 0.3277 | 0.005132 | 0.004934 | 0.001865 | 0.000000 |
| 18-bit | 0.1529 | 0.001261 | 0.001217 | 0.000626 | 0.000000 |
| 20-bit | 0.0607 | 0.000175 | 0.000169 | 0.000406 | 0.000009 |
| 22-bit | 0.0363 | 0.000091 | 0.000089 | 0.000341 | 0.000001 |
| 24-bit | 0.0323 | 0.000086 | 0.000084 | 0.000329 | 0.000007 |
| 26-bit | 0.0320 | 0.000086 | 0.000083 | 0.000319 | 0.000005 |
| 28-bit | 0.0320 | 0.000086 | 0.000083 | 0.000229 | 0.000005 |
| 30-bit | 0.0320 | 0.000086 | 0.000083 | 0.000261 | 0.000006 |

From Table 4.6, a similar conclusion as for the 2-D DCT algorithm can be reached: the computational accuracies of the proposed 2-D IDCT algorithm drop proportional to the finite wordlengths when they are equal to or less than 20-bit, which are illustrated in FIG. 4.4. When the coefficient quantization precision is 16-bit, all the arithmetic operations for the proposed 2-D IDCT can have no more 16-bit finite wordlength and the tput results can still meet JPEG W IDCT specification for all required input data ranges, which is illustrated in Table 4.7.

The less bits we use to quantize coefficients $\Omega_{ij}$, the smaller number of hardwired adders are required for the pseudo-multipliers.

Since the smallest finite wordlength possible for the proposed algorithm is 16-bit, the optimal combination should be X-bit quantization precision plus 16-bit finite wordlength for all arithmetic operations. The reductions of coefficient quantization precision should still guarantee the proposed algorithm to meet both the H.261 and JPEG's accuracy requirements.

TABLE 4.7

Simulation results for 2-D IDCT with 16-bit precision

| Input Data Range (−L to +H) | Peak Pixel Error | Peak Pixel Mean Square Error | Overall Mean Square Error | Peak Pixel Mean Error | Overall Mean Error |
|---|---|---|---|---|---|
| JPEG Spec | ≦1 | ≦0.06 | ≦0.02 | ≦0.015 | ≦0.0015 |
| L = 256, H = 255 | 0.6514 | 0.020007 | 0.019454 | 0.002817 | 0.000000 |
| L = 300, H = 300 | 0.6871 | 0.019927 | 0.019489 | 0.003108 | 0.000000 |
| L = 5, H = 5 | 0.6472 | 0.019110 | 0.018542 | 0.004196 | 0.000000 |

4.4 Combined Quantization and Truncation Error Effects

The simulations carried out in section 4.2 and 4.3 show that the coefficient quantization and finite wordlength trun- Further simulation results, which are illustrated in Table 4.8 and 4.9, show that the representation of coefficients $\Omega_{ij}$ with 13-bit precision is the lowest possible quantization precision required by the proposed algorithm to meet both the 2-D DCT and 2-D IDCT's accuracy requirements while the finite internal wordlength is kept as 16-bit.

TABLE 4.8

Simulation results for 2-D DCT with 16-bit finite wordlength

| Quantization Length of $\Omega_{ij}$ | Peak Pixel Error | Peak Pixel Mean Square Error | Overall Mean Square Error | Peak Pixel Mean Error | Overall Mean Error | Fixed-point DC Error |
|---|---|---|---|---|---|---|
| H.261 Spec | ≦1 | ≦0.06 | ≦0.02 | ≦0.015 | ≦0.0015 | |
| 12-bit | 0.7834 | 0.396600 | 0.002001 | 0.011940 | 0.002814 | 0 |
| 13-bit | 0.3379 | 0.005519 | 0.004998 | 0.003446 | 0.000211 | 0 |
| 16-bit | 0.3233 | 0.005282 | 0.004862 | 0.001518 | 0.000078 | 0 |

TABLE 4.9

Simulation results for 2-D IDCT with 16-bit finite wordlength

| Quantization Length of $\Omega_{ij}$ | Peak Pixel Error | Peak Pixel Mean Square Error | Overall Mean Square Error | Peak Pixel Mean Error | Overall Mean Error |
|---|---|---|---|---|---|
| JPEG Spec | ≦1 | ≦0.06 | ≦0.02 | ≦0.015 | ≦0.0015 |
| 12-bit | 2.3786 | 4.091672 | 0.058046 | 0.033540 | 0.004605 |
| 13-bit | 0.6514 | 0.020303 | 0.019550 | 0.004562 | 0.000000 |
| 16-bit | 0.6513 | 0.019974 | 0.019430 | 0.004544 | 0.000000 |

The 13-bit representations for coefficients $\Omega_{ij}$ are shown in Table 4.10. The maximum quantization error with 13-bit precision for all $\Omega_{ij}$ is 0.000065, which is corresponding to quantizing each single $\cos(i\pi/16)$ with maximum quantization error as 0.00806.

TABLE 4.10

13-bit representation of coefficient $\Omega_{ij}$

| $\Omega_{ij}$ (Hex) | j = 1 | j = 2 | j = 3 | j = 4 | j = 5 | j = 6 | j = 7 |
|---|---|---|---|---|---|---|---|
| i = 1 | 0.F640 | 0.E7F8 | 0.D0C0 | 0.B190 | 0.8B80 | 0.6010 | 0.3100 |
| i = 2 | | 0.DA80 | 0.C4A8 | 0.A740 | 0.8368 | 0.5A80 | 0.2E20 |
| i = 3 | | | 0.B100 | 0.9680 | 0.7640 | 0.5170 | 0.2988 |
| i = 4 | | | | 0.8000 | 0.6490 | 0.4548 | 0.2350 |
| i = 5 | | | | | 0.4F00 | 0.3670 | 0.1BC0 |
| i = 6 | | | | | | 0.2580 | 0.1320 |
| i = 7 | | | | | | | 0.09C0 |

The simulations with 13-bit quantization precision and different fmite wordlengths for proposed 2-D DCT algorithm are carried out on 10,000 sets of randomly generated (in range of −256 to 255) W input data. The simulation results are shown in Table 4.11.

TABLE 4.11

13-bit quantization & X-bit finite wordlength for 2-D DCT

| Finite Wordlengths | Peak Pixel Error | Peak Pixel Mean Square Error | Overall Mean Square Error | Peak Pixel Mean Error | Overall Mean Error | Fixed-point DC Error |
|---|---|---|---|---|---|---|
| H.261 Spec | ≦1 | ≦0.06 | ≦0.02 | ≦0.015 | ≦0.0015 | |
| 14-bit | 1.8750 | 1.059886 | 0.097852 | 0.998788 | 0.015908 | 0 |
| 15-bit | 0.6757 | 0.021735 | 0.019701 | 0.003944 | 0.000253 | 0 |
| 16-bit | 0.3379 | 0.005519 | 0.004998 | 0.003446 | 0.000211 | 0 |
| 17-bit | 0.1679 | 0.001949 | 0.001337 | 0.003547 | 0.000179 | 0 |
| 18-bit | 0.1011 | 0.000507 | 0.000472 | 0.003538 | 0.000171 | 0 |
| 19-bit | 0.0894 | 0.000354 | 0.000279 | 0.003512 | 0.000172 | 0 |
| 20-bit | 0.0594 | 0.000193 | 0.000140 | 0.003617 | 0.000183 | 0 |

The simulations with 13-bit quantization precision and different finite wordlengths for proposed 2-D IDCT algorithm are also carried out on 10,000 sets of randomly generated (in range of −256 to 255) 8×8 input data. The simulation results are shown in Table 4.12.

With 13-bit quantization precision for $\Omega_{ij}$ (which is equivalent to quantizing each $$\cos\frac{(2n+1)l\pi}{2N}$$

with 6.5-bit) and 16-bit finite internal wordlength, the proposed 2-D IDCT algorithm can still meet JPEG's IDCT Specification for all required input data ranges, as illustrated in Table 4.13.

TABLE 4.12

13-bit quantization & X-bit finite wordlength for 2-D IDCT

| Finite Wordlengths | Peak Pixel Error | Peak Pixel Mean Square Error | Overall Mean Square Error | Peak Pixel Mean Error | Overall Mean Error |
|---|---|---|---|---|---|
| JPEG Spec | ≦1 | ≦0.06 | ≦0.02 | ≦0.015 | ≦0.0015 |
| 15-bit | 1.3027 | 0.080976 | 0.078392 | 0.008551 | 0.000000 |
| 16-bit | 0.6514 | 0.020303 | 0.019550 | 0.004562 | 0.000000 |
| 17-bit | 0.3475 | 0.005224 | 0.005059 | 0.007610 | 0.000000 |
| 18-bit | 0.1847 | 0.001385 | 0.001342 | 0.006544 | 0.000000 |
| 19-bit | 0.1504 | 0.000567 | 0.000530 | 0.006323 | 0.000005 |
| 20-bit | 0.0848 | 0.000324 | 0.000283 | 0.006498 | 0.000018 |

TABLE 4.13

13-bit quantization and 16-bit finite wordlength for 2-D IDCT

| Input Data Range (−L to +H) | Peak Pixel Error | Peak Pixel Mean Square Error | Overall Mean Square Error | Peak Pixel Mean Error | Overall Mean Error |
|---|---|---|---|---|---|
| JPEG Spec | ≦1 | ≦0.06 | ≦0.02 | ≦0.015 | ≦0.0015 |
| L = 256, H = 255 | 0.6514 | 0.020303 | 0.019550 | 0.004562 | 0.000000 |
| L = 300, H = 300 | 0.7060 | 0.020230 | 0.019642 | 0.005796 | 0.000000 |
| L = 5, H = 5 | 0.6472 | 0.019110 | 0.018542 | 0.004196 | 0.000000 |

4.5 Comparison with Row-Column Method

It is relatively difficult to analyze the quantization and truncation effects mathematically. But one can compare the error upper bounds of an example algorithm according to the present invention and a generic row-column decomposition 2-D DCT/IDCT implementation.

Take the 2-D DCT for example. Let's define the maximum quantization error for $\cos(i\pi/16)$ as $\Delta_q$ and truncation error as $\Delta_t$ for any arithmetic operation, respectively. Since the core component of the proposed algorithm is:

$$v_{ij} = \sum_{l=0}^{3} \sum_{k=0}^{3} u_{kl} \cdot (b_{ik} c_{jl}) \qquad (4.2)$$

For input data range as $-256 \leq x \leq 255$, the output error is bounded to $$\Delta_z \leq (4 \times 256 \times (\Delta_q)^2 + \Delta_t) \times 16 = 2^{14}(\Delta_q)^2 + 2^4 \Delta_t \qquad (4.3)$$

when Eq. (3.22) is used to compute $u_{kl}$.

For generic row-column method, the 2-D DCT is decomposed as two 1-D DCTs as $$Y = AX, \quad y_{ij} = \sum_{k=0}^{7} a_{ik} x_{kj} \qquad (4.4)$$

$$Z = YA^T, \quad z_{ij} = \sum_{k=0}^{7} y_{ik} a_{jk}$$

By defining the truncation errors associated with any arithmetic operation in two 1-D DCTs as $\Delta_{ty}$ and $\Delta_{tz}$, respectively, the output errors of these two 1-D DCTs are bounded to $$\Delta_y \leq (256 \times \Delta_q + \Delta_{ty}) \times 8 = 2^{11} \Delta_q + 2^3 \Delta_{ty}, \text{ and}$$

$$\Delta_z \leq (\max(y) \times \Delta_q + \Delta_{tz}) \times 8 + \Delta_y \times 8 \qquad (4.5)$$

where the second part of the error in $\Delta_z$ is propagated from the first 1-D DCT computation. Since the output value of the first 1-D DCT is bounded by $\max(y) = 2.\%F2 \max(x)$, the Eq. (4.5) can then be further extended as $$\Delta_z \leq (2\sqrt{2} \times 256 \times \Delta_q + \Delta_{tz}) \times 8 + \Delta_y \times 8 \qquad (4.6)$$
$$= 2^{13.5} \Delta_q + 2^3 \Delta_{tz} + 2^{14} \Delta_q + 2^6 \Delta_{ty}$$
$$= (1 + 1/\sqrt{2}) \cdot 2^{14} \Delta_q + 2^6 \Delta_{ty} + 2^3 \Delta_{tz}$$

It is can be seen from Eq. (4.3) and (4.6) that the example algorithm of the present invention only requires one half of the coefficient quantization precision and 2 bits less internal wordlength required by the generic row-column method to achieve the same 2-D DCT accuracy.

Compared with some existing row-column decomposition algorithms, which are all optimized to just meet the accuracy requirements of H.261 and JPEG specifications, the example of the present invention requires the shortest quantization bits and internal operation wordlength. The comparison result is illustrated in Table 4.14.

TABLE 4.14

Comparison of finite wordlength in different algorithms

| Algorithm Proposed | Function Implementation | Max Cosine Quantization | Max Internal Wordlength |
|---|---|---|---|
| [Ura92] | DCT/IDCT | 16-bit | 34-bit |
| [CW95] | DCT | 12-bit | 24-bit |
| [CW95] | IDCT | 13-bit | 27-bit |
| [MW95] | DCT/IDCT | 13-bit | 22-bit |
| Proposed | DCT | 6.5-bit | 15-bit |
| Proposed | IDCT | 6.5-bit | 16-bit |

4.6 Summary

In this section, the impacts of coefficient quantization errors and truncation errors for an example 2-D DCT/IDCT algorithm according to the present invention have been examined. The computational accuracy decreases when the coefficient precision is reduced or the operation precision is reduced. But excessive coefficient quantization precision or finite wordlength will not result in too much accuracy improvement.

For hardware implementations, a small finite wordlength and less bits of coefficients quantization are desired. Less coefficient precision means fewer additions or subtractions is needed to carry out the coefficient multiplications. Smaller internal wordlength means fewer bits in registers and simpler circuits are required to implement the example algorithm according to the present invention.

Compared with row-column approach of 2-D DCT/IDCT implementations [Jan94, MW95, SL96 and WC95, etc.], the 16-bit finite wordlength implementation of the example algorithm clearly shows that the example algorithm has a precision advantage—since it possesses only one quantization error and one truncation error instead of twos. The benefit of suffering only one coefficient quantization loss comes directly from the example algorithm where a direct 2-D approach is used instead of 2-D row-column decomposition methods. This advantage has been verified through extensive simulations with different quantization and rounding precisions. Furthermore, this high-accuracy can be achieved through straight forward computations and no artificial bias adjustments are required (as in [MW95l).

For one example implementation, a 13-bit coefficient quantization and 16-bit finite internal wordlength was chosen, which makes this example algorithm a perfect candidate for VLSI hardware implementations. The 16-bit finite wordlength is the shortest one adopted by any 2-D DCT/IDCT chip implementation so far [Jan94, MW95, SL96, WC95 and Lee97]. If only the 2-D DCT implementation is desired, only 15-bit finite internal wordlength is required by the example algorithm of the present invention.

5.0 Hardware Architecture Design

In this section, a hardware architecture for the a 2-D DCT/IDCT algorithm according to one embodiment of the present invention is described. The general structures of each basic hardware component required by the implementation is discussed. It is shown in this section that all the major execution units under this scheme are 100% sharable between the 2-D DCT and 2-D IDCT operations.

5.1 Introduction

From the example algorithm described in Section 3, one can see that the 2-D DCT can be computed directly through Eq. (3.14), (3.22), (3.52) and (3.25), while the 2-D IDCT can be computed through Eq. (3.14), (3.45), (3.52) and (3.49). All the other equations in Section 3 are intermediate results. If the 8×8 input data for both the DCT and IDCT is generalized as $$X = \begin{bmatrix} X_{00} & X_{01} & \ldots & X_{07} \\ X_{10} & X_{11} & \ldots & X_{17} \\ \ldots & \ldots & \ldots & \ldots \\ X_{70} & X_{71} & \ldots & X_{77} \end{bmatrix}_{8\times 8} \quad (5.1)$$

then Eq. (3.22) can be extended as $$X_{++} = (X1 + \tilde{I}_4 X3)^T + \tilde{I}_4 (X2 + \tilde{I}_4 X4)^T \quad (5.2)$$

$$= \begin{bmatrix} X_{00}+X_{70}+X_{07}+X_{77} & X_{10}+X_{60}+X_{07}+X_{67} & \ldots & X_{30}+X_{40}+X_{37}+X_{47} \\ X_{01}+X_{71}+X_{06}+X_{76} & X_{11}+X_{61}+X_{16}+X_{66} & \ldots & X_{31}+X_{41}+X_{36}+X_{46} \\ \ldots & \ldots & \ldots & \ldots \\ X_{03}+X_{73}+X_{04}+X_{74} & X_{13}+X_{63}+X_{14}+X_{64} & \ldots & X_{33}+X_{43}+X_{34}+X_{44} \end{bmatrix}_{4\times 4},$$

$$X_{-+} = (X1 - \tilde{I}_4 X3)^T + \tilde{I}_4 (X2 - \tilde{I}_4 X4)^T$$

$$= \begin{bmatrix} X_{00}-X_{70}+X_{07}-X_{77} & X_{10}-X_{60}+X_{07}-X_{67} & \ldots & X_{30}-X_{40}+X_{37}-X_{47} \\ X_{01}-X_{71}+X_{06}-X_{76} & X_{11}-X_{61}+X_{16}-X_{66} & \ldots & X_{31}-X_{41}+X_{36}-X_{46} \\ \ldots & \ldots & \ldots & \ldots \\ X_{03}-X_{73}+X_{04}-X_{74} & X_{13}-X_{63}+X_{14}-X_{64} & \ldots & X_{33}-X_{43}+X_{34}-X_{44} \end{bmatrix}_{4\times 4},$$

$$X_{+-} = (X1 + \tilde{I}_4 X3)^T - \tilde{I}_4 (X2 + \tilde{I}_4 X4)^T$$

$$= \begin{bmatrix} X_{00}+X_{70}-X_{07}+X_{77} & X_{10}+X_{60}-X_{07}+X_{67} & \ldots & X_{30}+X_{40}-X_{37}+X_{47} \\ X_{01}+X_{71}-X_{06}+X_{76} & X_{11}+X_{61}-X_{16}+X_{66} & \ldots & X_{31}+X_{41}-X_{36}+X_{46} \\ \ldots & \ldots & \ldots & \ldots \\ X_{03}+X_{73}-X_{04}+X_{74} & X_{13}+X_{63}-X_{14}+X_{64} & \ldots & X_{33}+X_{43}-X_{34}+X_{44} \end{bmatrix}_{4\times 4},$$

$$X_{--} = (X1 - \tilde{I}_4 X3)^T - \tilde{I}_4 (X2 - \tilde{I}_4 X4)^T$$

$$= \begin{bmatrix} X_{00}-X_{70}-X_{07}+X_{77} & X_{10}-X_{60}-X_{07}+X_{67} & \ldots & X_{30}-X_{40}-X_{37}+X_{47} \\ X_{01}-X_{71}-X_{06}+X_{76} & X_{11}-X_{61}-X_{16}+X_{66} & \ldots & X_{31}-X_{41}-X_{36}+X_{46} \\ \ldots & \ldots & \ldots & \ldots \\ X_{03}-X_{73}-X_{04}+X_{74} & X_{13}-X_{63}-X_{14}+X_{64} & \ldots & X_{33}-X_{43}-X_{34}+X_{44} \end{bmatrix}_{4\times 4}$$

One can see from Eq. (5.2) that the elements of $X_{++}$, $X_{-+}$, $X_{+-}$, and $X_{--}$ can be calculated from the input data as $$x_{++}=X_{j,i}+X_{7-j,i}+X_{j,7-i}+X_{7-j,7-i},$$

$$x_{-+}=X_{j,i}-X_{7-j,i}+X_{j,7-i}-X_{7-j,7-i},$$

$$x_{+-}=X_{j,i}+X_{7-j,i}-X_{j,7-i}-X_{7-j,7-i},$$

$$x_{--}=X_{j,i}-X_{7-j,i}-X_{j,7-i}+X_{7-j,7-i} \quad (5.3)$$

for $0 \leq i,j \leq 3$. By substituting $X_{++}$, $X_{-+}$, $X_{+-}$ and $X_{--}$ into Eq. (3.25), the 2-D DCT results can then be easily calculated through four 4×4 matrix multiplications as $EX_{++}E^T$, $EX_{-+}O^T$, $OX_{+-}E^T$ and $OX_{--}O^T$.

For the 2-D IDCT computation, if matrix X is used as an 8×8 input block and matrix Z as output, Eq. (5.1) can also be substituted into Eq. (3.45) for 2-D IDCT computation as $$X_{ee} = \begin{bmatrix} X_{00} & X_{20} & \ldots & X_{60} \\ X_{02} & X_{22} & \ldots & X_{62} \\ \ldots & \ldots & \ldots & \ldots \\ X_{06} & X_{26} & \ldots & X_{66} \end{bmatrix}_{4 \times 4}, \quad (5.4)$$

$$X_{oe} = \begin{bmatrix} X_{10} & X_{30} & \ldots & X_{70} \\ X_{12} & X_{32} & \ldots & X_{72} \\ \ldots & \ldots & \ldots & \ldots \\ X_{16} & X_{36} & \ldots & X_{76} \end{bmatrix}_{4 \times 4},$$

$$X_{eo} = \begin{bmatrix} X_{01} & X_{21} & \ldots & X_{61} \\ X_{03} & X_{23} & \ldots & X_{63} \\ \ldots & \ldots & \ldots & \ldots \\ X_{07} & X_{27} & \ldots & X_{67} \end{bmatrix}_{4 \times 4},$$

$$X_{ee} = \begin{bmatrix} X_{11} & X_{31} & \ldots & X_{71} \\ X_{13} & X_{33} & \ldots & X_{73} \\ \ldots & \ldots & \ldots & \ldots \\ X_{17} & X_{37} & \ldots & X_{77} \end{bmatrix}_{4 \times 4}$$

The 2-D IDCT results can then be calculated by substituting Eq. (5.4) into $E^T X_{ee} E$, $E^T X_{oe} O$, $O^T X_{oe} E$ and $O^T X_{oo} O$ in Eq. (3.49). And each element Zij of matrix Z is equal to $$[Zij] = \begin{cases} E^T X_{ee} E + E^T X_{oe} O + O^T X_{ee} E + O^T X_{oo} O \\ E^T X_{ee} E - E^T X_{oe} O + O^T X_{ee} E - O^T X_{oo} O \\ E^T X_{ee} E + E^T X_{oe} O - O^T X_{ee} E - O^T X_{oo} O \\ E^T X_{ee} E - E^T X_{oe} O - O^T X_{ee} E + O^T X_{oo} O \end{cases} \quad (5.5)$$

Of course, one component for both the 2-D DCT and 2-D IDCT algorithms according to one embodiment of the present invention is still the 4×4 matrix multiplications unit:

$$V_{4 \times 4} = B_{4 \times 4} U_{4 \times 4} C_{4 \times 4}^T \quad (5.6)$$

and $$v_{ij} = \sum_{l=0}^{3} \left( \sum_{k=0}^{3} b_{ik} u_{kl} \right) \cdot c_{jl} = \sum_{l=0}^{3} \sum_{k=0}^{3} b_{ik} u_{kl} c_{jl} = \sum_{l=0}^{3} \sum_{k=0}^{3} u_{kl} \cdot (b_{ik} c_{jl})$$

Figure 13:
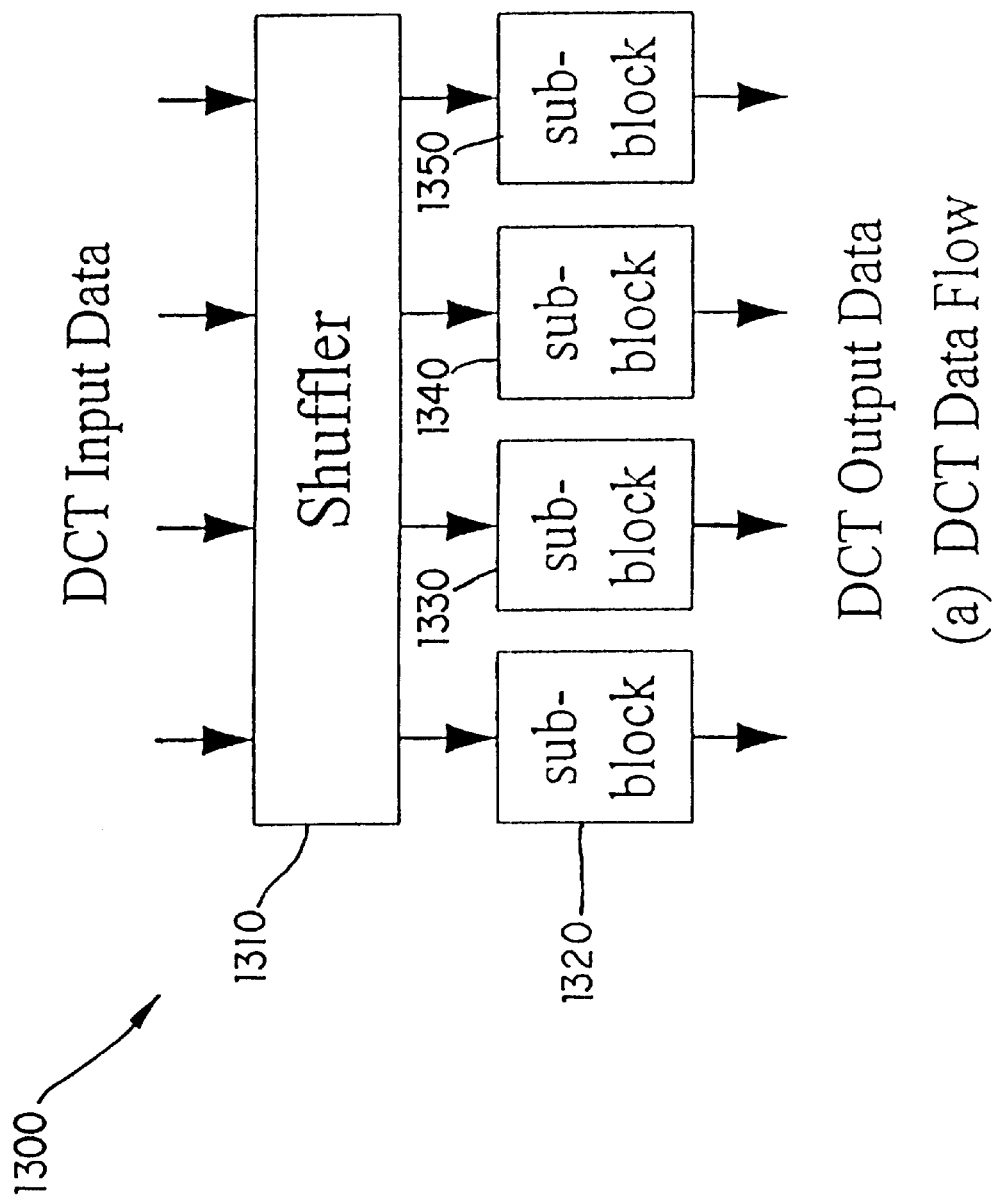
FIG. 13 is a block diagram of DCT data flow according to an embodiment of the present invention.
Figure 14:
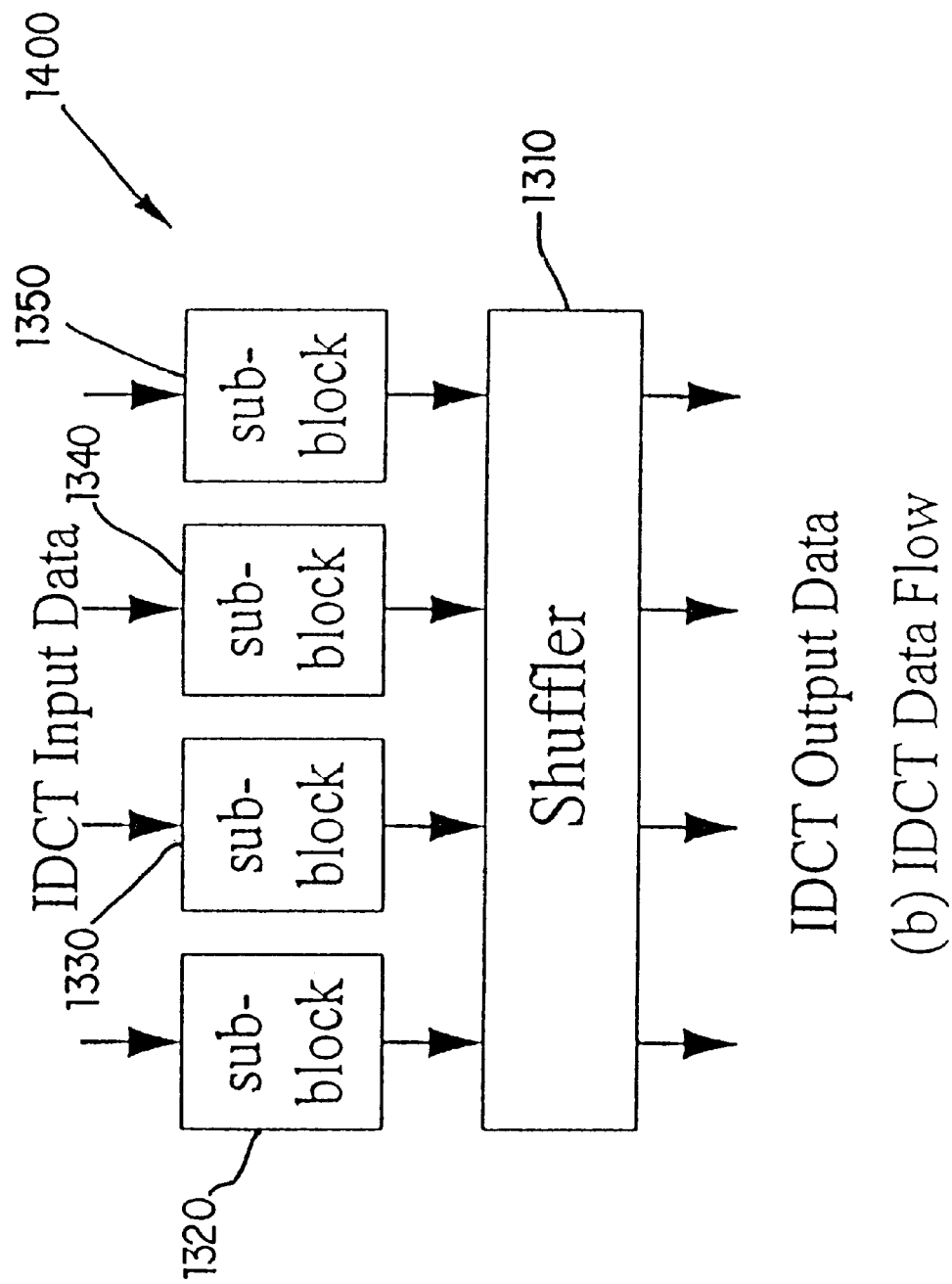
FIG. 14 is a block diagram of IDCT data flow according to another embodiment of the present invention.

It can be seen from above Eq. (5.2) to Eq. (5.6) above that there are only two basic computation blocks for the algorithm in this embodiment. The first one can be realized by a shuffling device 1310 which carries out four pairs of additions/subtractions with a butterfly interconnection among each adder or subtractor. The second one is a 4×4 matrix multiplications unit (or sub-block operator). In order to carry out four 4×4 matrix multiplications independently and concurrently, four sub-block operators 1320, 1330, 1340, and 1350 are required by the algorithm in this embodiment. This shuffling device (or shuffler) 1310 is used by the 2-D DCT operation to compute the matrix elements of matrices $X_{++}$, $X_{-+}$, $X_{+-}$ and $X_{--}$ in Eq. (5.3). It can also be used by the 2-D IDCT operation to calculate the final output Zij in Eq. (5.7) after the matrix multiplications $E^T X_{ee} E$, $E^T X_{oe} O$, $O^T X_{eo} E$ and $^T X_{oo} O$ are computed. The general data flow and simplified architectures 1300, 1400 of above two components are illustrated in FIGS. 13 and 14, where the output data rate from each sub-block would be one sample per clock cycle for 2-D IDCT.

All the architectural considerations in this section serve one purpose—to develop a pipelined parallel architecture for the algorithm according to one embodiment of the present invention. The detailed structures of the key components—shuffler and sub-block are described in sections 5.2 and 5.3. After that, some important auxiliary components are briefly discussed in section 5.4. In section 5.5, the general structures of 2-D DCT, 2-D IDCT and combined 2-D DCT/IDCT example implementations according to the present invention are derived. A summary of hardware architectural design is presented in section 5.6.

5.2 Shuffler—Addition/Subtraction Shuffling Device

In Eq. (5.3) and Eq. (5.5), each element on the left side of the equations can be computed by shuffled additions and subtractions with 4 input data. If the input data are generalized as "a", "b", "c" and "d", then the 4 output would be $$x_{++}=a+b+c+d,$$

$$x_{-+}=a-b+c-d,$$

$$x_{+-}=a+b-c-d,$$

$$x_{--}=a-b-c+d \quad (5.7)$$

Figure 15:
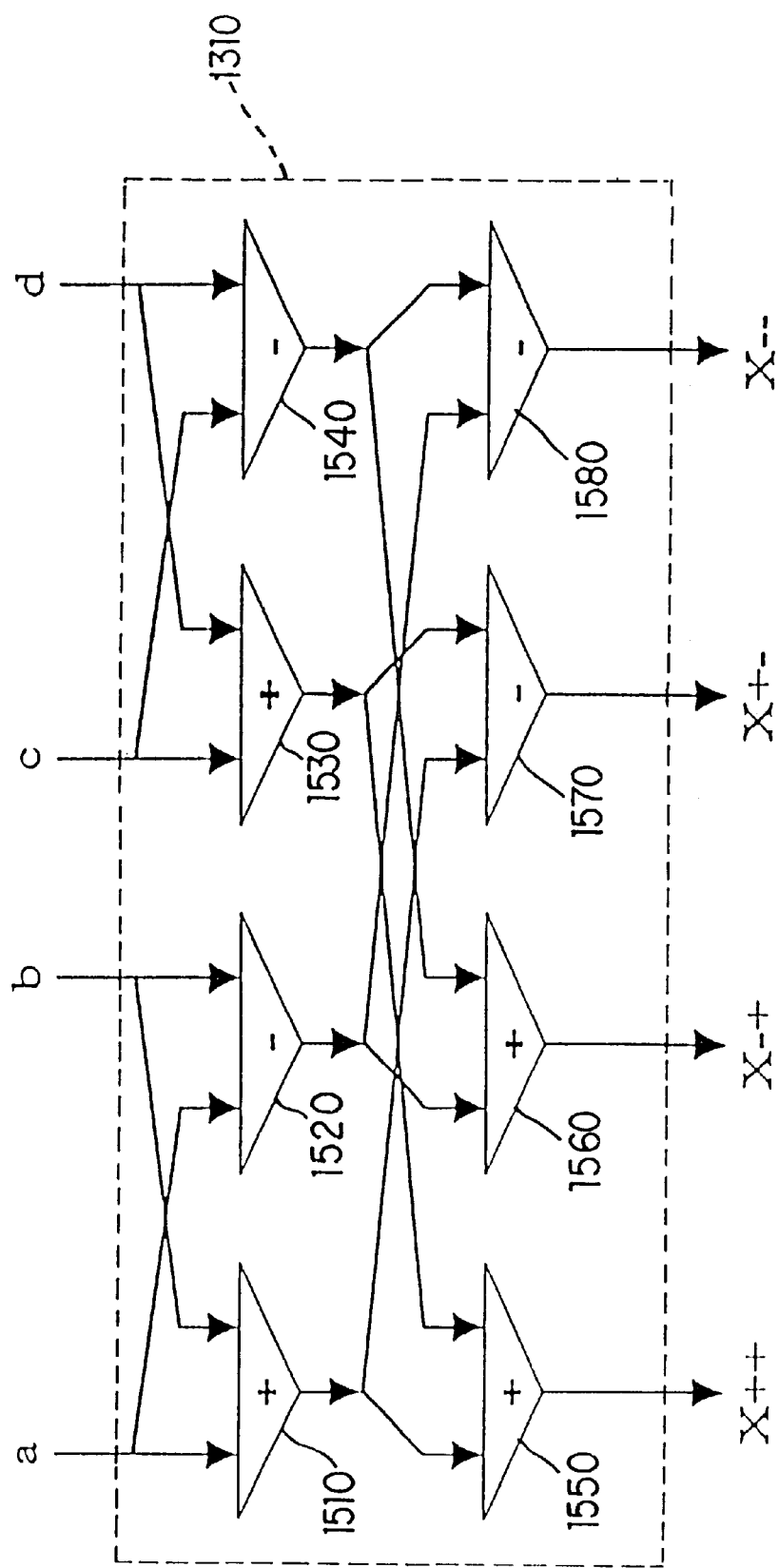
FIG. 15 is a diagram of an example shuffler data structure according to the present invention.

The shuffling operations with a total of 6 additions and 6 subtractions can be carried out with 4 adders 1510, 1530, 1550, and 1560, 4 subtractors 1520, 1540, 1570, and 1580 and a butterfly interconnection, as illustrated in FIG. 15. This arrangement requires that 4 input elements are fed into the shuffler in each cycle, and total 16 cycles are consumed for total 64 input data.

To accommodate both the 2-D DCT and 2-D IDCT implementations, the input, output and internal wordlength of the shuffler should be 16-bit according to one example implemenation. If the implementation is for 2-D DCT only, "a", "b", "c" and "d" would be 9-bit and "$x_{++}$", "$x_{-+}$", "$x_{+-}$" and "$x_{--}$" should be 11-bit.

5.3 Sub-block Operator—4×4 Matrix Multiplications Unit

For one example 2-D DCT algorithm according to the present invention, each term of $EX_{++}E^T$, $EX_{-+}O^T$, $OX_{+-}ET$ and $OX_{--}O^T$ (or $E^T X_{ee} E$, $E^T X_{oe} O$, $O^T X_{eo} E$ and $O^T X_{oo} O$ for the 2-D IDCT) is a "half-size" 4×4 matrix multiplication. As shown in Eq. (5.6), each matrix element can be decomposed as 16 multiplications plus 15 additions. For the sake of convenience, let's denote $EX_{++}E^T$, $EX_{-+}O^T$, $OX_{+-}E^T$ and $OX_{--}O^T$ as the EE, EO, OE and OO sub-block and generalize all the input matrices $X_{++}$, $X_{-+}$, $X_{+-}$, $X_{--}$, $X_{ee}$, $X_{oe}$, $X_{eo}$ and $X_{oo}$ as a 4×4 matrix U.

Looking at the EE sub-block $V_{4 \times 4} = EU_{4 \times 4} E^T$, where matrices B and C in Eq. (5.6) are replaced by matrix E defined in Eq. (3.10), and each element $v_{ij}$ of matrix V can be computed as $$v_{ij} = \sum_{l=0}^{3}\left(\sum_{k=0}^{3} e_{ik}u_{kl}\right)\cdot e_{jl} = \sum_{l=0}^{3}\sum_{k=0}^{3} e_{ik}u_{kl}e_{jl} = \sum_{l=0}^{3}\sum_{k=0}^{3} u_{kl}\cdot(e_{ik}e_{jl}) \quad (5.8)$$

Given that matrix $E_{4\times 4}$ only has three distinct elements $\{W_2, W_4, W_6\}$ (assuming the signs are ignored temporally), the whole set of $\{e_{ik}e_{jl}\}$ only contains six distinct elements: $\{w_2w_2, w_2w_4, w_2w_6, w_4w_4, w_4w_6, w_6w_6\}$. And Eq. (5.8) can be extended as:

$$\begin{aligned}v_{00} =\ & u_{00}w_4w_4 + u_{01}w_4w_4 + u_{02}w_4w_4 + u_{03}w_4w_4 + \\ & u_{10}w_4w_4 + u_{11}w_4w_4 + u_{12}w_4w_4 + u_{13}w_4w_4 + \\ & u_{20}w_4w_4 + u_{21}w_4w_4 + u_{22}w_4w_4 + u_{23}w_4w_4 + \\ & u_{30}w_4w_4 + u_{31}w_4w_4 + u_{32}w_4w_4 + u_{33}w_4w_4 \end{aligned} \quad (5.9)$$

$$\begin{aligned}v_{01} =\ & u_{00}w_2w_4 + u_{01}w_4w_6 - u_{02}w_4w_6 - u_{03}w_2w_4 + \\ & u_{10}w_2w_4 + u_{11}w_4w_6 - u_{12}w_4w_6 - u_{13}w_2w_4 + \\ & u_{20}w_2w_4 + u_{21}w_4w_6 - u_{22}w_4w_6 - u_{23}w_2w_4 + \\ & u_{30}w_2w_4 + u_{31}w_4w_6 - u_{32}w_4w_6 - u_{33}w_2w_4 \end{aligned}$$

...

$$\begin{aligned}v_{33} =\ & u_{00}w_6w_6 - u_{01}w_2w_4 + u_{02}w_2w_6 - u_{03}w_6w_6 - \\ & u_{10}w_2w_6 + u_{11}w_2w_2 - u_{12}w_2w_2 + u_{13}w_2w_6 + \\ & u_{20}w_2w_6 - u_{21}w_2w_2 + u_{22}w_2w_2 - u_{23}w_2w_6 - \\ & u_{30}w_6w_6 + u_{31}w_2w_6 - u_{32}w_2w_6 + u_{33}w_6w_6 \end{aligned}$$

If $u_{kl}$, $0 \leq 1$, $k \leq 3$, is fed into a computational unit in 16 cycles, then all the elements of $V_{4\times 4}$ can be calculated in these 16 cycles by simply accumulating the multiplication result of the current input $u_{kl}$ 1605 with one of the $\pm\{w_2w_2, w_2w_4, w_2w_6, w_4w_4, w_4w_6, w_6w_6\}$ provided that circuit delays are ignored. The whole EE sub-block 1320 can be realized by 6 multipliers 1610, one 6-to-16 multiplexer 1620 and 16 accumulators 1630 (one for each $v_{ij}$, $0 \leq i,j \leq 3$).

Figure 16:
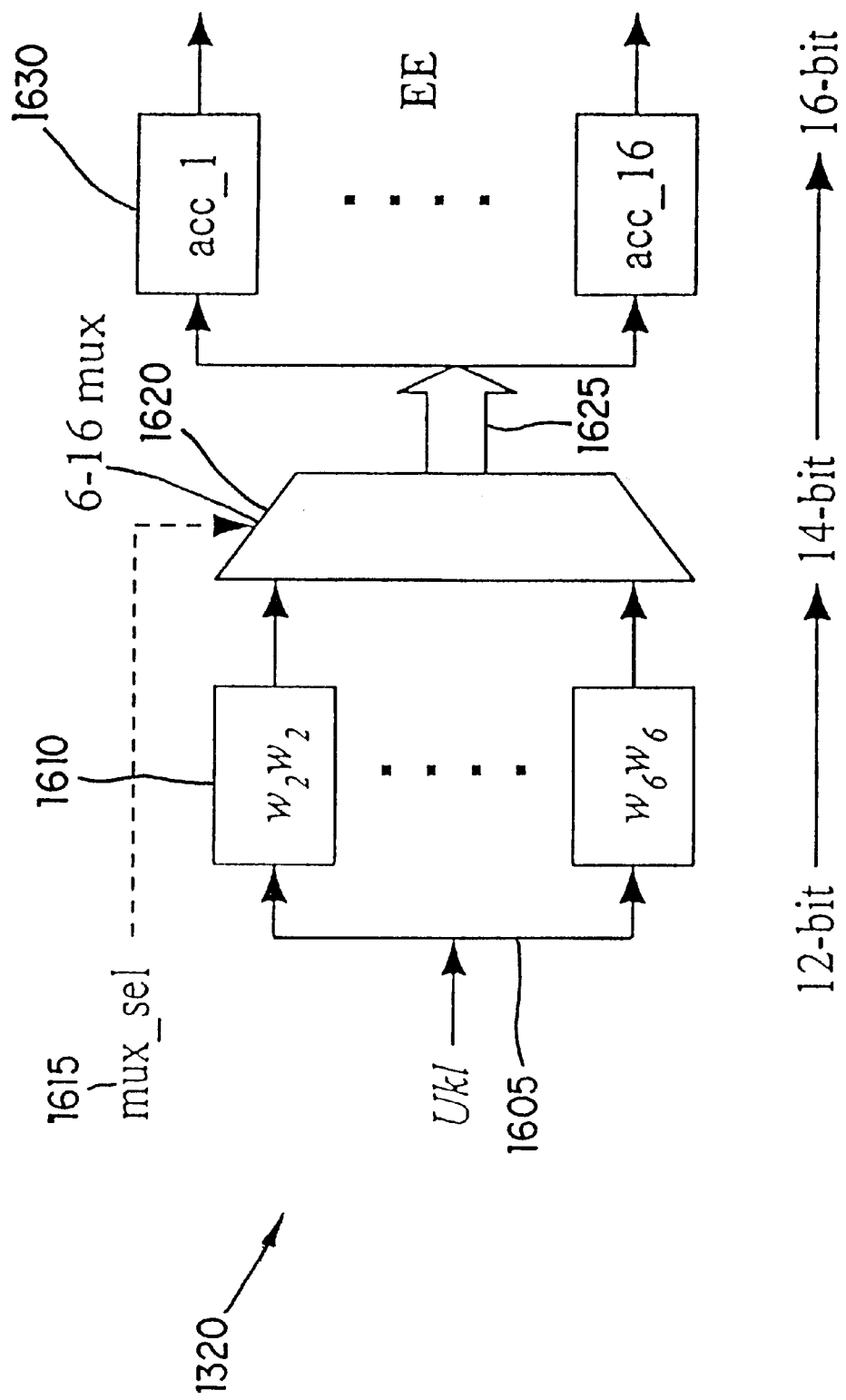
FIG. 16 is a diagram of an example EE-sub-block according to the present invention.

In each clock cycle one input u, arrives and the 6 multipliers 1610 are used to compute the multiplications $u_{kl}\Omega_{22}, u_{kl}\Omega_{24}, u_{kl}\Omega_{26}, u_{kl}\Omega_{44}, u_{kl}\Omega_{46}$ and $u_{kl}\Omega_{66}$, where the relation between $\Omega_{ij}$ and $w_iw_j$ is defined in Eq. (4.1). Then, the 6-to-16 multiplexer 1620, which is controlled by a mux-selector signal 1615, will multiplex the 6 multiplication results 1625 onto the 16 accumulators 1630. Since only $u_{kl}\Omega_{ij}$ instead of $\pm u_{kl}\Omega_{ij}$ is computed in above, each accumulator should be an adder/subtractor so that the $\pm u_{kl}\Omega_{ij}$ can be handled by the accumulator as either adding or subtracting $u_{kl}\Omega_{ij}$. Based on the add_sub signal, the accumulator adds or subtracts the incoming data and gets reset every 16 cycles. The general structure of the EE sub-block is illustrated in FIG. 16.

Since each $\Omega_{ij}$ is a pre-calculated constant, the multiplication $u_{kl}\Omega_{ij}$ can easily be implemented by a few hardwired adders (pseudo-multipliers). For example, let's look at $u_{kl}\Omega_{22}$:$\Omega_{22}$ can be approximated with 13-bit coefficient quantization precision as $$\Omega_{22}=0.DA80h=0.1101101010000000b \quad (5.10)$$

The multiplication result of $u_{kl}\Omega_{22}$ can be calculated using only adders as $$u_{kl}\Omega_{22}=(u_{kl}>>1)+(u_{kl}>>2)+(u_{kl}>>4)+(u_{kl}>>5)+(u_{kl}>>7)+(u_{kl}>>9) \quad (5.11)$$

and totally five adders are needed to accomplish above function, where the shift operations can be realized by the hardwired realignments.

The computation in (5.11) can be further simplified as $$x11=u_{kl}+(u_{kl}>>1) \text{ and}$$

$$u_{kl}\Omega_{22}=(x11>>1)+(x11>>4)+(u_{kl}>>7)+(u_{kl}>>9) \quad (5.12)$$

where only four adders are required at this time. But if both adders and subtractors are allowed to be used by the pseudo-multiplier, (5.11) can be even further simplified as $$x101=u_{kl}+(u_{kl}>>2) \text{ and}$$

$$u_{kl}\Omega_{22}=u_{kl}-(x101>>3)+(x101>>7) \quad (5.13)$$

where only two adders and one subtractor are all it needs to compute $u_{kl}\Omega_{22}$. Moreover, since only top 14 bits (12-bit for integer and 2-bit for decimal) of the multiplication result are required to be passed on to each accumulator, some least significant bits can be skipped when computing expressions above, which results in a further simplification. When implementation is for the 2-D DCT only, the input for the multiplier should be 11 bits and only 12 bits (11-bit for integer and 1-bit for decimal) output would be required.

The 6-to-16 multiplexer 1620 shown in FIG. 16 can be decomposed as 16 6-to-1 multiplexers (each for one accumulator), which not only greatly simplifies the design task, but also reduces the complexity of physical layout and placement. Each 6-to-1 multiplexer is controlled by one set of mux-selector codes which instruct the multiplexer to multiplex one and only one multiplication result onto the corresponding accumulator at each cycle. Take $v_{33}$ in Eq. (5.8) for example, the output of the corresponding 6-to-1 multiplexer (or the input of the accumulator) would be $u_{00}\Omega_{66}, u_{01}\Omega_{26}, u_{02}\Omega_{26}, u_{03}\Omega_{66}, u_{10}\Omega_{26}, u_{11}\Omega_{22}, u_{12}\Omega_{22}, u_{13}\Omega_{26}, u_{20}\Omega_{26}, u_{21}\Omega_{22}, u_{22}\Omega_{22}, u_{23}\Omega_{26}, u_{30}\Omega_{66}, u_{31}\Omega_{26}, u_{32}\Omega_{26}$ and $u_{33}\Omega_{66}$.

Each accumulator 1630 in FIG. 16 is an adder/subtractor which is controlled by a set of add_sub signals and forced to reset after $u_{33}\Omega_{xx}$, is processed. The set of add_sub signals for matrix element $v_{33}$ in Eq. (5.8) is "+", "−", "+", "−", "−", "+", "−", "+", "+", "−", "+", "−", "−", "+", "−" and "+". The output data from each accumulator is 16 integer and 2-bit for decimal) for a combined 2-D DCT/IDCT implementation. The width can be reduced to 15 bits (14-bit for integer and 1-bit for decimal) for a 2-D DCT only implementation.

The EE sub-block 1320 described above can also be used to compute $E^T X_{ee} E$ for the 2-D IDCT computation without any structural modification. To compute $E^T X_{ee} E$, matrices B and C in Eq. (5.6) would be replaced by matrix $E^T$ instead of E, which has the same set of coefficients as matrix E but located in different positions and possibly with a different sign. This simply implies that the set of mux-selector codes being used to control the multiplexers and the sets of add_sub signals for the 16 accumulators will be different.

The EO, OE and OO sub-block operators 1330–1350 can be implemented with a similar sub-block architecture as EE. From Eq. (3.10) it is known that while the matrix E only consists of even coefficient elements $w_2$, $w_4$ and $w_6$, the matrix O only has odd elements $w_1$, $w_3$, $w_5$, and $w_7$. So for the EO and OE sub-blocks, one of the coefficient in $w_i$, $w_j$ is from even coefficient set $\{w_2, w_4, w_6\}$ and another is from odd coefficient set $\{w_1, w_3, w_5, w_7\}$, and every element in the EO and OE sub-blocks is the sum of products of $u_{kl}$ multiplied with $w_1w_2$, $w_1w_4$, $w_1w_6$, $w_3w_2$, $w_3w_4$, $w_3w_6$, $w_5w_2$, $w_5w_4$, $w_5w_6$, $w_7w_2$, $w_7w_4$ and $w_7w_6$, which means that each sub-block operator consists of total 12 multipliers, one 12-to-16 multiplexer and 16 accumulators; For the OO sub-block, both of the coefficients in $w_iw_j$ are from odd coefficient set $\{w_1, w_3, w_5, w_7\}$, and every element in OO sub-block is the sum of products of $u_{kl}$, multiplied with $w_1w_1, w_1w_3, w_1w_5, w_1w_7, w_3w_3, w_3w_5, w_3w_7, w_5w_5, w_5w_7$ and $w_7w_7$, for a total 10 multipliers, one 10-to-16 multiplexer and 16 accumulators. Running in parallel, 4 input elements are fed into 4 sub-block operators in each cycle and total of 16 cycles are needed to process the 64 input 2-D IDCT data.

Together, there are total of 40 pseudo-multipliers, 1 6-to-16 multiplexer (or 16 6-to-1 multiplexers), 2 12-to-16 multiplexers (or 32 12-to-1 multiplexers), 1 10-to-1 6 multiplexer (or 16 10-to-1 multiplexers) and 64 accumulators required for all EE, EO, OE and OO sub-blocks.

5.4 Auxiliary Components for 2-D DCT or IDCT Implementations

In order to compute Zij in Eq. (5.7) for the 2-D IDCT, 4 16-to-1 multiplexers (or output-mux) 1710 are needed and each can multiplex one out of sixteen accumulator results in each of EE, EO, OE and OO sub-blocks, respectively. The selected data (four in parallel) are then sent to the shuffler to carry out four pairs of addition/subtraction with a butterfly interconnection before the final results Zij are generated. These 4 16-to-1 multiplexers 1720 can also be used for the 2-D DCT hardware implementation so only 4 output words would be sent out at each cycle and a balanced I/O scheme is achieved.

If a continuous input data stream is desired (i.e. no gap between consecutive input blocks), an additional 64 latches 1710 are needed for temporary holding the sub-block results for 16 cycles. The latches 1710 would be positioned between the accumulators and the output-muxes 17. As soon as 16 consecutive accumulations are completed for the current W input data, the 64 latches would latch out the current data being generated in the 64 accumulators and free them up to carry out the accumulation task for next input data set.

In this way, the data held in the latches 1710 would be multiplexed out in 16 cycles by the above 4 16-to-1 multiplexers 1720. For a combined 2-D DCT/IDCT approach, each latch is 16-bit long (for the 2-D DCT only case, the latch is 15-bit long).

Figure 17:
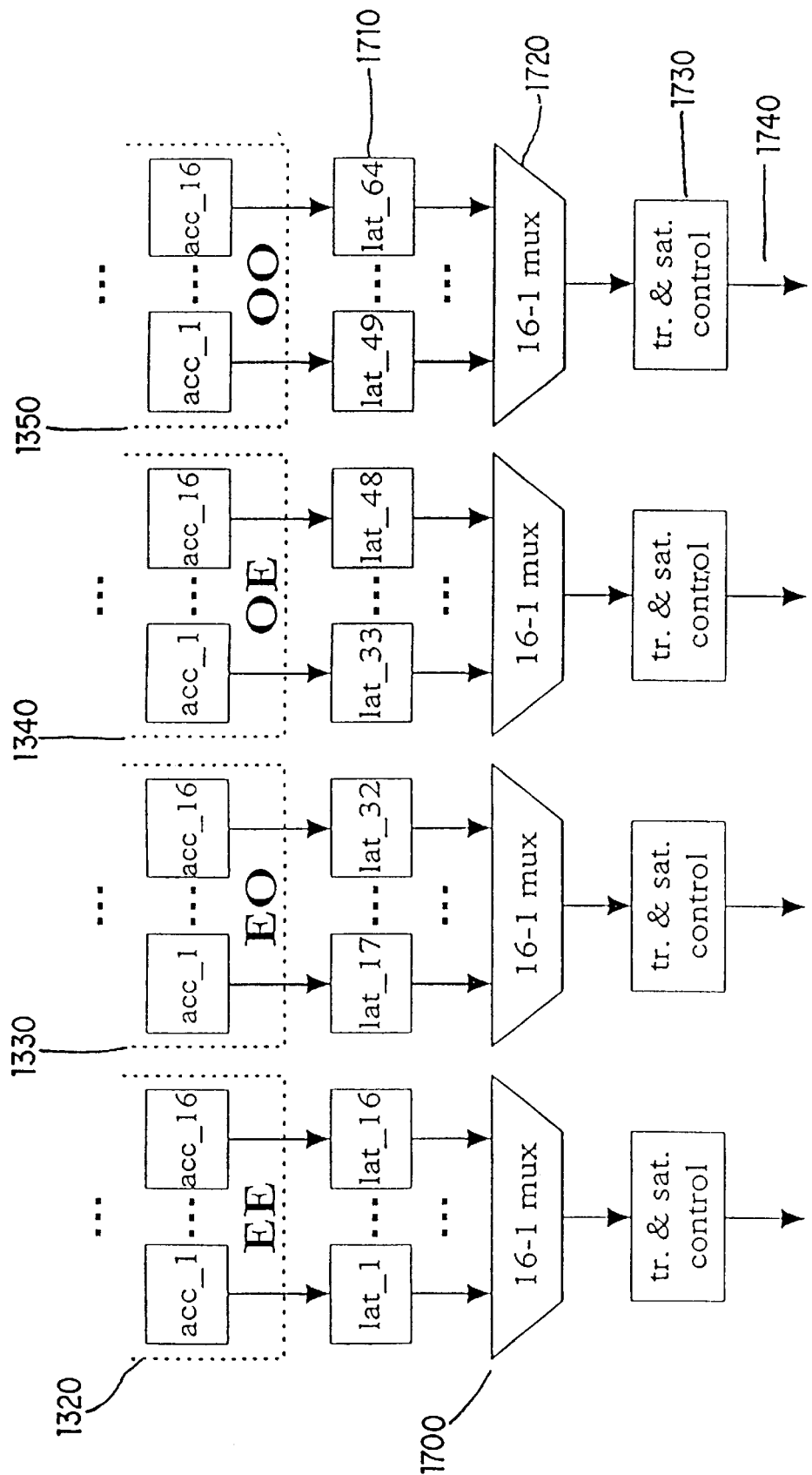
FIG. 17 is a diagram of example latching, multiplexing, and clipping stages for respective 2-D DCT of EE, EO, OE, and OO sub-blocks according to an embodiment of the present invention.

Finally, each 16-bit output data is required to be truncated and saturated within the required data ranges of the 2-D DCT and 2-D IDCT. For the 2-D DCT computation, each word being multiplexed out from the latches is truncated to the nearest integer at first, followed by a saturation operation which clips the integer in the range of −2048 to +2047 (12-bit long for each). For the 2-D IDCT, the 16-bit words, which are coming out from the shuffler, are truncated to the nearest integers before the integers are saturated in the range of −256 to +255 (9-bit long for each). Four DCT's truncation & saturation control units (or clippers) 1730 are needed for 2-D DCT implementation, while four IDCTs truncation & saturation control units 1730 are needed for 2-D IDCT computation. One example implementation 1700 of the auxiliary modules is illustrated in FIG. 17.

5.5 Architectures for DCT, IDCT and Combined DCT/IDCT

Figure 18A:
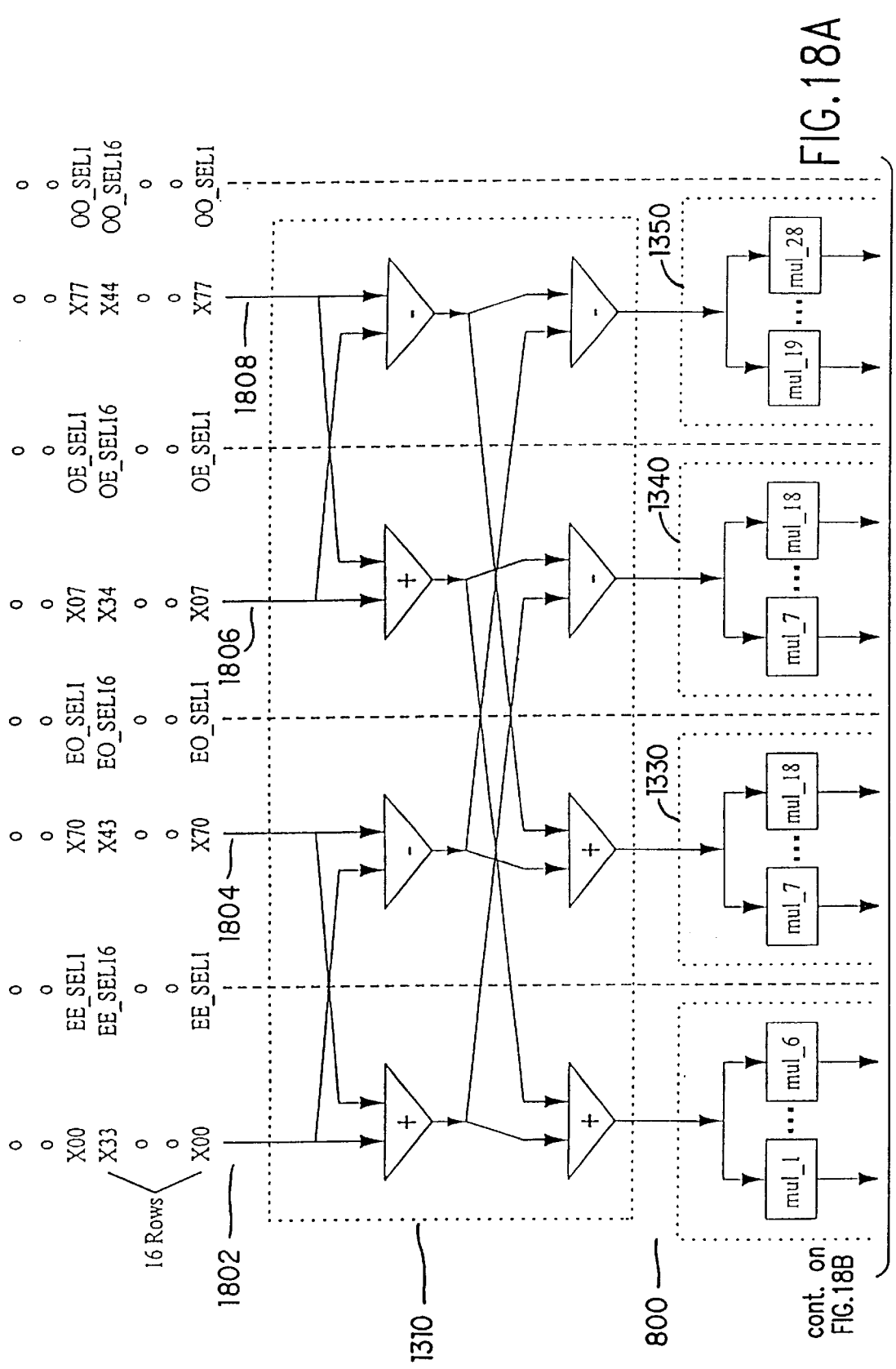
FIG. 18 is a diagram of an example architecture and data for a 2-D DCT according to an embodiment of the present invention.
Figure 18B:
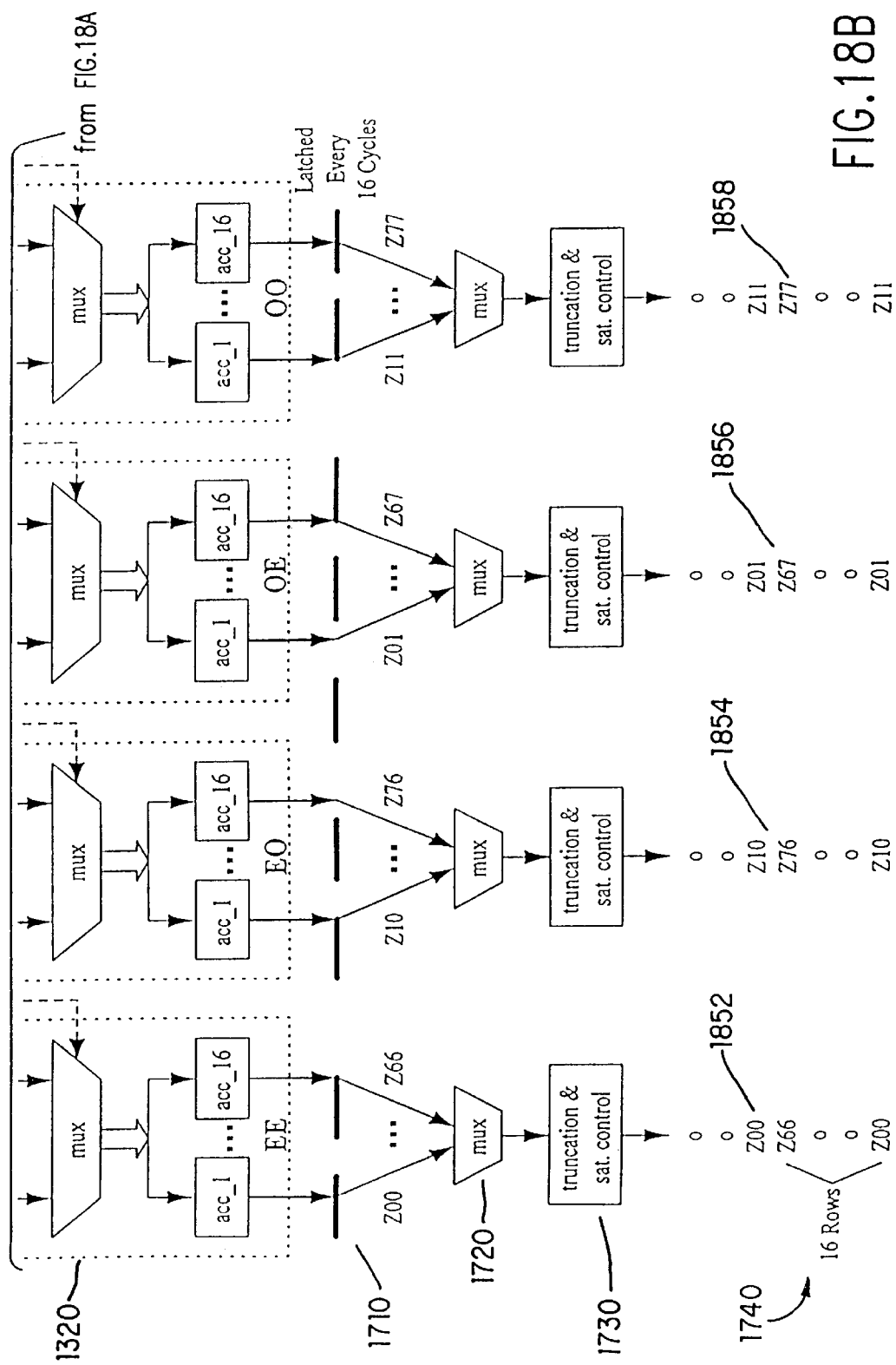

Having described the shuffler 1310, the EE, EO, OE and OO sub-blocks 1320–1350, the sixty four latches 1710, the four output-muxes 1720 and the four truncation & saturation control units 1730 in previous sections, a 2-D DCT algorithm can now be constructed with a concurrent pipelined architecture 1800 according to a further embodiment of the present invention (FIG. 18). At each cycle, four input elements 1802, 1804, 1806, 1808 are fed into the DCT shuffler 1310, in which four pairs of addition/subtraction butterfly operations take place before the $x_{++}, x_{-+}, x_{+-}$ and $x_{--}$ values are sent out. Then, the output data from the shuffler 1310 are fed into EE, EO, OE and OO sub-blocks in parallel. Within each sub-block, the multiplications of $u_{kl}\Omega_{ij}$ are carried out by 6~12 pseudo-multipliers and the multiplication results will be multiplexed on to 16 accumulators. The 16 output data from each sub-block are latched by 16 latches 1710 as soon as all 64 input data have been processed by the sub-blocks. Therefore, after the accumulators are reset to zero, each sub-block will be ready to start process the next 8×8 input data set. The latched accumulation results $$\sum_{l=0}^{3}\sum_{k=0}^{3} u_{kl} \cdot (b_{ik}c_{jl})$$

will be multiplexed out in parallel by four 16-to-1 multiplexers (output-muxes 1720) in 16 clock cycles. Finally, after being further processed by four DCT's truncation & saturation control units 1730, the DCT results 1852, 1854, 1856, 1858 come out in parallel. The results for one set of 8×8 input data come out 4 elements in one row for 16 consecutive clock cycles, and each is a 12-bit long integer.

By using adder, subtractors, pseudo-multipliers, multiplexers and accumulators, the 2-D DCT can be implemented by pure datapath (i.e. consisting of processing elements only), which is illustrated in FIG. 18. It is worth noting that no extra memory components are required in this concurrent pipelined architecture.

Figure 19A:
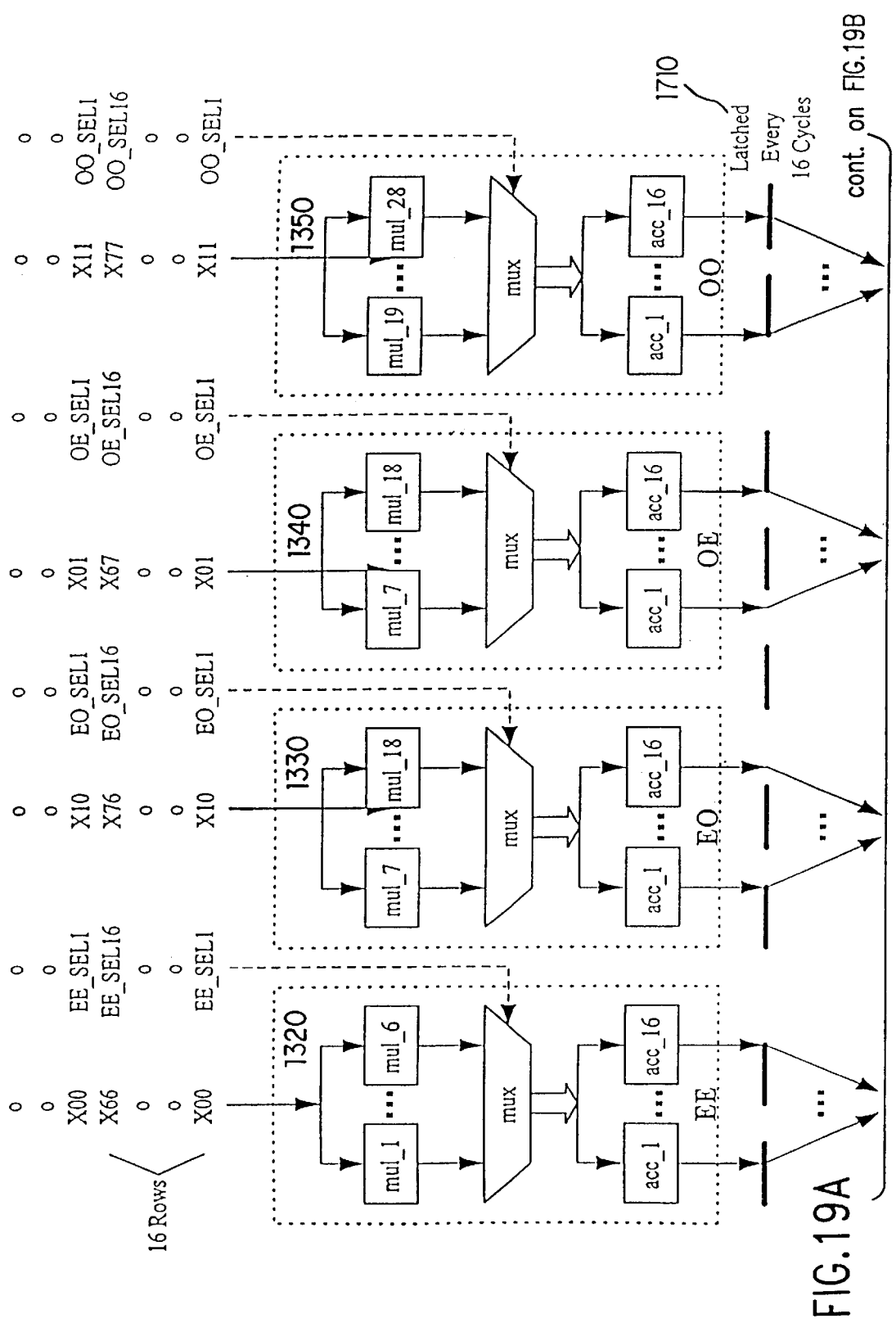
FIG. 19 is a diagram of an example architecture and data for a 2-D IDCT according to an embodiment of the present invention.

In addition, the same circuit modules can be used to implement the 2-D IDCT algorithm, given that the shuffler 1310 is moved below the output-muxes 1720 as shown in FIG. 19.

Since the shuffler 1310, the EE, EO, OE and OO sub-blocks 1320–1350, the latches 1710 and the output-muxes 1720 are all shared between the 2-D DCT and 2-D IDCT implementations for the algorithm, a combined 2-D DCT/IDCT implementation can be easily constructed according to a further embodiment of the present invention. Four more input-muxes 2010 and four more inter-muxes 2030 are required to switch back and forth between the DCT data and the IDCT data for the combined 2-D DCT/IDCT implementation. IDCT and DCT truncation and saturation control unites (or clippers) can each be a clipper 1730 as described above. The combined architecture according to a further embodiment of the present invention is shown in FIG. 20.

Figure 20:
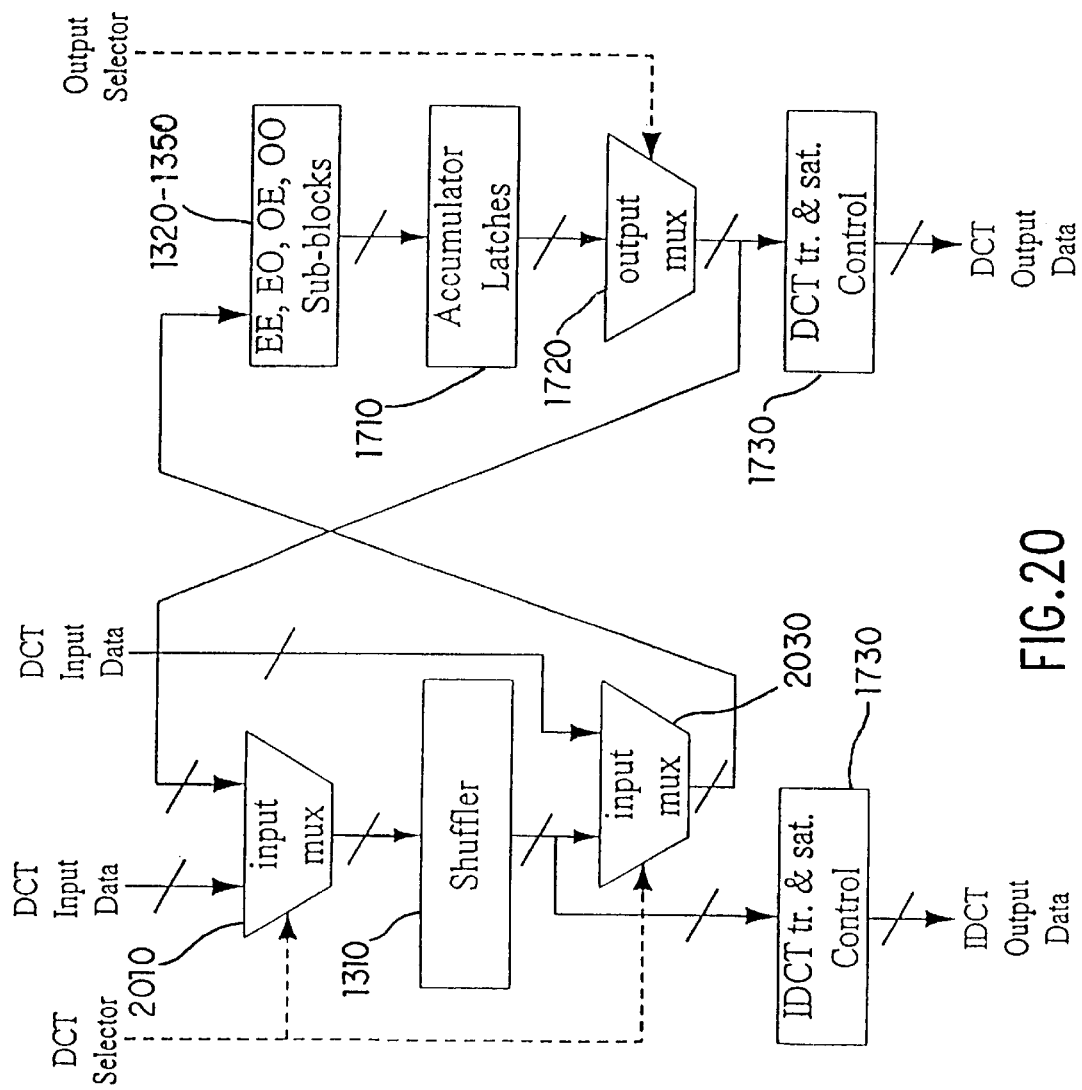
FIG. 20 is a diagram of an example combined architecture and data for 2-D DCT and 2-D IDCT according to an embodiment of the present invention.

As shown in FIGS. 18 to 20, the combined 2-D DCT/IDCT implementation does have a highly modular, regular and concurrent architecture. All processing units in FIG. 20 are 100% sharable between the 2-D DCT and the 2-D IDCT operations. The processing speed of each module is perfectly balanced with four samples per cycle I/O rate. By processing 8×8 input data in 16 cycles on average, this pipelined implementation can achieve 4 samples/cycle throughput for both the 2-D DCT and 2-D IDCT operations.

5.6 Summary

In this section, the hardware implementation schemes for a 2-D DCT, a 2-D IDCT and a combined 2-D DCT/IDCT, which are all based on the algorithm of the present invention, have been introduced. The key components of the implementation schemes include a shuffler 1310, subblock operators 1320–1350 (which are made of 40 pseudo-multipliers, x-to-16 multiplexers and accumulators), accumulator latches 1710, output-mux 1720 and output clippers 1730.

The shuffler is used in the combined 2-D DCT/IDCT scheme to accomplish the computations in Eq. (5.7). Since four adders and four subtractors are arranged in a two layer structure, the latency between the input and output might be two clock cycles. But it can be reduced to one cycle if fast adders and subtractors are used in order to decrease the system delay.

The sub-block operators are definitely the most important components in this hardware implementation scheme. In each sub-block, several hardwired adders and subtractors can be used to compute the multiplication $u_{kl} \cdot (w_m w_n)$, and the accumulation operations for each element $$\sum_{l=0}^{3} \sum_{k=0}^{3} u_{kl} \cdot (w_m w_n)$$

can be carried out by a multiplexer and 16 accumulators. The design task can be greatly simplified because the EO and the OE subblocks have identical structure, as well as the 64 accumulators in the four sub-blocks are also identical. It has been shown that there is no communication interconnections between the sub-blocks. Consequently, localized interconnection has been achieved with this architecture.

In addition, by latching the results of the 44 matrix multiplications, each sub-block can be freed up to start process next set of input data as soon as the last input data in the current data set are processed, which results in twice as high the system throughput rate. Without the accumulator latches, each sub-block would have to pause for 16 cycles before it can start to process next set of input data, since it takes 16 cycles to retrieve all the 64 data in the accumulators by the output-muxes.

The circuit synthesis will be relatively simple since an example implementation only uses adders, subtractors and multiplexers and all of them are 100% sharable between 2-D DCT and 2-D IDCT operations. The only overhead for the combined 2-D DCT/IDCT implementation is four input-muxes and four inter-muxes, which are used to switch back and forth between the DCT data and the IDCT data. The modularity, regularity, concurrency and localized interconnection of the architecture according to the present invention make it well suited for VLSI implementation.

6.0 HDL Design and Synthesis for an Example 2-D DCT/IDCT Algorithm

In this section, some modem VLSI design techniques have been used to implement an example 2-D DCT/IDCT algorithm according to the present invention. The circuit logic synthesis is carried out with Synopsys Design Compiler® and the pre-layout gate-level simulation result shows that the implementation can achieve 800 million samples per second throughput with only 7-cycle circuit delay.

6.1 Introduction

With the development of highly automated Computer Aided Design (CAD) systems for the digital VLSI circuits design, Application Specific Integrated Circuits (ASIC) have become a very attractive way to achieve performances approaching that of custom crafted custom VLSI with very modest costs. It seems clear that the high level aspects of VLSI CAD technology can be applied to the implementations of some specific algorithms into VLSI circuits so that the design and development of the application specific processors will be greatly simplified. In fact, this approach can drastically reduce the risk and the cost to create application specific circuits for some algorithms intended to be implemented with VLSI technology.

Recently, advances in integrated circuit technology have provided the ability to design and synthesize high-quality Application Specific Integrated Circuits that are commercially viable [Swa97, AB094]. The limitations of old schematic capture based design have become clearly evident with the increase of complexity of integrated circuits. High-level design (steps 2100–2120) and logic synthesis (step 2130) have provided an answer to these limitations. High-level design methodology using hardware description languages (HDLs), such as Verilog and VHDL, has emerged as the primary means to capture input functionality (step 2100) and deal with a range of design issues. These HDLs not only offer high-level descriptions of the circuits that match the required design specifications (step 2110), but also provide means to verify and synthesize the circuits with the help of Electronic Design Automation (EDA) tools.

Figure 21:
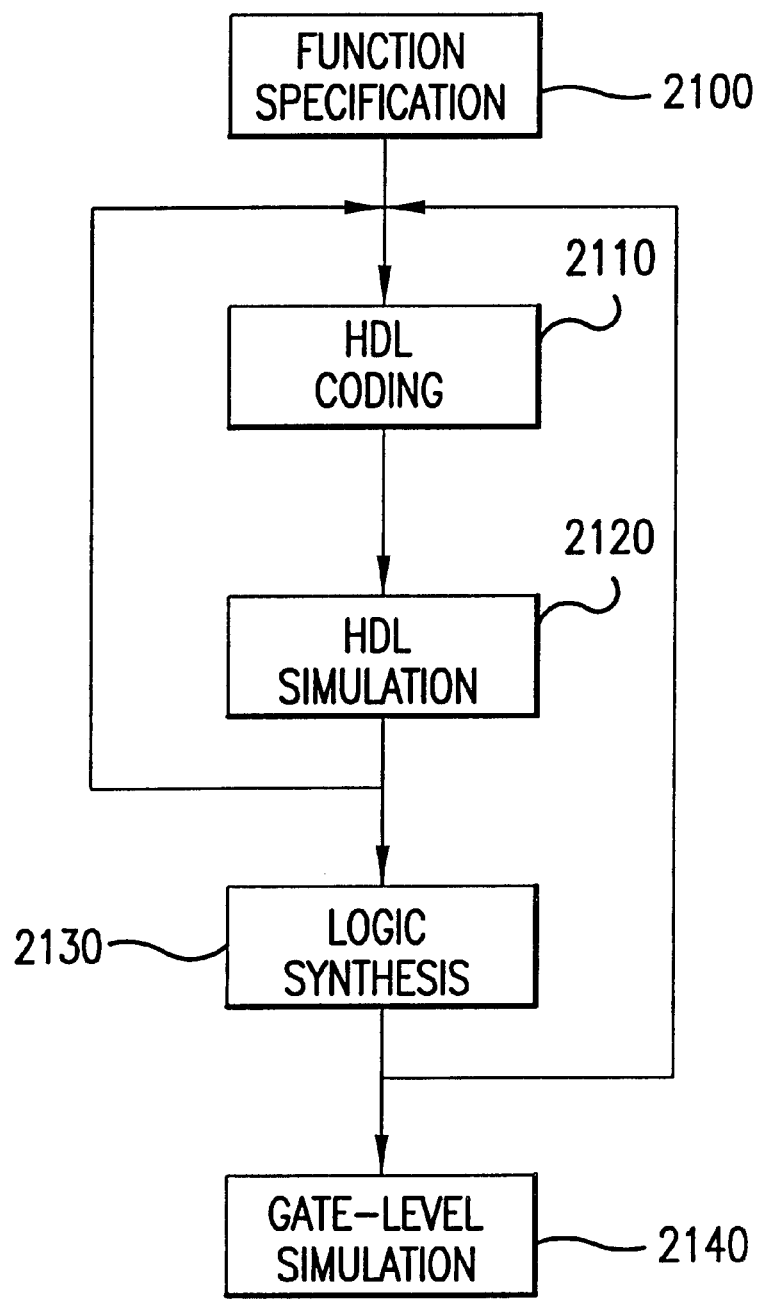
FIG. 21 is a flowchart of a synthesis approach according to an embodiment of the present invention.

A methodical approach to system implementations can be formulated as a synthesis-oriented solution which has been enormously successful in the design of individual integrated circuit chips. Instead of using a specification as a set of loosely defined functionalities, a synthesis approach for hardware begins with systems described at the behavioral level and/or register transfer level (RTL) by means of appropriate procedural hardware description languages. In general, logic synthesis is the process of transforming functionality which is initially described in HDL to an optimized technology specific netlist. After the simulations of the high-level description are carried out (step 2120) to verify that the designed functionalities can be achieved, the high-level description would be further translated down to some detailed hardware which only consist of basic logic gates (step 2130). Thus the outcome of the logic synthesis (step 2130) is a gate-level description that can be implemented as a single chip or as multiple chips (step 2140). The use of logic synthesis (step 2130) has made it possible to effectively translate designs captured in these high-level languages to designs optimized for area and/or speed. In addition to enabling control over design parameters such as silicon real-estate and timing, logic synthesis tools facilitate the capture of designs in a parameterizable and re-usable form. Moreover, logic synthesis (step 2130) makes it possible to retarget a given design to new and emerging semiconductor technologies. The synthesis-oriented approach, which is highlighted in FIG. 21, has been gaining wide acceptance in recent years.

Using the synthesis-oriented approach, the circuit design and synthesis of an example algorithm according to the present invention are carried out in the following sections. In section 6.2, the circuit design specifications for major components, plus the necessary communication handshaking signals, are discussed in detail. Also the RTL programming and simulation result of the example algorithm are also carried out in the section. In section 6.3, logic synthesis of an example circuit implementation is performed and the synthesis result is verified by prelayout gate-level simulation. A brief summary of this section is presented in section 6.4.

6.2 HDL Design and Simulation

Generally speaking, high-level designs and simulations are often referred to as behavioral, because only the externally visible behavior of component devices is specified, rather than the precise detail structure of the components. Behavioral description is usually used to initially verify the functionalities and feasibility of the original designs. In contrast, register transfer level (RTL) designs and simulations are written in terms of structural elements such as registers, and the signals used can take on values of bytes, words, and so forth. Gate-level design and simulation are usually related to the circuits down to the detail of logic gates, and the unit of data on the signals is the bit (single register).

Since detailed functionality and finite wordlength simulations have been carried out in Section 4, the behavioral design and simulation of the proposed algorithm can be skipped here. Instead, all the design and simulation efforts in this section will focus on the RTL description. Although HDL code can be behavioral or RTL, the latter is usually considered to be the synthesizable form of HDL code in the synthesis domain.

Based on the architectural designs in Section 5, the key components of the example algorithm implementation will be captured with HDL codes, and then be simulated. In some cases, the HDL codes might have to be modified slightly in order to achieve more efficient synthesized gate combinations.

6.2 HDL Design for Shuffler

It can be seen from section 5.2 that the shuffler can be implemented with 4 adders and 4 subtractors positioned in two layers. The top layer consists of 2 adders and 2 subtractors, and the bottom layer also consists of 2 adders and 2 subtractors. The functionality of the shuffler can be captured with Verilog hardware description language as

```
// shuffler for proposed 2-D DCT/IDCT implementation
// pipelined with 2 cycles delay
module shuffler(in0,in1,in2,in3,clk,xpp,xmp,xpm,xmm);
parameter       width = 16;              // internal wordlength
input [width-1:0]  in0,in1,in2,in3;      // 4 input data
input              clk;                  // system clock
output [width-1:0] xpp,xmp,xpm,xmm;      // 4 output data
reg [width-1:0]    xp0,xp1,xm0,xm1;      // 4 intermediate data
reg [width-1:0]    xpp,xmp,xpm,xmm;      // registered output
wire [width-1:0]   add1 = in0 + in1;     // 4 adders & 4
subtractors inferred
wire [width-1:0]   add2 = in2 + in3;
wire [width-1:0]   sub1 = in0 - in1;
wire [width-1:0]   sub2 = in0 - in1;
wire [width-1:0]   add3 = xp0 + xp1;
wire [width-1:0]   add4 = xm0 + xm1;
wire [width-1:0]   sub3 = xp0 - xp1;
wire [width-1:0]   sub4 = xm0 - xm1;
always @ (posedge clk) begin             // at positive edge of each
clock
xp0 <= #0.1 add1;                        // top layer, intermediate
results
xp1 <= #0.1 add2;                        // registered with 1
cycle delay
xm0 <= #0.1 sub1;
xm1 <= #0.1 sub2;
xpp <= #0.1 add3;                        // bottom layer, final
results
xmp <= #0.1 add4;                        // reg. output with
2-cycle delay
xpm <= #0.1 sub3;
xmm <= #0.1 sub4;
end
endmodule                                // end of module shuffler
```

The functional description above uses 4 16-bit registers as intermediate storage to separate the top and bottom layers' arithmetic operations into separate clocks. In this way, only one addition or subtraction operation is executed per clock period. Not only does this approach simplify the synthesis complexity of shuffler module, but it also adds pipelining ability to the module. This enables the processing rate to be linearly scaled up, since the processing elements "add1", "add2", "sub1" and "sub2" can start to process the next 4 data elements while the current 4 data elements are still being processed by elements "add3", "add4", "sub3" and "sub4". All the registers used in the shuffler module would eventually be replaced by positive edge triggered flip flops.

6.2.1 HDL Design for Sub-block Operators

It has been shown in section 5.3 that each sub-block operator consists of 6~12 pseudo-multipliers (in which each pseudo-multiplier can be implemented with a few hardwired adders/subtractors), 16 x-to-1 multiplexers and 16 16-bit accumulators. Using 13-bit approximations for the coefficients $\Omega_{ij}$ as shown in Table 4.10, it can clearly be seen that it is always possible to implement any pseudo-multiplier with at most 7 adders and subtractors. If one arranges these 7 adders and subtractors into a 3 layers configuration similar to the shuffler, then each pseudo-multiplier can also be implemented with a pipelined structure that has no more than 3-cycle circuit delay. The output results from the pseudo-multipliers will be multiplexed onto the 64 accumulators and one more cycle delay is allowed to be associated with multiplexing and accumulating operations.

Since there are too many independent modules in the EE, EO, OE and OO sub-blocks, it would be impossible to present the HDL descriptions here for all of them. Therefore, only one pseudo-multiplier, one 6-to-1 multiplexer and one 16-bit accumulator from the EE sub-block are presented as examples and demonstrate their RTL descriptions.

It has been shown in section 5.3 that multiplication of $u_{kl}\Omega_{22}$ can be carried out as $$x101 = u_{kl} + (u_{kl} >> 2)$$

$$u_{kl}\Omega_{22} = u_{kl} - (x101 >> 3) + (x101 >> 7) \quad (6.1)$$

where 2 adders and 1 subtractor are needed to yield the multiplication result. The function thus can be captured with Verilog hardware description language as

```
// pseudo-multiplier for u• Ω22 = u• 0.110110101b
// pipelined with 3 cycles delay
module m_ww22(in,clk,out);
parameter    width = 12;                // input wordlength
input  [width-1:0]  in;                 // input data
input               clk;                // system clock
output [width+1:0]  out;                // output data
reg    [width-1:0]  in_d1;              // 1-cycle delayed input value
reg    [width+2:0]  x1;                 // intermediate data
reg    [width-1:0]  in_d2;              // 2-cycle delayed input
reg    [width+2:0]  x2;                 // intermediate data
reg    [width-1:0]  out;                // registered output
wire   [width+2:0]  add1 = {in,2'b00} + in;   // x+(x>>2)
wire   [width-1:0]  sub1 = x1[width+2.4]-     // (x1>>4)-x1
                           x1;
wire   [width+2:0]  add2 = {in_d2,3'b001}
                           + x2[width+2:2];   // final result
                                              // with 0.001bpreset
always @ (posedge clk)   begin          // at positive edge of each
clock
x1 <= #0.1 add1;                        //registeredx101
in_d1 <= #0.1 in;                       // 1-cycle delayed input value
x2 <= #0.1 sub1;                        // registered (x101>>4)-x101
in_d2 <= #0.1 in_d2;                    // 2-cycle delayed input value
out <= #0.1 add2 [width+2.1];           // registered output
                                        // truncated to 12.2
end
endmodule        // end of module m_ww22
```

The registers "x1", "x2", "in_d1" and "in_d2" are employed in module "m_ww22" to hold the intermediate multiplication results, which makes the pseudo-multiplier able to operate in a pipelined mode.

The 6-to-1 multiplexer, which is the second key component module in the EE subblock, can easily be coded with Verilog HDL since it consists of pure combinational logic. The six input data for the multiplexer come from six pseudo-multipliers in the EE subblock, and one and only one of them will be selected as module output based on the current mux-selector value.

```
// 6-to-1 mux
module mux_6_1(in0,in1,in2,in3,in4,in5,mux_sel,out);
parameter    width = 14;              // input wordlength
input   [width-1:0]   in0,in1,in2,in3,in4,in5;   // input data
input   [2:0]    mux_sel;             // mux_selector
output  [width-1:0]   out;            // output data
reg     [width-1:0]   out;
always @ (mux_sel or in0 or in1 or in2 or in3 or in4 or in5) begin
                                 // trigged by any signal changes
    case (mux_sel)               // synopsys full_case parallel_case
        3'b000:    out <=in0;    // select in0 as output mux_sel=0
        3'b001:    out <=in1;
        3'b010:    out <=in2;
        3'b011:    out <=in3;
        3'b100:    out <=in4;
        3'b101:    out <=in5;    // select in5 as output if mux_sel=5
    endcase
end
endmodule          // end of module mux_6_1
```

The 16-bit accumulator, which is the third key component module in the EE-sub-block,—would add/subtract the current input data into/from previous accumulated results stored in it. The accumulator has to be reset every 16-cycle in order to get a fresh start for next set of input data. The HDL code for this functionality is sub-blocks, which might be an adder, subtractor or accumulator, is balanced since the computation time of each PE equals the I/O time required by the data transmission. Except in multiplexer modules, all the registers used in sub-blocks implementation will eventually be replaced by positive edge triggered flip flops.

6.2.3 HDL Design for Auxiliary Components

It has been demonstrated in section 5.4 that several auxiliary components are required by one example combined 2-D DCT/IDCT implementation. Among them, 64 16-bit latches are used to latch and hold the sub-blocks' output data for 16 cycles when accumulator-ready-to-send signal is asserted. The 4 16-to-1 output-multiplexers are used to select 4 latched data out in each cycle, and each of them can be coded similar to the 6-to-1 multiplexer discussed in section 6.2.2. Several truncation & saturation control units are required by both 2-D DCT and IDCT operations and each can be built with an incrementor and simple clipping circuit. Moreover, the input-multiplexer and intermediate-multiplexer shown in FIG. 20 can be made up of a simple 2-to-1 multiplexer controlled by DCT/IDCT selector input. The detailed HDL descriptions for the auxiliary components are not included in this section because they are relatively simple as should be apparent to a person skilled in the art given this description.

6.2.4 HDL Simulation for Combined 2-D DCT/IDCT

The HDL simulation of a combined 2-D DCT/I DCT module, coded with Verilog hardware description language, is carried out with Cadence's Verilog-XL® simulation tool [Cad]. A "top" module (i.e. stayed on top of the combined 2-D DCT/IDCT module) is adopted as the testbench in the simulation process and behaves like a interface component to control the interaction between the tested module and its environment. The signal "sel_dct" is controlled by the "top" module to indicate whether DCT or LDCT computation is

```
// 16-bit accumulator
// 1-cycle delay
module accumulator(in,sel,reset,clk,out);
parameter    width = 14;                         // input wordlength
input   [width-1:0]   in;                        // input data
input                 sel;                       // addition/subtraction
                                                    selector
input                 reset;                     // accumulator reset
input                 clk;                       // system clock
output  [width+2:0]   out;                       // output data
reg     [width+2:0]   out;
wire    [width+2:0]   org = reset ? 16'b0: out;  // previous result
wire    [width+2:0]   acc = sel ? (org - in) : (org + in);  // if sel=0,
                                                               addition
                                                 // else, subtraction
always @ (posedge clk) begin                     // at positive edge of each clock
    out <= #0.1 acc;                             // registered output
end
endmodule                                        // end of module accumulator
```

A finite state machine with 16 distinguish states is employed to hold the current state and generate the mux-selector, reset and add-sub selector signals. The values of mux-selector, reset and add-sub selector for 16 different states can be pre-calculated with Eq. (5.8) and Eq. (3.8).

The detailed HDL coding for 4 sub-blocks reveals that a total of 82 adders and subtractors are needed to implement the 40 multipliers $u_{kl}\Omega_{22}$ in the EE, EO, OE and OO sub-blocks, which is equivalent to average of 2.05 adders/subtractors for each multiplication. In order to carry out the summation function in Eq. (5.8), 64 16-bit adder/subtractors are also needed. Each processing element (PE) in these 4 desired. After the system reset, the "top" module will start to feed input data into the tested module as soon as the input ready-to-receive signal "inp_rtr" is asserted by the tested module. It takes 16 cycles to complete the data feeding of one set of input data. The output ready-to-send signal "out_rts" will be asserted by the tested module when the 2-D DCT/IDCT computation for one set of input data is finished and the valid output results are available. Then, the "top" module starts to capture the output data from the tested module and compare them with pre-calculated 2-D DCT/IDCT results. 4 input data elements are being fed to and 4 output element are being captured from the tested module in each clock cycle. If any inconsistencies are detected, the comparison error signal "cmp_err" will assert from low to high.

The "top" module also generates a 200 MHz frequency system clock. The consecutive sets of input data could be loaded into the tested module continuously. In the simulation, consecutive data sets are separated by a random number of clock cycles in the range from 0 to 3. With a 200 MHz clock, the maximum throughput of this combined 2-D DCT/IDCT module is 800 million samples per second for both DCT and IDCT operations.

Figure 22:
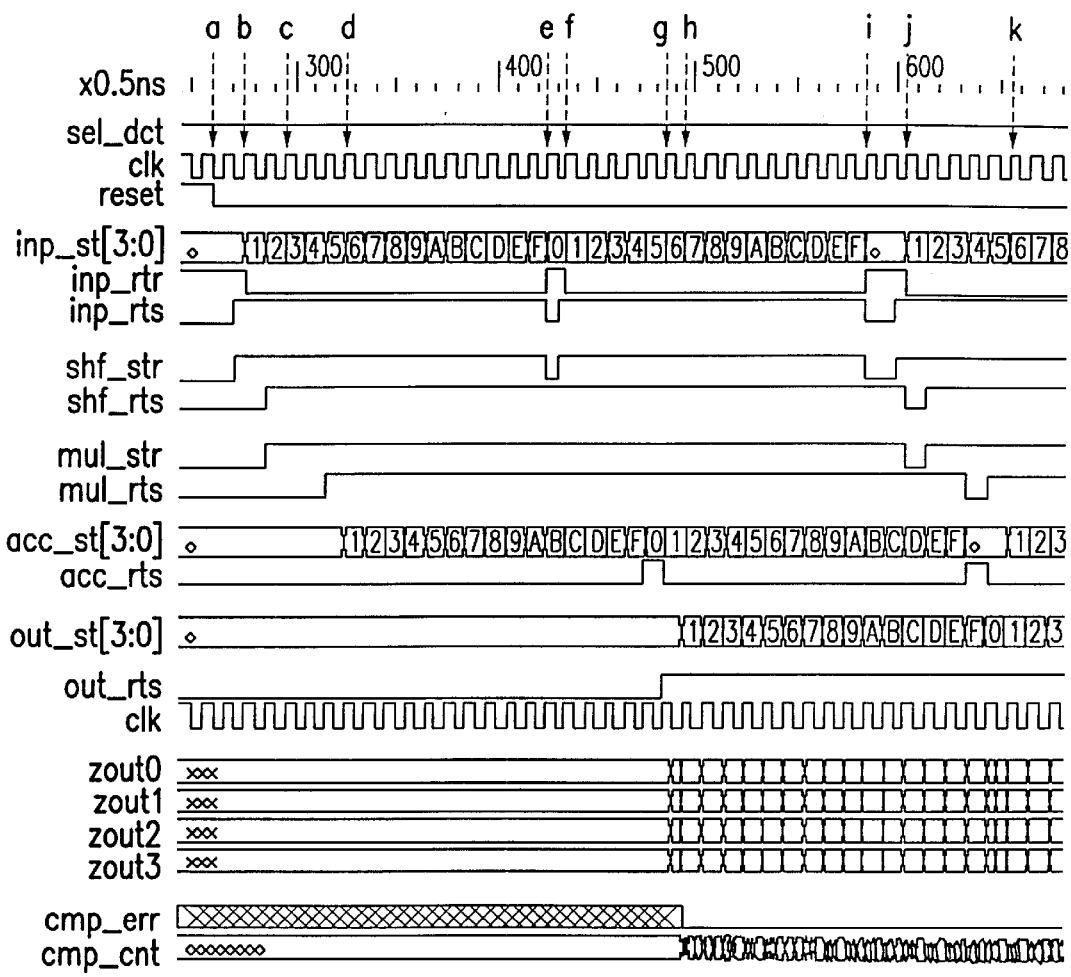
FIG. 22 is a timing diagram illustrating waveforms of 2-D DCT input/output and handshaking signals for an example VLSI implementation according to the present invention.

For 2-D DCT HDL simulation, 1000 sets of randon-fly generated 8×8 input data are used to assure the HDL coded 2-D DCT functionality. The signal waveforms are illustrated in FIG. 22. Some handshaking signals are used to coordinate the operations among the submodules inside the 2-D DCT/IDCT module. The signal "sel_dct" is asserted here to indicate that the desired operation is a 2-D DCT.

In FIG. 22, several critical timing moments are appropriately labeled to indicate the following events:

(a) System reset signal goes from high to low, which indicates that system reset process has just completed;

(b) At the positive edge of the clock, the first 4 data from the first input data set are fetched into the tested module. A finite state machine will keep incrementing the current state "inp_st[3:01" and set input ready-to-receive signal, "inp_rtr", to high again when all 64 input data from the input data set have been fetched. The data loaded in will go directly into the shuffler module. The next input data set will not be fetched into the tested system until both the tested module is ready to receive (signal "inp_rtr" is asserted) and the "top" module has input data ready to send (which is demonstrated by setting input ready-to-send signal "inp_rts" to high);

(c) At the positive edge of the clock, the shuffler starts to transmit the shuffling results into 4 sub-block modules in 16 consecutive cycles. The shuffier ready-to-send signal, "shf_rts", was asserted before this rising edge of the clock, which indicates the shuffling results are available. The multiplier start-to-receive signal, "mul_str", informs the pseudo-multiplier modules that input data $u_{kl}$ are coming;

(d) At the positive edge of the clock, the pseudo-multipliers start to send out the multiplication results into the accumulators for 16 consecutive cycles. The multiplier ready-to-send signal, "mul_rts", indicates that the output data from the multipliers are valid at the rising edges of the clock when the signal "mul_rts" is asserted. Another finite state machine is employed here to track the current accumulator state "acc_st[3:0]", which increments by one after the positive edge of the clock to show that a accumulation operation has completed;

(e) At the positive edge of the clock, the last 4 data from the first input data set are fetched into the tested module. The input ready-to-receive signal "inp_rtr" is asserted again to indicate that the tested module is ready for next input data set;

(f) At the positive edge of the clock, the first 4 data from the second input data set are fetched into the tested module. There is 0 cycle latency between the first and second input data sets;

(g) At the positive edge of the clock, the current accumulator results are being latched into accumulator latches. The accumulator ready-to-send signal, "acc_rts", was asserted before the positive edge, which indicates that the accumulators latching should occur exactly at the positive clock edge;

(h) At the positive edge of the clock, the 2-D DCT results based on the first input data set are available and will shifted out in total of 16 consecutive cycles as long as the output ready-to-send signal, "out_rts", remains high. The third finite state machine is employed here and the current state machine value "out_st[3:0]" is used as the outmux selector to control the operation of the 16-to-1 output multiplexers. The 4 DCT output data in each cycle are compared to the pre-calculated DCT results and any inconsistency will trigger a comparison error signal "cmp_err". The comparison counter "crnp_snt" is be used to track how many comparisons have been made;

(i) At the positive edge of the clock, the last 4 data from the second input data set are fetched into the tested module. The input ready-to-receive signal "inp_rtr" is asserted again to indicate that the tested module is ready for next input data set;

(j) At the positive edge of the clock, the first 4 data from the third input data set are fetched into tested module. There is 1 cycle pause between the second and third input data sets;

(k) At the positive edge of the clock, the 2-D DCT results based on the second input data set are coming out in total of another 16 consecutive cycles.

Not a single comparison error has been detected in the 2-D DCT HDL simulation.

Figure 23:
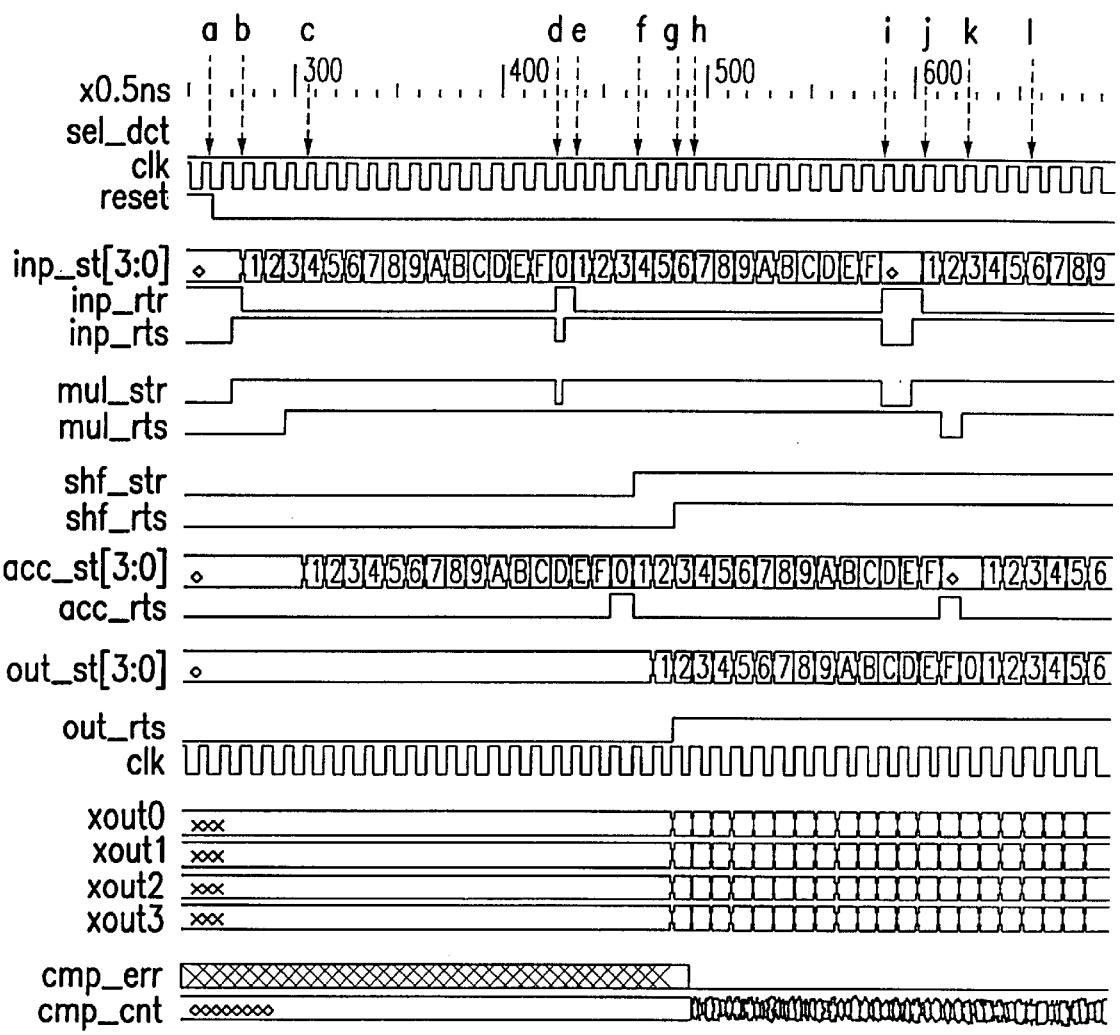
FIG. 23 is a timing diagram illustrating waveforms of 2-D IDCT input/output and handshaking signals for an example VLSI implementation according to the present invention.

For 2-D IDCT HDL simulation, 1000 sets of randomly generated 8×8 input data are used to assure the HDL coded 2-D IDCT functionality, as well. The signal waveforms are illustrated in FIG. 23. The signal "sel_dct" is set low here to indicate the desired operation is a 2-D IDCT.

In FIG. 23, several critical timing moments are appropriately labeled to indicate the following events:

(a) System reset signal goes from high to low, which indicates that the system reset process has just completed;

(b) At the positive edge of the clock, the first 4 data from the first input data set are fetched into the tested module. A finite state machine will keep incrementing the current state "inp_st[3:0]" and set input ready-to-receive signal, "inp_rtr", to high again when all 64 input data from the input data set have been fetched. The data loaded in will go directly into the sub-block modules. The next input data set will not be fetched into the tested system until both the tested module is ready to receive (signal "inp_rtr" is asserted) and the "top" module has input data ready to send (which is demonstrated by setting input ready-to-send signal "inp_rts" to high);

(c) At the positive edge of the clock, the pseudo-multipliers start to transmit the multiplication results into the accumulators in 16 consecutive cycles. The multiplier ready-to-send signal, "mul_rts", was asserted, which indicates that the output data from the multipliers are valid at the rising edges of the clock. Another finite state machine is employed here to track the current accumulator state "acc_st[3:0]", which increments by one after the positive edge of the clock to show that an accumulation operation has completed;

(d) At the positive edge of the clock, the last 4 data from the first input data set are fetched into the tested module. The input ready-to-receive signal "inp_rtr" is asserted again to indicate that the tested module is ready for next input data set;

(e) At the positive edge of the clock, the first 4 data from the second input data set are fetched into the tested module. There is 0 cycle latency between the first and second input data sets;

(f) At the positive edge of the clock, the current accumulator results are being latched into accumulator latches. The accumulator ready-to-send signal, "acc_rts", was asserted before the positive edge, which indicates that the accumulators latching should occur at the rising clock edge. The third finite state machine is employed here and the current state machine value "out_st[3:01" is used as the out-mux selector to control the operations of the 16-to-1 output multiplexers:

(g) At the Positive edge of the clock, the shuffler is going to finish its first shuffling operation for sub-blocks' output based on the first input data set. The shuffler ready-to-send signal, "shf_rts", will change from low to high after this rising edge of the clock and will keep asserted in total of 16 consecutive cycles, which indicates that the data are available for further process;

(h) At the positive edge of the clock, the 2-D IDCT results based on the first input data set are available and will be shifted out in total of 16 consecutive cycles as long as the output ready-to-send signal, "out_rts", remains high. The 4 IDCT output data each cycle are compared to the pre-calculated IDCT results and any inconsistency will trigger the comparison error signal "cmp_err". The comparison counter "cmp_cnt" is be used to track how many comparisons have been made;

(i) At the positive edge of the clock, the last 4 data from the second input data set are fetched into the tested module. The input ready-to-receive signal "inp_rtr" is asserted again to indicate that the tested module is ready for next input data set;

(j) At the positive edge of the clock, the first 4 data from the third input data set are fetched into the tested module. There is 1 cycle pause between the second and third input data sets;

(k) At the positive edge of the clock, the current accumulator results are being latched into accumulator latches. The accumulator ready-to-send signal, "acc_rts", was asserted before the positive edge, which indicates that the accumulators latching should occur on the rising clock edge for the second input data set;

(l) At the positive edge of the clock, the 2-D IDCT results based on the second input data set are available and will be shifted out in total of 16 consecutive cycles as long as the output ready-to-send signal "out-rts" remains high.

Not a single comparison error has been detected in the 2-D IDCT HDL simulation, either.

From the RTL simulation results shown in FIGS. 22 and 23 one can see that the throughput rate for both the DCT and IDCT computations is 12,500,500 8×8 blocks per second, which is equivalent to 800 MSample/s.

6.3 Logic Synthesis for Example 2-D DCT/IDCT Algorithm

Logic synthesis is a process which is primarily intended to be used in the design of digital integrated circuits, in particular, ASIC devices. In general, logic synthesis software tools are used with specialized languages such as Verilog and VHDL to efficiently describe and simulate the desired operation of the circuit. If used properly, the synthesis tools can then automatically generate the gate-level logic schematics, based on appropriate HDL descriptions. The fact that much of the detail work is automated leads to an improvement in the overall design process in terms of helping to manage the complexity and improving the productivity and accuracy [KA95].

In the synthesis process, the validated HDL code is first translated into a generic netfist and some Boolean expressions. The generic neffist consists of some basic elements which are described in a generic library. The concept of the generic nedist allows for the original design to be transfonned or optimized depending on custon-dzed constraints. When instructed to reduce the number of gates count, the entire set of Boolean equations is minimized by grouping common terms and simplifying. If the idea is to achieve a better control of the tin-ling performance, the levels of logic gate level are reduced even if this transformation implies duplicating certain expressions. Finally, the resulting description has to be mapped onto a physical target library (or technology library). The result of the whole synthesis process has to fit the area and speed constraints specified by the designers. A successful HDL synthesis requires an in-depth understanding of the synthesis process and the operation of synthesis tools. There are several "do's and don'ts" that a designer must be aware of when coding in HDL for synthesis [KA95, Syn96].

The HDL coded 2-D DCT/IDCT functionality is synthesized with Synopsys's Design Compiler® tool ([Syn96]) based on a single-edge triggered 200MHz system clock. The technology library used in the synthesis is TSMC's 3.3v 0.35 $\mu$m CMOS library. Bottom-up plus timing-budget strategy is adopted in the synthesis process since the goal of this synthesis process is not to generate the smallest nethst, but to verify the feasibility of the HDL coded 2-D DCT/IDCT module. Since the 200 MHz system clock is adopted in the synthesis, all the critical path delays within the module should be less than 5 ns.

In the rest of this section, only the final synthesis result of an example 2-D DCT/IDCT algorithm is presented, since the step-by-step synthesis process and the customized compiler constraints associated with it are simply too meticulous and tedious to be presented. But it should be pointed out that even with advanced synthesis tools, ASCI synthesis is far from an automatic "push-button" process, but requires a fair amount of iterations. To realize a high quality design, the designer must simultaneously consider both the coding of the design and the requirements for the logic synthesis. Some HDL constructs synthesize more effectively than others, and HDL codes which might simulate correctly are not necessarily synthesizable.

The success of the undergoing synthesis process is greatly facilitated by the simplicity, regularity, modularity and local connectivity of the algorithm according to the present invention and its example HDL design. The synthesis results for each major component in the 2-D DCT/IDCT implementation are summarized as follows:

(1) Shuffler: consists of 4 adders and 4 subtractors with a butterfly connection. Simple ripple-carry adders and subtractors are selected by the Design Compiler® in the synthesis in order to reduce the complexity and silicon area of the design, provided the timing requirements are met for each critical path. The circuit latency associated with this module is 2 cycles. An 2 ns input delay constraint is applied to the 2 adders and 2 subtractors in the top layer since the input data may also come from the output-multiplexers in the 2-D IDCT case. The critical path delay reported here is 2.13 ns. The total combinational and noncombinational area is reported as 10590 units (about 3530 gates);

(2) Sub-block Operators: consist of 40 pseudo-multipliers (6 for EE sub-block, 12 for EO sub-block, 12 for OE sub-block and 10 for OO sub-block), 16 6-to-1, 32 12-to 1, 16 10-to-1 multiplexers and 64 16-bit accumulators (adder/subtractor). Simple ripple-carry adders, subtractors and adder/subtractors are selected by Design Compiler® in the synthesis in order to reduce the complexity and silicon area of the design, provided that the timing requirements are met for each critical path. The latency associated with each pseudo-multiplier is 3 cycles, and the latency associated with each combined multiplexer/accumulator is 1 cycle. The critical path delays for the pseudo-multipliers and combined multiplexer/accumulators are reported as 4.55 ns and 2.15 ns/1.82 ns, respectively. The total combinational and noncombinational area for total of 40 pseudo-multipliers is 51600 units (about 17200 gates). And the total combinational and noncombinational area for 64 multiplexer/accumulators is reported as 126300 units (about 42100 gates);

(3) Accumulator Latches: consist of 64 16-bit latches. The total combinational and noncombinational area is reported as 35840 units (about 11947 gates);

(4) Output-Muxes: consist of 4 16-to-1 multiplexers. The critical path delay for the 16to-1 multiplexer is reported as 1.91 ns. The total noncombinational area for 4 multiplexers is reported as 6096 units (about 2032 gates);

(5) Truncation & Saturation Control Units: consist of 4 DCT truncation & saturation control units and 4 IDCT truncation & saturation control units. Simple ripple-carry incrementors are used for all truncation operations. 1 cycle circuit delay is required in this stage. An 2 ns input delay constraint is applied to the DCT truncation & saturation control modules since the input data for them come directly from output-multiplexers. The critical path delay for truncation and saturation is reported as (1.75+0.25)ns. The total combinational and noncombinational area is reported as 5998 units (about 2000 gates);

(6) Other Auxiliary Components: include 4 input-multiplexers, 4 intermediate multiplexers, several finite state machines and some handshaking control modules, etc. The optimization constraints for these modules are focused mainly on silicon area. The total combinational and noncombinational area for all these components is around 30000 units (about 10000 gates).

Since the average silicon area for each logic gate is around 60 $\mu m^2$ for the TSMC's 0.35 $\mu m$ technology library, the 95,000 gates of the combined 2-D DCT/IDCT module consume about 5.7 $mm^2$ silicon area. If place-and-route factor, which is determined by a chip manufacturer as 1.2 for this technology library, is taken into account in the area estimation, the estimated final chip size of the combined 2-D DCT/IDCT example implementation would be 6.84 $mm^2$ (1.2×5.7 $mm^2$).

The critical paths timing results achieved in the synthesis have indicated that the combined 2-D DCT/IDCT synthesis process is over-constrained in one example. A smaller chip-size can be achieved by relaxing some synthesis constraints or applying characterized constraints to each submodule and recompiling it with Design Compiler (using characterize and recompile approach).

The main features of the example 2-D DCT/IDCT chip implementation, along with some other 2-D DCT or IDCT example chip implementations, are summarized in Table 6.1. It is worth notice that there is no intention make any direct comparison among the different implementations, since different technologies (i.e. with different minimum channel widths) and clock rates are used by these implementations. And there are big trade-offs between the chip size and throughput and latency.

TABLE 6.1

Feature summaries of some 2-D DCT/IDCT chips

| Implementation | Technology | Core Area ($mm^2$) | Clock Rate | Throughput | Latency | DCT/IDCT |
|---|---|---|---|---|---|---|
| [SL92] | 2 $\mu m$ | 72.68 | 50 MHz | 25 MHz | >64 | Both |
| [SL96] | 1.2 $\mu m$ | 240 | 50 MHz | 50 MHz | >64 | Both |
| [Miy93] | 0.8 $\mu m$ | 160.89 | 50 MHz | 50 MHz | >64 | Both |
| [Ura92] | 0.8 $\mu m$ | 21.12 | 100 MHz | 100 MHz | >64 | DCT only |
| [MW95] | 0.8 $\mu m$ | 10.0 | 100 MHz | 100 MHz | >64 | Both |
| [RT92] | 1 $\mu m$ | 110.25 | 40 MHz | 160 MHz | 24 | IDCT only |
| [CW95] | 0.8 $\mu m$ | 81 | 40 MHz | 320 MHz | 17 | DCT only |
| Proposed | 0.35 $\mu m$ | 6.8 | 200 MHz | 800 MHz | 7 | Both |

However it is still worth while trying to scale the chip areas consumed among the different implementations to a relative neutral base depending on the technologies used, the clock speeds employed or the system throughputs achieved, etc. A relative chip area is used that can be calculated as the ratio of the core area over the smallest unit area employed by chip manufacturers (which is based on the channel width, for 0.81 $\mu m$ technology, the unit area is 0.64). A relative-area/throughput is also defined as the ratio between the relative chip area and the system throughput of the implementation. Using the parameters listed in Table 6.1, the new ratios can be generated shown in Table 6.2.

TABLE 6.2

2-D DCT/IDCT chip comparison sorted by relative-area/throughput

| Implementation | Technology | Throughput | Core Area ($mm^2$) | Relative Area | Relative-area/Throughput | DCT/IDCT |
|---|---|---|---|---|---|---|
| [Miy93] | 0.8 $\mu m$ | 50 MHz | 160.89 | 251.39 | 502.78 | Both |
| [SL96] | 1.2 $\mu m$ | 50 MHz | 240 | 166.67 | 333.34 | Both |
| [SL92] | 2 $\mu m$ | 25 MHz | 72.68 | 18.17 | 72.68 | Both |
| [RT92] | 1 $\mu m$ | 160 MHz | 110.25 | 110.25 | 68.91 | IDCT only |
| [CW95] | 0.8 $\mu m$ | 320 MHz | 81 | 126.56 | 39.55 | DCT only |

TABLE 6.2-continued

2-D DCT/IDCT chip comparison sorted by relative-area/throughput

| Implementation | Technology | Throughput | Core Area (mm²) | Relative Area | Relative-area/ Throughput | DCT/ IDCT |
|---|---|---|---|---|---|---|
| [Ura92] | 0.8 μm | 100 MHz | 21.12 | 33.00 | 33.00 | DCT only |
| [MW95] | 0.8 μm | 100 MHz | 10.0 | 15.63 | 15.63 | Both |
| Proposed | 0.35 μm | 800 MHz | 6.8 | 55.51 | 6.94 | Both |

Moreover, the gate-level HDL simulation is also performed. The gate-level HDL code, which is captured in the combined 2-D DCT/IDCT logic synthesis process, has been used to replace the RTL description used in section 6.2. The requirements for 2-D DCT/IDCT gate-level validation are exactly the same as the RTL's, and 2-D DCT/IDCT output signals are also compared with the pre-calculated results. It has been concluded from the gate-level simulation that the original desired functionality of the proposed algorithm has been achieved by the pre-layout gate-level HDL code.

6.4 Summary

In this section, a modern synthesis-oriented ASIC design approach has been applied to the implementation of an example 2-D DCT/IDCT algorithm.

The HDL design of the proposed algorithm starts by coding its functionalities in the Verilog hardware description language. Detailed Verilog codes for some, key components of the proposed algorithm have been included in this section. By using a RTL description to precisely model the designed circuit, the captured 2-D DCT/IDCT functionality can be simulated with Cadence's Verilog-XL® simulation tool.

The logic synthesis of the combined 2-D DCT/IDCT module has been carried out based on the validated RTL code. The technology library used in the synthesis process is TSMC's 3.3 v 0.35 gm CMOS library. And bottom-up plus timing-budget strategy is adopted in the synthesis process. By using Synopsys Design Compiler® tool, the HDL coded 2-D DCT/IDCT module is synthesized based on a single-edge triggered 200 MHz system clock. The structural HDL code of combined 2-D DCT/IDCT module is generated from the logic synthesis process, and the gate-level simulation with the generated structural code has proved that the original desired functionality of the algorithm has been respected.

Moreover, an estimated 6.84 mm² chip area and 800 million samples per second throughput rate for both the 2-D DCT and IDCT definitely show a competitive edge over all other existing 2-D DCT/IDCT chip implementations. Each of the 2-D DCT and IDCT example implementations of the present invention described above are illustrative and not necessarily intended to limit the present invention.

7.0 Conclusions

In this section, some of the major contributions of this invention are summarized. MPEG-2 video encoding and decoding applications are also presented.

7.1 Contributions of this Invention

It has been shown in Section 1 that all the MPEG video codec implementations so far are limited to MPEG-1 or MP@ML of MPEG-2 specification. The major obstacles for realtime encoding/decoding compliance with MPEG-2 MP@H-14, MP@HL, HP@H-14 and HP@HL specifications lie at the huge intensity of computation and very complicated structure required. Targeted to deal with these problems, the hybrid MPEG-2 video codec implementation scheme according to on embodiment of the present invention, which is based on the fact that the MPEG-2 encoding/decoding process can be classified as parallel operation and serial operation in nature, takes full advantage of both powerful processing ability of hardware and maximum flexibility of software.

One of the most important normative components of MPEG-2 codec is 2-D DCT/IDCT operation. For 2-D DCT/IDCT hardware developments, all the 2-D DCT or IDCT processors developed so far have made use of the separability property of the 2-D DCT or IDCT, i.e. based on Row-Column Method (RCM) approach, the 2-D DCT/IDCT operation is decomposed as two separated 1-D DCT/IDCTs and each. 1-D DCT/IDCT would be further realized by relatively simple, regular structure with relative low design and layout cost. But the chip implementations based on RCM have a major drawback: throughput rate of them are relatively low because intermediate memory component and serial I/O mode are adopted in almost all these RCM approaches. The maximum throughputs of 2-D DCT/IDCT processors based on RCM so far are about 100 million samples per second, which fail to meet the 2-D DCT/IDCT throughput requirements for MPEG-2 MP@H-14, MP@HL, HP@H-14 and HP@HL specifications, which demand more than 100 million samples per second throughput rate for 2-D 8×8 DCT or IDCT. On the contrary, the 2-D DCT/IDCT algorithm and its hardware implementation according to the present invention can achieve much higher throughput rate by adopting paralleled I/O mode and pipelined architecture without using any intermediate memory component. Based on a direct 2-D coefficient matrix factorization/decomposition approach, this algorithm of the present invention is not only more computation efficient and requires a smaller number of multiplications, but also can achieve higher computation precision with the shorter finite internal wordlength compared with other RCM algorithms. In addition, one example hardware implementation of this algorithm only requires simple localized communication interconnection among its processing elements instead of complex global communication interconnection that prevents other, direct 2-D DCT/IDCT algorithms from being implemented in VLSI chips. The HDL simulation and logic synthesis results show that one example hardware implementation of this algorithm is one of the first successful attempts to map a direct 2-D DCT/IDCT algorithm onto silicon.

In summary, the algorithm and its hardware implementation according to the present invention have some advantages over other 2-D DCT/IDCT processors:

(1) The development of this algorithm and its hardware implementation, in one embodiment, is targeted to the application of MPEG-2 MP@H-14, MP@HL, HP@H-14 and HP@HL specifications. By employing the concurrent pipelined architecture, the synthesized chip implementation can achieve 800 million samples per second (i.e. 12,500,500 8×8 blocks DCT or IDCT per second) high throughput when driven by a single-edge triggered 200 MHz clock, which guarantees it to be able to meet any current or near future HDTV requirements;

(2) The relatively small latency (only a few cycles circuit delay) makes it a perfect candidate for real-time video applications;

(3) The direct 2-D coefficient matrix factorization/ decomposition approach allows the 2D DCT/IDCT operation to be carried out with only one coefficient approximation and one truncation losses. Compared with row/column transforms of two 1-D DCT/IDCT calculations, the accumulative errors have been cut dramatically so as to achieve much better precision (about 40 dB mean SNR) with the same or shorter finite internal wordlength;

(4) No real multiplier is required since every multiplication in this scheme has been confined as a variable multiplied by a constant instead of two variables in general. In contrast to that an ordinary n-bit by n-bit multiplier consists of n(n−2) full adders, n half adders and $n^2$ AND gates, each n-bit adder only requires n full adders. As the result, the 2-D DCT/IDCT processor in one embodiment is only made of some very simple components like adders, subtractors, adder/subtractors and multiplexers, which makes it very easy to be synthesized and implemented with VLSI technology;

(5) All the processing elements (PEs) in one example 2-D DCT/IDCT chip implementation are 100% sharable between 2-D DCT and 2-D IDCT operations.

The key execution units of one example 2-D DCT/IDCT chip implementation according to the present invention consist of total 90 adders and subtractors, as well as 64 adders/subtractors as accumulators. Based on TSMC's 3.3 v 0.351 μm CMOS library, the estimated chip area of this example 2-D DCT/IDCT implementation is about 6.84 mm$^2$.

7.2 Other Applications

The contributions of this invention can be combined with future works on hybrid MPEG-2 video codec implementation. The present invention can be combined with any conventional and further implementations of quantization and inverse quantization in a MPEG encoding/decoding process. Quantization and inverse quantization can be integrated into the 2-D DCT/IDCT chip since both of them are parallel operations in nature.

Similarly, the present invention can be combined with conventional and future developed motion estimation in a MPEG encoding process. Motion estimation can be combined with the present invention to be carried out by hardware component.

Further simplification can also apply to the 2D DCT/IDCT algorithm of the present invention. Since the even rows of coefficient matrix E are still even symmetric and the odd rows are odd-symmetric, further decomposition for the algorithm can be carried out to further reduce the total number of multiplications required to compute the 2-D DCT/IDCT.

For some MPEG video codec applications, 400 million samples per second throughput rate for 2-D DCT/IDCT is more than enough. The preliminary result shows that after minor architecture change for the proposed HDL functionality, the estimated chip area can be reduced to about ½ of its original size when the RTL design is re-synthesized with a single-edge triggered 100 MHz system clock instead of the 200 MHz one. And the 100 MHz driven the processor still has higher throughput than most other 2-D DCT/IDCT chip implementations.

APPENDIX

[ABO94] R. Airiau, J. Berge and V. Olive, "Circuit Synthesis with VHDL," Kluwer Academic Publishers, 1994.

[ANR74] N. Ahmed, T. Natarajan, and K. R. Rao. "Discrete cosine transform," IEEE Trans. Comput., Vol. C-23. January 1974, pp. 90–93.

[AZK95] M. F. Aburdene, J. Zheng, and R. J. Kozick, "Computation of discrete cosine transform using Clenshaw's recurrence formula," IEEE Signal Processing Letter, Vol.2, No.8, August 1995, pp.155–156.

[Cad] "Verilog-XL Reference Manual, "Cadence, 1994.

[Chi94] C. T. Chiu, "Parallel implementation of transform-based DCT filter-bank for video communications," IEEE Transactions on Consumer Electronics, Vol. 40, No. 3, August 1994, pp. 473–475.

[CL91] N. I. Cho and S. U. Lee,."Fast Algorithm and Implementation of 2-D Discrete Cosine Transform," IEEE Transactions on Circuits and Systems, Vol. 38, No. 3, March 1991, pp. 297–305.

[CSF77] W. Chen, C. Smith, and S. Fralick, "A fast computational algorithm for the discrete cosine transform." IEEE Trans. On Communication, Vol. COM-25, September 1977, pp. 1004–1009.

[CT65] J. W. Cooley and J. W. Tukey, "An algorithm for the machine calculation of complex Fourier series," Math of Comput., Vol.19, 1965, pp. 297–301.

[CW95] Yu-Tai Chang and Chin-Liang Wang, "New Systolic Array Implementation of the 2-D Discrete Cosine Transform and Its Inverse," IEEE Transactions on Circuits and Systems for Video Technology, Vol. 5, No.2, April 1995, pp. 150–157.

[DG90] P. Duhamel and C. Guillemot, "Polynomial transform computation of the 2-D DCT," in Proc. IEEE Intl. Conf. Acoust., Speech, Signal Processing, Albuquerque, N.Mex., April 1990, pp. 1515–1518.

[Haq85] M. A. Haque, "A bi-dimensional fast cosine transform," IEEE Transactions on Acoust., Speech and Signal Processing, Vol. ASSP-33, December 1985, pp. 1532–1538.

[Har76] R. M. Haralick, "A storage efficient way to implement the discrete cosine transform," IEEE Transactions on Computing, Vol. C-27, June 1976, pp. 764–764.

[H.261] ITU-T Recommendation H.261 (Formerly CCITT Recommendation H.26 1) "Codec for audiovisual services at p×64 kbit/s," Geneva, 1990.

[Jan94] Yi-Feng Jang et al., "A 0.8μ100-MHz 2-D DCT Core Processor," IEEE Transactions on Consumer Electronics, Vol. 40, No.3, August 1994, pp. 703–710.

[Joa96] Joan L. Mitchell, William B. Pennebaker, Chad E. Fogg, and Didier J. LeGall, "MPEG video compression standard," Chapman & Hall, 1996.

[JPEG] ISO/IEC ITCI/SC29/WGIO, JPEG Committee Draft CD10918, 1991.

[KA95] P. Kurup and T. Abbasi, "Logic Synthesis Using Synopsys®," Kluwer Academic Publishers, 1995.

[Lee84] B. G. Lee, "A new algorithm for the discrete cosine transform," IEEE Transactions on Acoust., Speech and Signal Processing, Vol. ASSP-32, December 1984, pp. 1243–1245.

[Lee97] Y. Lee et al., "A Cost-Effective Architecture for 8×8 Two Dimensional DCT/IDCT Using Direct Method," IEEE Transactions on Circuits and Systems for Video Technology, Vol. 7, No. 3, June 1997, pp. 459–467.

[LLM89] C. Loeffler, A. Ligtenverg, and G. S. Moschytz, "Practical fast I-D DCT algorithms with 11 multiplications," Intl. Conf. On Acoust., Speech and Signal Processing, Glasgow, Scotland, May 1989., pp. 988–991.

[Mak80] J. Makoul, "A fast cosine transform in one and two dimensions," IEEE Transactions on Acoust., Speech and Signal Processing, vol. ASSP-28, February 1980, pp. 27–34.

[Mal87] H. S. Malvar, "Fast computation of the discrete cosine transform and the discrete Hartley transform," IEEE Transactions on Acoust., Speech and Signal Processing, Vol. ASSP-35, October 1987, pp. 1484–1485.

[May95] W. May, "Programming TI's Multimedia Video Processor," Dr. Dobb's Journal, November 1995, pp. 46–52.

[Miy93] T. Miyazaki et al., "DCT/IDCT processor for HDTV developed with DSP silicon compiler," J. VLSI Signal Processing, Vol. 5, June 1993, pp. 39–46.

[MPEG1] ISO/IEC JTC1/SC29/WG11, MPEG Committee Draft CD11172, 1993.

[MPEG2] ISO/IEC JTC1/SC29/WG11, MPEG2 Committee Draft CD 13818, 1994.

[MW95] Avanindra Madisetti and Alan N. Wilson, Jr., "A 100 MHz 2-D 8×8 DCT/IDCT Processor for HDTV Applications," IEEE Transactions on Circuits and Systems for Video Technology, Vol. 5, No. 2, April 1995, pp. 158–165.

[Nus81] H. J. Nussbaumer, "Fast polynomial transfonn computation of the 2-D DCT," in Proc. Intl. On Digital Processing, Florence, Italy, September 1981, pp. 276–283.

[NK83] N. Nasrabadi, and R. King, "Computationally efficient discrete cosine transform algorithm," Electronics Letter, Vol 19, January 1983, pp. 24–25.

[RT92] P. Ruetz and P. Tong, "A 160-Mpixel/s IDCT processor for HDTV," IEEE Micro, October 1992, pp. 28–32.

[RY90] K. R. Rao and P. Yip, "Discrete Cosine Transform— Algorithms, Advantages, Applications," Academic Press, Inc., 1990

[Siu95] Wan-Chi Siu et al., "New 2" Discrete Cosine Transform Algorithm using Recursive Filter Structure", IEEE Proceeding 1995, pp 1169–1172.

[Sor87] H. V. Sorensen et al., "Real-Valued Fast Fourier Transform Algorithms," IEEE Transactions on Acoust., Speech and Signal Processing, Vol. ASSP-35, June 1987, pp. 849–863.

[Swa97] E. Swartzlander, Jr. "Application Specific Processors, "Kluwer Academic Publishers, 1997.

[Syn96] "Design Compiler Family Reference Manual," Version 3.4, Synopsys, 1996.

[SL92] D. Slawechi and W. Li, "DCT/IDCT processor design for high data rate image coding," IEEE Transactions on Circuits and Systems for Video Technology, Vol. 2, June 1992, pp. 135–146.

[SL96] Vishnu Srinivasan and K. J. Ray Liu, "VLSI Design of High-Speed Time-Recursive 2-D DCT/IDCT Processor for Video Applications", IEEE Transactions on Circuits and Systems for Video Technology, Vol. 6, No. 1, February 1996, pp. 87–96.

[Ura92] S. Uramoto et al., "A 100 MHz 2-D Discrete cosine transform core processor," IEEE J. Solid-State Circuits. Vol. 27, April 1992, pp. 492–499.

[Ven88] S. Venkataraman et al., "Discrete transforms via the Walsh-Hadamard transform," Signal Processing, Vol. 14, 1988, pp.371–382.

[Vet85] M. Vetterli, "Fast 2-D discrete cosine transforms," Intl. Conf. on Acoust., Speech, and Signal Processing, Tampa, Fla., March 1985, pp. 1538–1541.

[Wan83] Z. Wang, "Reconsideration of a fast computational algorithm for the discrete cosine transform," IEEE Trans. On Communication, Vol. COM-31, January 1983, pp. 121–123.

[Wan84] Z. Wang, "Fast algorithms for the discrete W transform and for the discrete Fourier transform," IEEE Trans. Acoust., Speech, and Signal Processing, Vol. ASSP-32, August 1984, pp. 803–816.

[WC95] Chin-Liang Wang and Chang-Yu Chen, "High-Throughput VLSI Architectures for the 1-D and 2-D Discrete Cosine Transforms", IEEE Transactions on Circuits and Systems for Video Technology, Vol. 5, No. 1, February 1995, pp. 31–40.

[YN85] P. P. N. Yang and M. J. Narasimha, "Pime factor decomposition of the discrete cosine transform," Intl. Conf. On Acoust., Speech, and Signal Processing, Tampa, Fla., March 1985., pp. 772–775.

What is claimed is:

1. A system for computing a two-dimensional discrete cosine transform (2D-DCT) of input data, the input data including at least first through sixty-fourth input elements of an 8 row×8 column matrix X, comprising:

a shuffler having four parallel inputs and four parallel outputs, each input receiving a respective group of sixteen rows of the first through 64th elements, wherein said shuffler processes each row of four parallel input elements (a,b,c,d) received on said four inputs in parallel and outputs four output elements (x++,x−+,x+−, x−−) in parallel for each processed input row, each output element representing a different linear combination of four corresponding input elements; and first through fourth sub-block operators (EE, EO, OE, OO) each coupled in parallel to a respective one of said four outputs of said shuffler; wherein said first through fourth sub-block operators each process a set of sixteen output elements from said shuffler independently, and generate respective first through fourth sets of sixteen matrix products, each set of matrix products representing a product of three independent 4×4 matrix multiplications of a respective set of said sixteen output elements output from said shuffler.

2. The system of claim 1, wherein said shuffler calculates first through fourth output elements for each row of first through fourth input elements such that:

said first output element (x++) equals a sum of said first through fourth input elements (a+b+c+d);

said second output element (x−+) equals a sum of said first input element minus said second input elements plus said third input element and minus said fourth input element (a−b+c−d);

said third output element (x+−) equals a sum of said first input element plus said second input elements minus said third input element and minus said fourth input element (a−b+c−d); and said fourth output element (x−−) equals a sum of said first input element minus said second input elements minus said third input and plus said fourth input element (a−b−c+d).

3. The system of claim 2, wherein said shuffler comprises first through fourth adders and first through fourth subtractors interconnected in two layers, each adder and subtractor has two inputs and an output; wherein:

said first adder inputs receive said first and second input elements and said first adder output is coupled to said third adder and said third subtractor;

said first subtracter inputs receive said first and second input elements and said first subtracter output is coupled to said fourth adder and said fourth subtractor;

said second adder inputs receive said third and fourth input elements and said second adder output is coupled to said third adder and said third subtractor; and said second subtracter inputs receive said third and fourth input elements and said second subtracter output is coupled to said fourth adder and said fourth subtractor.

4. The system of claim 1, wherein said shuffler includes at least four adders and four subtractors.

5. The system of claim 1, wherein
said first sub-block operator (EE subblock) outputs said first set of sixteen matrix products equal to a 4×4 matrix Z1;
said second sub-block operator (EO subblock) outputs said second set of sixteen matrix products equal to a 4×4 matrix Z2;
said third sub-block operator (OE subblock) outputs said third set of sixteen matrix products equal to a 4×4 matrix Z3; and
said fourth sub-block operator (OO subblock) outputs said fourth set of sixteen matrix products equal to a 4×4 matrix Z4; where $$Z1 = \begin{bmatrix} Z_{00} & Z_{20} & Z_{40} & Z_{60} \\ Z_{02} & Z_{22} & Z_{42} & Z_{62} \\ Z_{04} & Z_{24} & Z_{44} & Z_{64} \\ Z_{06} & Z_{26} & Z_{46} & Z_{66} \end{bmatrix} = EX_{++}E^T,$$

$$Z2 = \begin{bmatrix} Z_{10} & Z_{30} & Z_{50} & Z_{70} \\ Z_{12} & Z_{32} & Z_{52} & Z_{72} \\ Z_{14} & Z_{34} & Z_{54} & Z_{74} \\ Z_{16} & Z_{36} & Z_{56} & Z_{76} \end{bmatrix} = EX_{-+}O^T,$$

$$Z3 = \begin{bmatrix} Z_{01} & Z_{21} & Z_{41} & Z_{61} \\ Z_{03} & Z_{23} & Z_{43} & Z_{63} \\ Z_{05} & Z_{25} & Z_{45} & Z_{65} \\ Z_{07} & Z_{27} & Z_{47} & Z_{67} \end{bmatrix} = OX_{+-}E^T,$$

$$Z4 = \begin{bmatrix} Z_{11} & Z_{31} & Z_{51} & Z_{71} \\ Z_{13} & Z_{33} & Z_{53} & Z_{73} \\ Z_{15} & Z_{35} & Z_{55} & Z_{75} \\ Z_{17} & Z_{37} & Z_{57} & Z_{77} \end{bmatrix} = OX_{--}O^T; \text{ and}$$

4×4 matrix E has only odd coefficients of said coefficient vector W and 4×4 matrix O has only odd coefficient of said coefficient vector W as follows:

$$E = \begin{bmatrix} w_4 & w_4 & w_4 & w_4 \\ w_2 & w_6 & -w_6 & -w_2 \\ w_4 & -w_4 & -w_4 & w_4 \\ w_6 & -w_2 & w_2 & -w_6 \end{bmatrix} = P2 \cdot A \cdot P4,$$

$$O = \begin{bmatrix} w_1 & w_3 & w_5 & w_7 \\ w_3 & -w_7 & -w_1 & -w_5 \\ w_5 & -w_1 & w_7 & w_3 \\ w_7 & -w_5 & w_3 & -w_1 \end{bmatrix} = P3 \cdot A \cdot P4;$$

where said coefficient vector W consists of coefficients $w_k$ is proportional to $\cos(k\pi/16)$ for k=1,2, ... 7.

6. The system of claim 5, wherein:
said first sub-block operator (EE subblock) comprises six multipliers; sixteen accumulators; and a 6 to 16 multiplexer controlled by a first mux-selector signal, said 6 to 16 multiplexer being coupled between each of said six multipliers and each of said sixteen accumulators.

7. The system of claim 6, wherein:
said second sub-block operator (EO subblock) comprises twelve multipliers; sixteen accumulators; and a 12 to 16 multiplexer controlled by a second mux-selector signal, said 12 to 16 multiplexer being coupled between each of said twleve multipliers and each of said sixteen accumulators;
said third sub-block operator (OE subblock) comprises twelve multipliers; sixteen accumulators; and a 12 to 16 multiplexer controlled by a third mux-selector signal, said 12 to 16 multiplexer being coupled between each of said twelve multipliers and each of said sixteen accumulators; and
said fourth sub-block operator (OO subblock) comprises ten multipliers; sixteen accumulators; and a 10 to 16 multiplexer controlled by a fourth mux-selector signal, said 10 to 16 multiplexer being coupled between each of said ten multipliers and each of said sixteen accumulators.

8. The system of claim 7, wherein each multiplier comprises a psuedo-multiplier.

9. The system of claim 1, further comprising:
first through fourth output stages coupled to receive outputs from said first through fourth sub-block operators, respectively;
each of said first through fourth output stages comprising:
a plurality of latches;
a 16 to 1 multiplexer; and
a clipper; said 16 to 1 multiplexer being coupled between each latch and said clipper.

10. The system of claim 9, wherein said clipper comprises a truncation and saturation control unit.

11. The system of claim 1, wherein said first through fourth sub-block operators each have a 13-bit coefficient quantization and a 15-bit finite internal wordlength.

12. The system of claim 1, wherein the input data comprises video data compressed according to at least one of a MPEG and JPEG standard.

13. A system for computing a two-dimensional inverse discrete cosine transform (2D-IDCT) of input data, the input data including at least first through sixty-fourth input elements of an 8 row×8 column matrix $X_{ij}$, where $0 \leq i,j \leq 3$, comprising:
a multiplexer that divides the input data into first to fourth 4×4 sub-matrices Xee, Xoe, Xeo, and Xoo based on whether each element has an even or odd row and column coefficient such that 16 elements having an even row and an even column are included in sub-matrix Xee, 16 elements having an odd row and even column are included in sub-matrix Xoe, 16 elements having an even row and odd column are included in sub-matrix Xeo, and 16 elements having an odd row and odd column are included in sub-matrix Xoo; and
first through fourth sub-block operators (EE, EO, OE, OO) receiving said first to fourth 4×4 sub-matrices Xee, Xoe, Xeo, and Xoo, respectively, said sub-block operators processing said first to fourth 4×4 sub-matrices Xee, Xoe, Xeo, and Xoo independently and generating respective first through fourth sets of sixteen matrix products, each set of matrix products representing a product of three independent 4×4 matrix multiplications of a respective set of said sixteen input elements in said input data.

14. The system of claim 13, further comprising:
a shuffler having four parallel inputs and four parallel outputs, each input coupled in parallel to receive an output from a respective one of said first through fourth sub-block operators.

15. The system of claim 14, wherein said shuffler includes at least four adders and four subtractors.

16. The system of claim 14, wherein said shuffler outputs 64 elements of an output matrix Z representing a 2D IDCT transform of the input data of matrix X.

17. The system of claim 16, wherein output matrix Z includes four 4×4 submatrices Z5 to Z8, said shuffler outputting first to fourth sets of 16 elements in the submatrices Z5 to Z8 on said four outputs of said shuffler in parallel, where said submatrices Z5 to Z8 are defined by:

$$Z5 = \begin{bmatrix} Z_{00} & Z_{10} & Z_{20} & Z_{30} \\ Z_{01} & Z_{11} & Z_{21} & Z_{31} \\ Z_{02} & Z_{12} & Z_{22} & Z_{32} \\ Z_{03} & Z_{13} & Z_{23} & Z_{33} \end{bmatrix} = E^T X_{ee} E + E^T X_{oe} O + O^T X_{eo} E + O^T X_{oo} O,$$

$$Z6 = \begin{bmatrix} Z_{70} & Z_{60} & Z_{50} & Z_{40} \\ Z_{71} & Z_{61} & Z_{51} & Z_{41} \\ Z_{72} & Z_{62} & Z_{52} & Z_{42} \\ Z_{73} & Z_{63} & Z_{53} & Z_{43} \end{bmatrix} = E^T X_{ee} E - E^T X_{oe} O + O^T X_{eo} E - O^T X_{oo} O,$$

$$Z7 = \begin{bmatrix} Z_{07} & Z_{17} & Z_{27} & Z_{37} \\ Z_{06} & Z_{16} & Z_{26} & Z_{36} \\ Z_{05} & Z_{15} & Z_{25} & Z_{35} \\ Z_{04} & Z_{14} & Z_{24} & Z_{34} \end{bmatrix} = E^T X_{ee} E + E^T X_{oe} O - O^T X_{eo} E - O^T X_{oo} O,$$

$$Z8 = \begin{bmatrix} Z_{77} & Z_{67} & Z_{57} & Z_{47} \\ Z_{76} & Z_{66} & Z_{56} & Z_{46} \\ Z_{75} & Z_{65} & Z_{55} & Z_{45} \\ Z_{74} & Z_{64} & Z_{54} & Z_{44} \end{bmatrix} = E^T X_{ee} E - E^T X_{oe} O - O^T X_{eo} E + O^T X_{oo} O;$$

and

4×4 matrix E has only even coefficients of a coefficient vector W and 4×4 matrix O has only odd coefficients of said coefficient vector W as follows:

$$E = \begin{bmatrix} w_4 & w_4 & w_4 & w_4 \\ w_2 & w_6 & -w_6 & -w_2 \\ w_4 & -w_4 & -w_4 & w_4 \\ w_6 & -w_2 & w_2 & -w_6 \end{bmatrix} = P2 \cdot A \cdot P4,$$

$$O = \begin{bmatrix} w_1 & w_3 & w_5 & w_7 \\ w_3 & -w_7 & -w_1 & -w_5 \\ w_5 & -w_1 & w_7 & w_3 \\ w_7 & -w_5 & w_3 & -w_1 \end{bmatrix} = P3 \cdot A \cdot P4;$$

where said coefficient vector W consists of coefficients $w_k$ is proportional to $\cos(k\pi/16)$ for k=1,2, . . . 7.

18. The system of claim 13, wherein:
said first sub-block operator (EE subblock) comprises six multipliers; sixteen accumulators; and a 6 to 16 multiplexer controlled by a first mux-selector signal, said 6 to 16 multiplexer being coupled between each of said six multipliers and each of said sixteen accumulators;
said second sub-block operator (EO subblock) comprises twelve multipliers; sixteen accumulators; and a 12 to 16 multiplexer controlled by a second mux-selector signal, said 12 to 16 multiplexer being coupled between each of said twlexe multipliers and each of said sixteen accumulators;
said third sub-block operator (OE subblock) comprises twelve multipliers; sixteen accumulators; and a 12 to 16 multiplexer controlled by a third mux-selector signal, said 12 to 16 multiplexer being coupled between each of said twelve multipliers and each of said sixteen accumulators; and
said fourth sub-block operator (OO subblock) comprises ten multipliers; sixteen accumulators; and a 10 to 16 multiplexer controlled by a fourth mux-selector signal, said 10 to 16 multiplexer being coupled between each of said ten multipliers and each of said sixteen accumulators.

19. The system of claim 18, wherein each multiplier comprises a psuedo-multiplier.

20. The system of claim 13, further comprising:
first through fourth output stages coupled between said first through fourth sub-block operators, respectively, and inputs of said shuffler, each of said first through fourth output stages comprising: a plurality of latches; and a 16 to 1 multiplexer; and
first through fourth clippers coupled to said first through fourth outputs of said shuffler.

21. The system of claim 20, wherein each clipper comprises a truncation and saturation control unit.

22. The system of claim 13, wherein said first through fourth sub-block operators each have a 13-bit coefficient quantization and a 16-bit finite internal wordlength.

23. The system of claim 13, wherein the input data comprises video pictures compressed according to at least one of a MPEG and JPEG standard.

24. A hybrid 2D-DCT and IDCT system that receives DCT input data and IDCT input data comprising:
a first input multiplexer having a first input that receives the DCT input data and four outputs;
a shuffler having four inputs coupled to said four outputs of said first input multiplexer and an output;
a second input multiplexer having a first input coupled to said output of said shuffler and four outputs; and
four sub-block operators, each having an input coupled in parallel to a respective output of said second input multiplexer and each sub-block operator having sixteen outputs.

25. The hybrid system of claim 24, further comprising:
four DCT clippers;
four IDCT clippers;
latches coupled to each sub-block operator output; and
an output multiplexer having inputs coupled to each of said latches and outputs coupled to said first input multiplexer and to said four DCT clippers; and
wherein outputs of said shuffler are also coupled to said four IDCT clippers.

26. The system of claim 24, wherein the hybrid 2D-DCT and IDCT system is implemented in hardware on a single VLSI chip.

27. A method for switching between transforming 2D-DCT data and 2D-IDCT data, comprising the steps of:
switching first and second multiplexers to pass the 2D-DCT input data through a shuffler then through four sub-block operators to obtain a matrix Z output data representing a 2D-DCT of the input 2D-DCT input data; and
switching the first and the second multiplexers to pass the 2D-IDCT input data through the four sub-block operators and then the shuffler to obtain a matrix Z output data representing a 2D-IDCT of the input 2D-IDCT input data,
wherein the input data comprises either video data or decoded video data, and wherein said first switching step is performed prior to encoding the video data and said second switching step is performed on the decoded video data after inverse scanning and quantization.

* * * * *